(12) United States Patent
Endo et al.

(10) Patent No.: US 10,054,181 B2
(45) Date of Patent: Aug. 21, 2018

(54) DAMPING COMPONENT AND DAMPING STRUCTURE

(71) Applicant: CANON KABUSHIKI KAISHA, Tokyo (JP)

(72) Inventors: Rie Endo, Yokohama (JP); Katsunori Yokoyama, Suntou-gun (JP); Shinji Yamamoto, Kawasaki (JP); Kazuaki Takahata, Kawasaki (JP); Kazumasa Shibata, Kawasaki (JP); Hiroki Kasama, Kashiwa (JP); Satoru Nitobe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 15/072,633

(22) Filed: Mar. 17, 2016

(65) Prior Publication Data

US 2016/0273605 A1    Sep. 22, 2016

(30) Foreign Application Priority Data

Mar. 20, 2015    (JP) .................. 2015-057874

(51) Int. Cl.
*B62D 24/04* (2006.01)
*F16F 7/108* (2006.01)

(52) U.S. Cl.
CPC ................... *F16F 7/108* (2013.01)

(58) Field of Classification Search
CPC .......... F16F 3/0876; F16F 15/08; B60G 7/02; B60G 99/002; B62D 21/11
USPC ............ 267/136, 140.2–140.5, 141.1–141.7, 267/292–294; 248/560, 562, 634–636;

(Continued)

(56) References Cited

U.S. PATENT DOCUMENTS 2,477,429 A * 7/1949 Swanstrom ........... F16B 37/044
                                                  411/104
2,644,502 A * 7/1953 Tinnerman ........... F16B 37/044
                                                  411/107

(Continued)

FOREIGN PATENT DOCUMENTS

JP    6-63916 A    3/1993
JP    2002-89601 A    3/2002

(Continued)

OTHER PUBLICATIONS

Rie Endo, Katsunori Yokoyama, Shinji Yamamoto, Kazuaki Takahata, Kazumasa Shibata, and Hiroki Kasama, U.S. Appl. No. 15/072,782, filed Mar. 17, 2016.

(Continued)

*Primary Examiner* — Christopher P Schwartz
(74) *Attorney, Agent, or Firm* — Fitzpatrick, Cella, Harper & Scinto

(57) ABSTRACT

A damping component includes a base with an attachment portion to be attached to a vibrated member, a damping member disposed at an outer circumferential side of the base while being compressed, and a holding portion disposed at an outer circumferential side of the damping member and compressively holding the damping member. The damping member has rigidity lower than rigidity of the base and rigidity of the holding portion and has a loss factor, measured by a mechanical impedance method in a state being compressed between the base and the holding portion, of 0.05 or more.

40 Claims, 43 Drawing Sheets

(58) Field of Classification Search
USPC ....... 296/35.1; 411/34, 38, 6, 111, 112, 121, 411/392, 907
See application file for complete search history.

(56) References Cited

U.S. PATENT DOCUMENTS

| | | | | |
|---|---|---|---|---|
| 3,362,276 | A | * | 1/1968 | Gould .................. F16B 33/004 29/508 |
| 6,820,908 | B1 | * | 11/2004 | Tousi .................... F16F 15/08 248/609 |
| 8,171,690 | B2 | * | 5/2012 | Ghatikar ............ E04F 13/0837 403/267 |
| 8,479,899 | B2 | * | 7/2013 | Ohtake .................. F16F 1/371 188/129 |
| 2009/0273127 | A1 | * | 11/2009 | Goudie ................ F16F 13/103 267/140.5 |

FOREIGN PATENT DOCUMENTS

| | | |
|---|---|---|
| JP | 2006-283408 A | 10/2006 |
| JP | 2007-278411 A | 10/2007 |
| JP | 2015-68455 A | 4/2015 |

OTHER PUBLICATIONS

Rie Endo, Katsunori Yokoyama, Shinji Yamamoto, Kazuaki Takahata, Kazumasa Shibata, and Hiroki Kasama, U.S. Appl. No. 15/073,887, filed Mar. 18, 2016.

* cited by examiner

DAMPING COMPONENT AND DAMPING STRUCTURE

BACKGROUND OF THE INVENTION

Field of the Invention

The present invention relates to a damping component and to a damping structure attached to a vibrated member to which vibration is transmitted from an exciter, e.g., a motor, to reduce the vibration of the vibrated member.

Description of the Related Art

Lately, frames, such as a casing, are formed of a thin metal plate or the like to lighten a weight of various products such as office equipment (e.g., a printer), home appliances, (e.g., a refrigerator), automobiles and construction materials. Such frames may radiate sound when vibration generated by an exciter, such as a motor, is transmitted to the frames. Then, there is a demand to reduce the vibration of a vibrated member, such as the frame, to which the vibration is transmitted from the exciter. For instance, a method of reducing the vibration of the vibrated member by pasting a damping member on a surface of a part or a whole of the vibrated member is conventionally known as disclosed in Japanese Unexamined Patent Application Publication No. 05-063916, for example. Still further, as another method of reducing the vibration of the vibrated member, there is known a method of pasting a damping steel plate in which a damping member is interposed and welded between two metal thin plates on a surface of the vibrated member.

Meanwhile, there are many apparatuses absorbing vibration energy generated by earthquake or the like to reduce the vibration. For instance, Japanese Unexamined Patent Application Publication No. 2007-278411 proposes a damper in which inner and outer cylindrical rigid members are attached to two relatively movable different objects, respectively. Then, vibration generated between the two objects is reduced by a viscoelastic energy absorbing member disposed between these inner cylindrical and outer cylindrical rigid members. Still further, Japanese Unexamined Patent Application Publication No. 2006-283408 proposes a damper including inner and outer cylinders forming a double pipe portion and an energy absorbing member disposed between these inner and outer cylinders. The damper reduces vibration by shear deformation of the energy absorbing member disposed between the inner and outer cylinders caused by relative move of the inner and outer cylinders forming the double pipe portion.

However, the method of pasting the damping member, the damping steel plate, or the like to the vibrated member has such problems that not only does this method lead to an increase of the cost of a product because this method requires a large amount damping member, but also an effect of reducing the vibration is not so high from the beginning. Still further, it is difficult to work, i.e., to bend and to draw, the damping steel plate corresponding to a bent plate member. Still further, the damping steel plate is very heavy because the metal thin plates are used, so that versatility of the damping steel plate is low.

Japanese Unexamined Patent Application Publication No. 2007-278411 discloses a damper configured to be used by attaching respectively to two relatively movable different objects. Accordingly, this damper is unable to be used in a case of reducing vibration generated only on one subject surface having no counterpart, not between the two objects.

Japanese Unexamined Patent Application Publication No. 2006-283408 also discloses a damper which is attached to a coupling portion or the like of a structure in advance in assembling the structure. Therefore, it is difficult to attach the damper after assembling the structure. Still further, the damper disclosed in Japanese Unexamined Patent Application Publication No. 2006-283408 includes a large number of components, thus complicating its structure. For instance, when the damper is attached to one object surface, an outer cylinder of the double-tube portion comes into contact with the object surface, so that radiated sound caused by vibration generated on the object surface increases.

SUMMARY OF THE INVENTION

Accordingly, the present invention provides a damping component and a damping structure enabling to reduce vibration of a vibrated member with a simple structure. According to one aspect of the present invention, a damping component includes a base including an attachment portion to be attached to a vibrated member, a damping member disposed at an outer circumferential side of the base while being compressed, and a holding portion disposed at an outer circumferential side of the damping member and holding the damping member while compressing the damping member. The damping member has rigidity lower than rigidity of the base and rigidity of the holding portion and has a loss factor, measured by a mechanical impedance method in a state being compressed between the base and the holding portion, of 0.05 or more.

According to another aspect of the invention, a damping structure includes a vibrated member to which vibration is transmitted from an exciter and a damping component coupled with the vibrated member. The damping component includes a base comprising an attachment portion to be attached to the vibrated member, a damping member disposed at an outer circumferential side of the base while being compressed, and a holding portion disposed at an outer circumferential side of the damping member and compressively holding the damping member. The damping member also has rigidity lower than rigidity of the base and rigidity of the holding portion and has a loss factor, measured by a mechanical impedance method in a state being compressed between the base and the holding portion, of 0.05 or more.

According to a still other aspect of the invention, a damping component includes a base, a damping member disposed at an outer circumferential side of the base while being compressed, and a holding portion disposed at an outer circumferential side of the damping member and compressively holding the damping member. The damping member also has rigidity lower than rigidity of the base and rigidity of the holding portion and has a loss factor, measured by a mechanical impedance method in a state being compressed between the base and the holding portion, of 0.05 or more.

Further features of the present invention will become apparent from the following description of exemplary embodiments with reference to the attached drawings.

DESCRIPTION OF THE EMBODIMENTS

First Embodiment

Figure 1A:
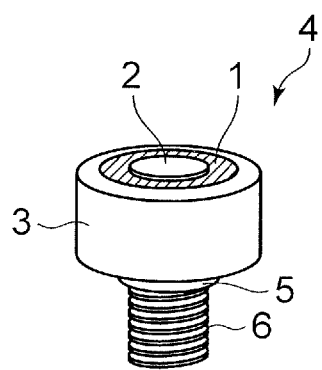
FIG. 1A is a perspective view illustrating a damping component of a first embodiment seen from above the damping component.
Figure 1B:
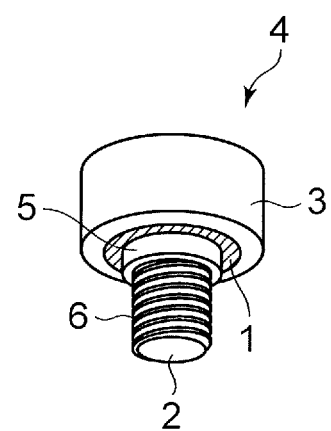
FIG. 1B is a perspective view illustrating the damping component of the first embodiment seen from below the damping component.

Embodiments of the present invention will be described in detail below with reference to the drawings. At first, a damping component of a first embodiment will be described with reference to FIGS. 1 through 4. As illustrated in FIG. 1, the damping component 4 includes a damping member 1, a rod member 2, i.e., an attachment member (base), and an outer member 3, i.e., an opposite member (holding portion). The rod member 2 is formed into a columnar shape for example, and the cylindrical damping member 1 is disposed so as to surround an outer circumference of first end of the rod member 2. Still further, the cylindrical outer member 3 is disposed so as to surround an outer circumference of the damping member 1. The outer member 3 can be fitted around the rod member 2 while interposing the damping member 1 and compressively holds the damping member 1 with the rod member 2. That is, damping member 1 is disposed at an outer circumferential side of the base 2 in a compressed state and the holding portion 3 is disposed at an outer circumferential side of the damping member 1 and compressively holding the damping member 1. In other words, the damping component 4 includes the base 2, the damping member 1 disposed on an outer circumferential side of the base 2 in a compressed state, and the holding portion 3 disposed on an outer circumferential side of the damping member 1 and compressively holding the damping member 1. The damping member 1 has rigidity lower than rigidity of the rod member 2 and rigidity of the outer member 3 in the compressed state. It is noted that the term 'rigidity' here is a concept expressing deformability and is specifically expressed by Young's modulus. The Young's modulus can be obtained by conducting measurement in a tensile test.

The damping member 1 is formed of a special acrylic rubber and is a vibration energy absorbing member whose loss factor measured by a mechanical impedance method is 0.05 or more in the compressed state. The damping member 1 whose outer diameter before compression is larger than an inner diameter of the outer member 3 is used. Damping is a technology of converting vibration energy around a resonance point of a structure into thermal energy, and the damping member 1 converts vibration energy vibrating a surface of a vibrated member into thermal energy and hence reduces the vibration of the vibrated member. What is falsely similar to the damping member 1 is a vibration-proof member. Vibration-proof is a technology of not transmitting vibration of a structure, e.g., a building, from a joint part, e.g., a foundation to another structure or foundation. A vibration-proof member reduces a vibration transmission rate between a vibration source generating the vibration and a vibrated member to block the vibration. That is, the vibration-proof member is not suitable for the use as the damping component because it is almost unable to obtain an effect of reducing vibration by the vibration-proof member.

The loss factor of the mechanical impedance method can be obtained by the following method. That is, sheet metal frames formed into a size of 150 mm×100 mm is disposed so as to face with each other and a damping member 1 with 10 mm in diameter is interposed at a center part between these two frames. Then, vibration is applied to the center part of either one frame by an exciter from a side opposite from a side on which the damping member 1 is disposed. A burst random signal (F) of a wide frequency range from 50 Hz to 5 KHz is given to the exciter to vibrate one frame in an out-of-plane direction. The other frame is provided with a plurality of acceleration pickups to obtain acceleration based on measured values at these response points. The acceleration thus obtained is converted into velocity (V) to find amplitude (|Z|) of mechanical impedance (F/V). Based on the amplitude, the loss factor (η) is found.

$$\text{loss factor}(\eta) = |Z|/(2\pi f_0 m)$$

Where, $f_0$ is resonance frequency and m is a mass of the damping member. The loss factor of the damping member 1 when it is compressed can be found by the method described above while compressing the damping member 1 after adjusting a distance between the two frames interposing the damping member 1.

Figure 2:
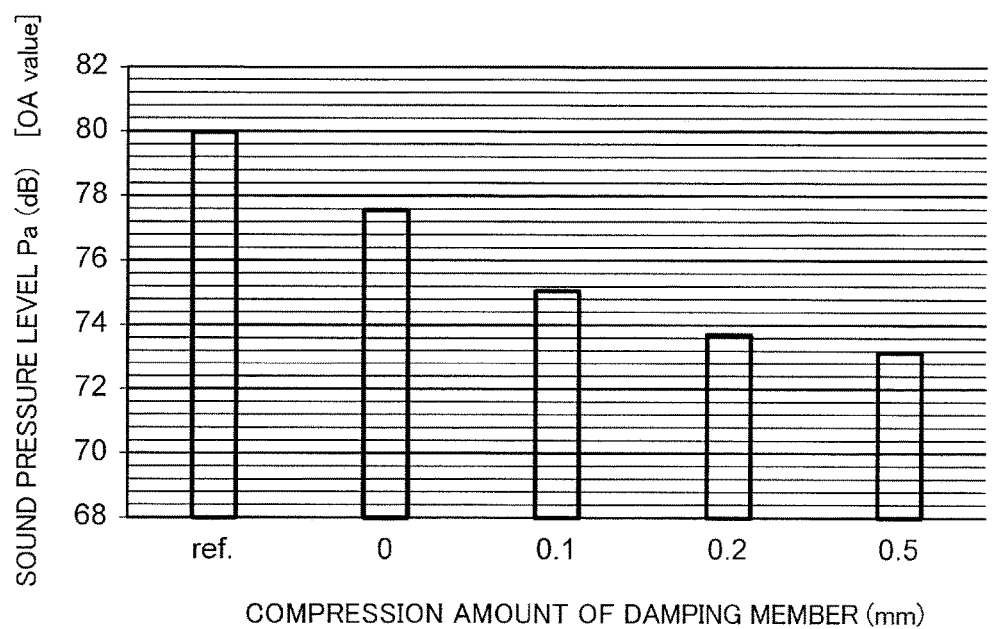
FIG. 2 is a bar graph indicating sound pressure level per each compression amount of a damping member.

The damping member 1 has such a characteristic that its loss factor increases under compression more than the factor before compression. Then, the inventors verified through experiments that the higher the loss factor of the damping member 1, the more significantly the vibration of the vibrated member is reduced. FIG. 2 indicates results of the experiments. FIG. 2 is a bar graph indicating a sound pressure level Pa of radiated sound per compression amount of the damping member 1.

In this experiment, the damping member 1 of 3 mm in thickness was interposed between two sheet metal frames, vibration was applied to one frame by the exciter attached to the frame, and a sound pressure level of sound (radiated sound) radiated from the other frame vibrated by the vibration transmitted through the damping member 1 was measured. At this time, the compression amount of the damping member 1 was varied to measure the sound pressure level (overall value) of the radiated sound generated by the vibration of the frame per each compression amount. A case when no damping member 1 is interposed between the two sheet metal frames was also measured for comparison.

In this experiment, the vibrated member 7 was vibrated by giving the burst random signal of a wide frequency range of 50 Hz to 5 KHz to the exciter. When the frame is applied with such broadband irregular vibrations, there is a case when the frame excites a number of resonances in the broadband frequency range at once. In such a case, a keen solid borne sound, i.e., radiated sound, is generated. In response to an increase of the vibration of the frame, the sound pressure level of the radiated sound rises. Then, it is possible to compare magnitudes of the vibrations of the frame and thereby to verify a degree of reduction of the vibration by measuring the sound pressure levels of the radiated sounds. It is noted that a microphone for measuring the sound pressure levels of the radiated sounds is set at an upper part distant from a center of the vibrated member by 30 cm.

As shown in FIG. 2, the sound pressure level of the radiated sound in the case when the damping member 1 was not interposed between the frames (referred to as a 'reference' hereinafter and denoted as 'ref' in FIG. 2 and other drawings) was about 80 dB. Meanwhile, the sound pressure levels of the radiated sounds of the cases when the damping member 1 was interposed between the frames and the damping member 1 was compressed by compression amounts of 0 mm, 0.1 mm, 0.2 mm, and 0.5 mm were 77.6 dB, 75 dB, 73.7 dB, and 73.2 dB, respectively. That is, the more the compression amount of the damping member 1 increases, the less the sound pressure level of the radiated sound is. From this experimental result, it is considered to be better to increase the compression amount of the damping member 1 as much as possible in order to lower the sound pressure level of the radiated sound.

However, if the damping member 1 is compressed too much, hardness of the damping member 1 increases. Then, the damping member 1 is hardly distorted, i.e., shear-deformed, when the rod member 2 and the outer member 3 move relatively along with the vibration of the vibrated member (frame) as described later. The damping member 1 cannot convert vibration energy into thermal energy unless it is shear-deformed. As a result, the vibration is not reduced and the sound pressure level of the radiated sound is not reduced. In view of this point, an optimal compression amount of the damping member 1 is preferable to be more than 0% and less than 50% with respect to a thickness before compression, though it varies depending on the thickness (thickness in a radial direction of the rod member 2), hardness and others of the damping member 1 before compression. Still further, considering that the damping member 1 is used in compression, it is preferable to use a damping member whose hardness before compression is as low as possible as the damping member 1.

Returning now to the description of FIG. 1, according to the present embodiment, the base is configured to include an attachment portion to attach the damping member to the vibrated member. That is, the rod member 2 (base) is formed with a male screw 6 as a screw portion, i.e., the attachment portion, removably attachable to the vibrated member. The male screw 6 is formed integrally with the rod member 2 and a center axis of the male screw 6 is coincident with a center axis of the outer circumferential surface of the rod member 2 facing the outer member 3. Therefore, the damping member 1 and the outer member 3 are disposed concentrically with respect to the rod member 2. The rod member 2 is also formed with a convex portion 5 projecting in the radial direction (in a direction intersecting with a direction in which the rod member 2 projects). A shape of the convex portion 5 is determined so as not to be in contact with the outer member 3 attached to the rod member 2. Specifically, a diameter of the convex portion 5 is determined such that an outer diameter of the rod member 2 including the convex portion 5 is smaller than an inner diameter of the outer member 3. It is possible to handle the damping component 4 in the same manner with a screw by forming the convex portion 5 around the rod member 2. It is noted that a position where the convex portion 5 is formed is preferable to be a position where the convex portion 5 can support the damping member 1 from underneath.

Figure 3A:
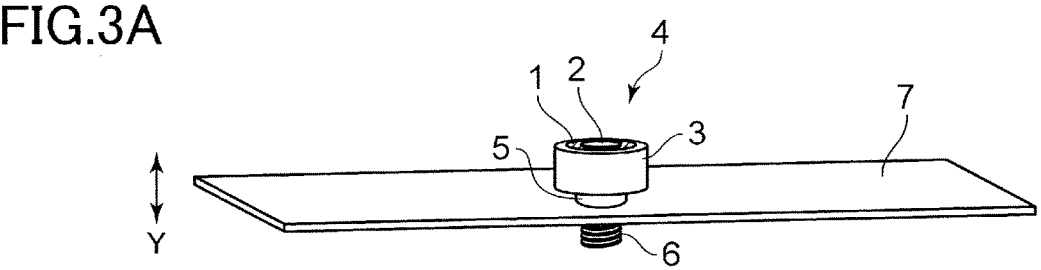
FIG. 3A is a perspective view illustrating the damping component being attached to a vibrated member.
Figure 3B:
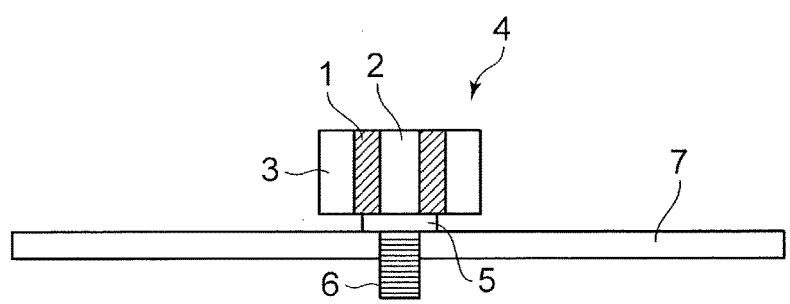
FIG. 3B is a section view illustrating the damping component being attached to the vibrated member.

As described above, the damping component 4 illustrated in FIG. 1 is configured as a vibration reducing screw and to be readily attachable to the vibrated member by coupling the screw. As shown in FIG. 3A, the male screw 6 can be screwed into a female screw not shown of the plate-like vibrated member 7 when an user rotates the rod member 2 by holding the convex portion 5 by a tool such as a spanner. Thereby, the damping component 4 is attached to the vibrated member 7 such that the outer member 3 projects out of the surface of the vibrated member 7 as shown in FIG. 3B. In this case, the damping member 1 is compressively held in the direction intersecting with the direction in which the rod member 2 projects (in the radial direction of the outer member) between the rod member 2 and the outer member 3. The rod member 2 is desirable to be more rigid than the vibrated member 7 to which the damping component 4 is attached in order to efficiently propagate the vibration of the vibrated member 7 to the damping component 4. If the rigidity of the rod member 2 is higher than that of the vibrated member 7, the rod member 2 can vibrate in the out-of-plane direction of the vibrated member 7 (in the direction intersecting with the surface of the vibrated member 7, the axial direction of the rod member 2, or in a direction of an arrow Y in FIG. 3A) with same phase and amplitude with the vibrated member 7 when the vibrated member 7 vibrates.

Still further, when the damping component 4 shown in FIG. 1 is attached to the vibrated member 7, the outer member 3 is disposed at a position distant from the surface of the vibrated member 7 as shown in FIG. 3B. The outer member 3 only compresses and holds the damping member 1 and is not in contact with anything other than the damping member 1. Therefore, even if the vibrated member 7 vibrates in the out-of-plane direction, the outer member 3 is not directly influenced by the vibration and does not vibrate with the same phase and amplitude with the vibrated member 7. That is, in response to the vibration of the vibrated member 7, the inertia force is generated in the outer member 3 in the out-of-plane direction of the vibrated member 7. If the inertia force is generated, the outer member 3 moves relatively in non-contact with respect to the vibrated member 7 in the out-of-plane direction of the vibrated member 7 while generating a phase difference to the rod member 2. Therefore, even if the vibrated member 7 vibrates, the outer member 3 hardly vibrates with the same phase and amplitude with the vibrated member 7. Thus, the rod member 2 and the outer member 3 move while generating the phase difference when the vibration is propagated to the rod member 2, and the damping member 1 compressed and held between the rod member 2 and the outer member 3 distorts in a shear direction, i.e., in the out-of-plane direction of the vibrated member 7 or in the axial direction of the rod member 2. Due to the distortion of the damping member 1, friction is generated in the damping member 1 and the vibration energy vibrating the vibrated member 7 is converted into thermal energy. Because the damping member 1 is in close contact with the both of the rod member 2 and the outer member 3, the friction is liable to be generated by the distortion, and the vibration energy is efficiently converted into the thermal energy. As a result, the vibration of the vibrated member 7 is reduced, and the radiated sound caused by the vibration is reduced. The outer member 3 is required to have a certain degree of weight in order to generate a greater inertia force, and the outer member 3 is desirable to be at least heavier than the damping member 1. It is noted that while the outer member 3 is preferably dispose at a position distant from the vibrated member 7, a vibration-proof member or the like may be interposed between the outer member 3 and the vibrated member 7 as long as it is a soft member not transmitting the vibration of the rod member 2 and the vibrated member 7 to the outer member 3.

Figure 3C:
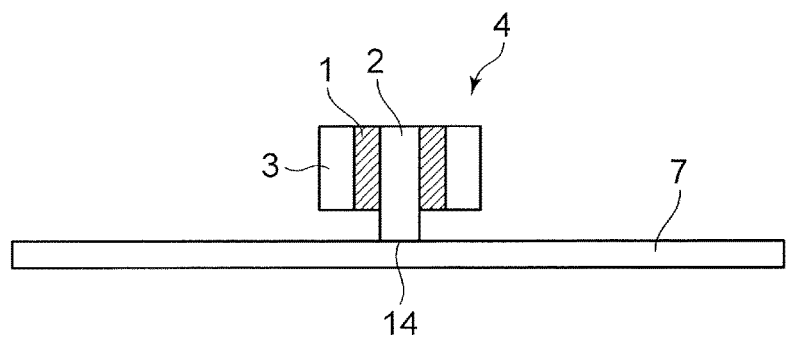
FIG. 3C is a section view of the damping component being differently attached to the vibrated member.

It is noted that the method of attaching the damping component 4 with the vibrated member 7 is not limited to the abovementioned method of coupling through the screw. For instance, a tip 14 of the rod member 2 may be coupled with the vibrated member 7 by means of caulking, welding, bonding, magnetism or the like as shown in FIG. 3C. However, it is necessary to rigidly couple the rod member 2 with the vibrated member 7 so that the rod member 2 vibrates with the same phase and amplitude with the vibration of the vibrated member 7.

Figure 3D:
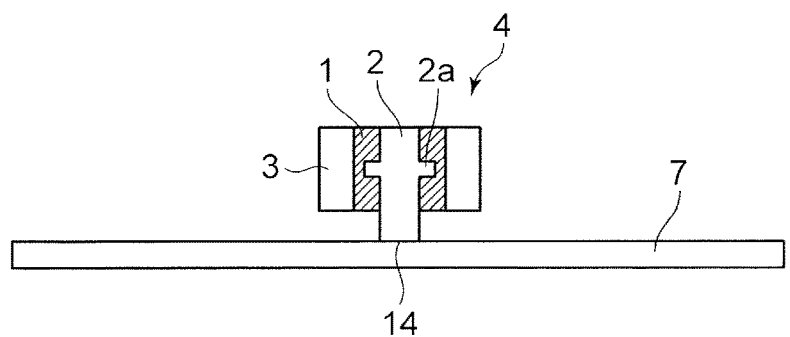
FIG. 3D is a section view of a damping component provided with a retaining portion.

It is noted that the rod member 2 may be provided with a retaining portion 2a formed into a convex or concave shape on a surface of the rod member 2 coming into contact with the compressed damping member 1 as shown in FIG. 3D. That is, in a case when the damping member 1 is pasted to the relatively heavy outer member 3, there is a possibility that the outer member 3 and the damping member 1 fall out of the rod member 2 as it is. Then, the retaining portion 2a is provided to lock the damping member 1 and to prevent the outer member 3 and the damping member 1 from falling out of the rod member 2. This arrangement also brings about such an advantage that a range of contact with the damping member 1 is widened and the abovementioned distortion is more liable to occur. From the aspect that the distortion is more liable to occur, an inner circumferential surface of the vibrated member 7 in contact with the damping member 1 may be formed irregularly. It is noted that the retaining portion 2a may be formed with at least one of the holding portion 3 and the base 2. The retaining portion 2a may be formed such that a cross-section thereof is not only to be rectangular as shown in FIG. 3D, but also to be triangular, polygonal or curved. It is also possible to form a plurality of retaining portions.

Figure 4A:
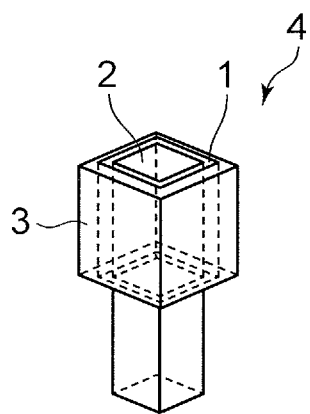
FIG. 4A is a perspective view illustrating another mode of the damping component of the first embodiment.
Figure 4B:
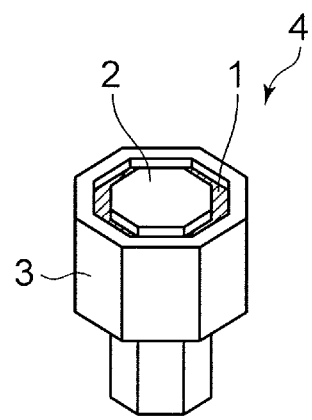
FIG. 4B is a perspective view illustrating a different mode of the damping component of the first embodiment.
Figure 4C:
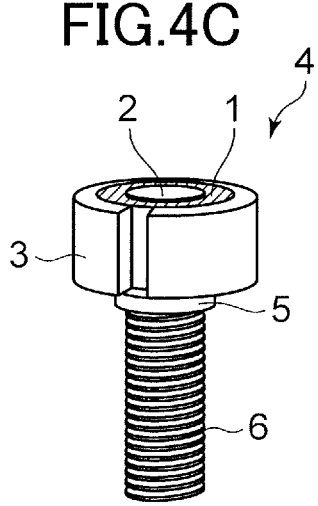
FIG. 4C is a perspective view illustrating a still different mode of the damping component of the first embodiment.
Figure 4D:
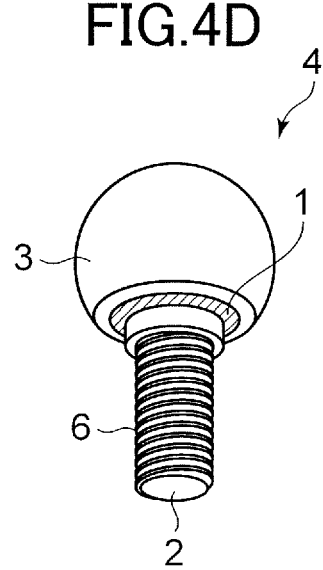
FIG. 4D is a perspective view illustrating another mode of the damping component of the first embodiment.

It is noted that the rod member 2 and the outer member 3 are not limited to be a round cylindrical shape. For instance, the rod member 2 and the outer member 3 may be formed into polygonal cylindrical shapes such as a quadrangular pillar and an octagonal pillar as shown in FIGS. 4A and 4B, or into a plate shape, though not shown. In these cases, because the damping component 4 cannot be coupled with the vibrated member 7 by the screw, the damping component 4 is coupled by the other methods, e.g., caulking, welding, bonding and magnet as described above. The outer member 3 is formed into a polygonal cylindrical shape such as a quadrangle shape and an octagon shape or into a plate-like shape in accordance to an outer shape of the rod member 2. Still further, the outer member 3 is not limited to be endless and may be open-ended such as a letter of C as shown in FIG. 4C. Still further, the outer member 3 may be formed into a hemispherical shape as shown in FIG. 4D. In the case of the outer member 3 whose shape is closed like the hemispherical shape, however, it is necessary to assure a space where the rod member 2 is movable on an extension line of a tip of the rod member 2 within the outer member 3 such that the tip of the rod member 2 does not butt against the outer member 3 during not only when the rod member 2 stands still but also when the rod member 2 vibrates.

Preferably, an outer shape of the rod member 2 is formed so as to agree with an inner shape of the outer member 3 so that the damping member 1 is held tightly and is compressed uniformly.

The inventors conducted experimental study tests on the reducing effect of the radiated sound caused by vibration in a case when the damping component 4 shown in FIG. 1 (or FIG. 4) was used. Then, this experiment will be described with reference to FIGS. 5 through 13. In the experiments, the damping component 4 of about 10 mm in diameter, about 15 mm in height, and about 15 g in weight was used. The damping member 1 used was 1.5 of loss factor before compression, 3 mm in thickness (length in the radial direction), and 1.0 g in weight. The rod member 2 used was a columnar member whose material was SUS304, 5 mm in diameter, 15 mm in length, and 4 g in weight. The outer member 3 was a cylindrical member whose material was SUS304 and 10 g in weight. Then, the damping member 1 was compressed by 500 μm of compression amount (about 17%).

Figure 5:
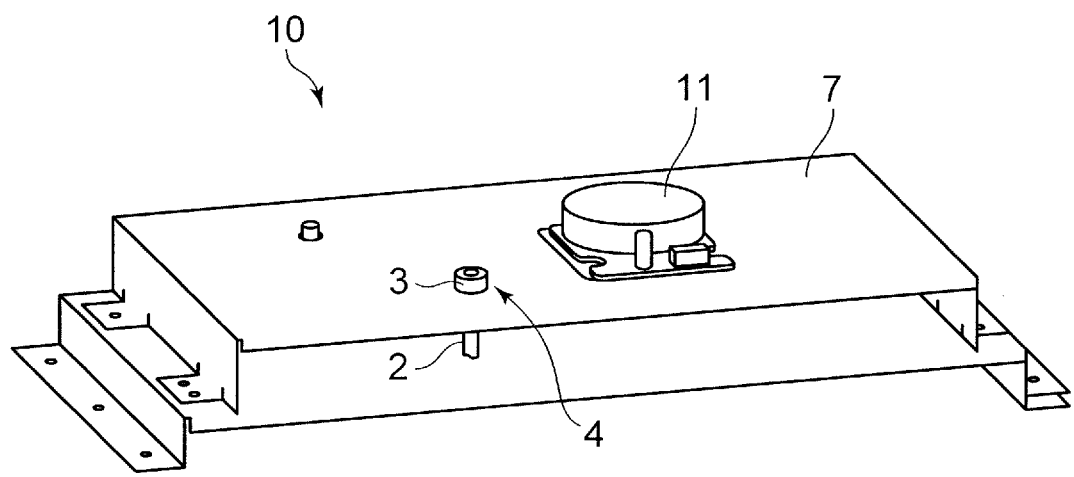
FIG. 5 is a perspective view schematically illustrating a configuration of an experimental simplified driving unit.

FIG. 5 illustrates an experimental simplified driving unit 10 used in the experiment. The experimental simplified driving unit 10 is what simulates a driving unit in which a motor 11, a gear not shown or the like becomes an exciter, and sound pressure level Pa (dB) of radiated sound was measured by a microphone not shown by using Test. Lab manufactured by LMS Co. A frame (corresponds to the vibrated member 7) of the experimental simplified driving unit 10 is formed of a zinc coated steel sheet of 0.8 mm in thickness. The microphone not shown is provided at a position distant by 30 cm above a center of the experimental simplified driving unit 10. It is noted that because A weighting is applied to all of the sound pressure levels Pa (dB) in the present specification, frequency axes of the sound pressure levels indicated in the graphs are represented by ⅓ octave.

Figure 6A:
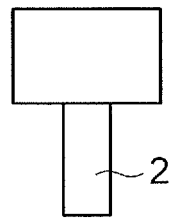
FIG. 6A is a section view illustrating a comparative example.
Figure 6B:
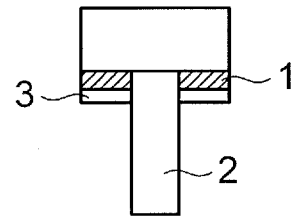
FIG. 6B is a section view illustrating a different comparative example.

In this experiment, overall values (dB) of the sound pressure levels Pa of the radiated sounds were measured also in a case of only the frame without attaching the damping component 4 (denoted as 'ref') and in cases when components to be compared as shown in FIGS. 6A and 6B are attached for comparison. The component shown in FIG. 6A is a weighted member in which a simple weight is provided on the rod member 2, and the component shown in FIG. 6B is a member in which the damping member 1 is disposed in parallel while being compressed in a direction (in a vertical direction in FIG. 6B) orthogonal to an in-plane direction of the frame (the radial direction of the rod member 2). It is noted that the weights of these components including the damping component 4 were equalized to 15 g so that vibration reducing levels are not swayed by differences of their weights. Still further, the damping component 4 or each component described above was set at a position where vibration amplitude of the frame is maximized at a peak frequency of the sound pressure level (see FIG. 10 described later for example).

Figure 7A:
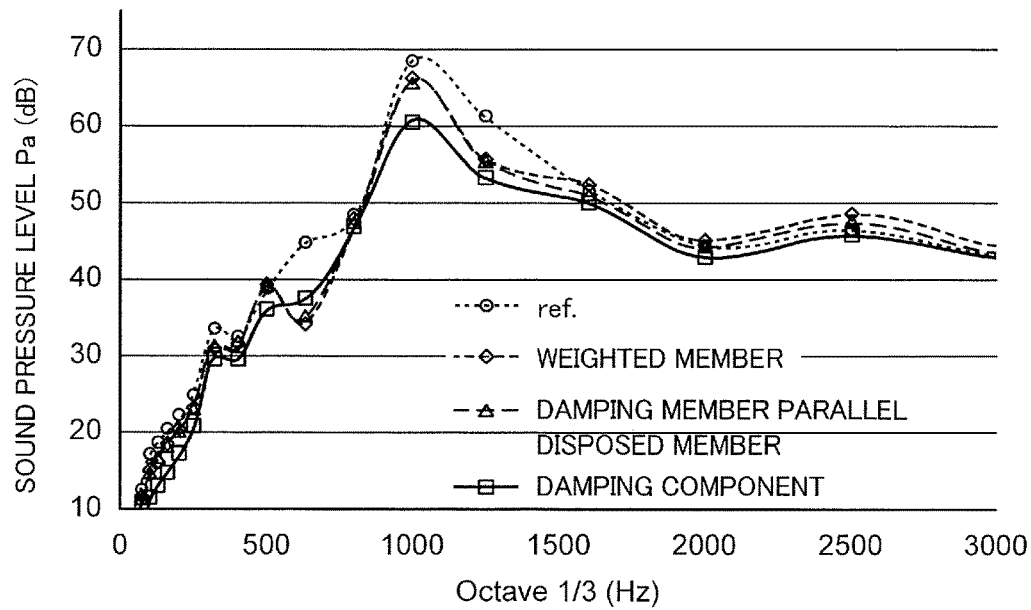
FIG. 7A is a line graph indicating sound pressure levels of radiated sounds of the damping component of the first embodiment and of the comparative example.

FIG. 7A is a graph indicating the sound pressure levels of the radiated sounds. As it is apparent from FIG. 7A, the damping component 4 can reduce not only the radiated sound of certain one frequency band but also the radiated sounds of wide frequency bands as compared to the case of only the sheet metal frame and of the other components to be compared.

Figure 7B:
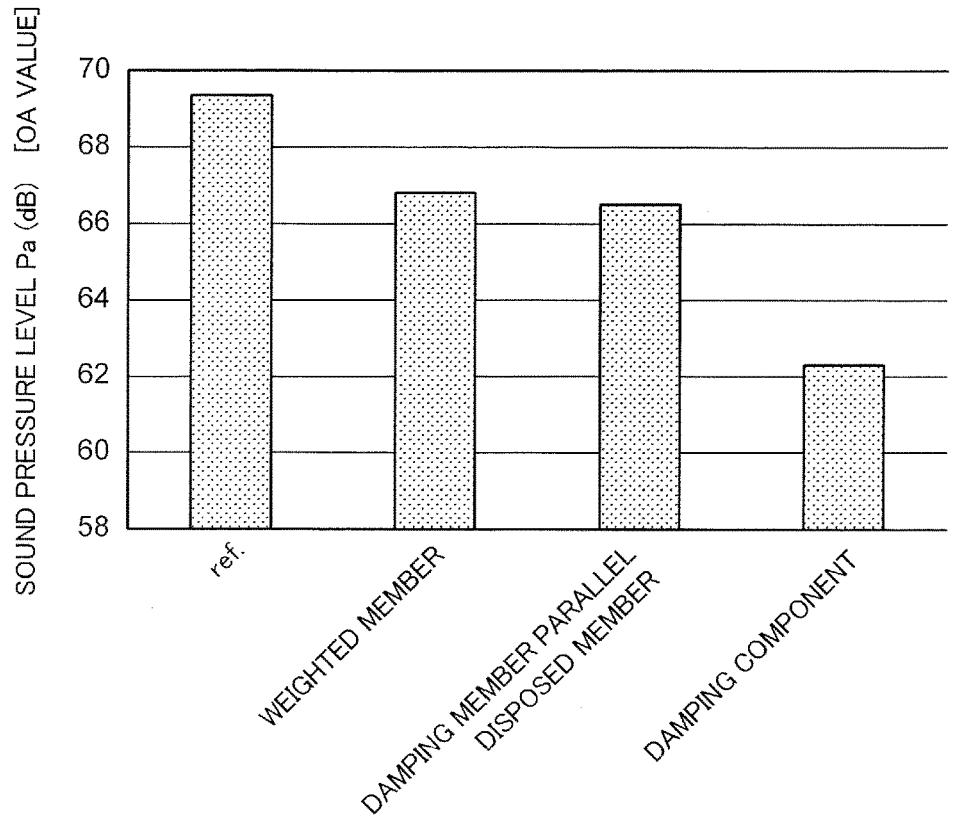
FIG. 7B is a bar graph indicating overall values of the sound pressure levels of the damping component and of the comparative examples.

FIG. 7B indicates the overall values (dB) of the sound pressure levels Pa of the case of only the sheet metal frame and of the cases when the respective components were attached. As compared to the case of only the sheet metal frame (denoted simply as 'ref'), the sound pressure level was reduced by 2.6 dB by the weighted member shown in FIG. 6A, by 2.9 dB by the member in which the damping member is disposed in parallel shown in FIG. 6B, and by 7.1 dB by the damping component 4. Still further, when vibration acceleration was measured at certain one point of the sheet metal frame as the vibrated member 7, while it was 9.3 m/s$^2$ by the reference, it was 7.5 m/s$^2$ when the damping component 4 was set. That is, the vibration acceleration was reduced. It was thus confirmed that the damping component 4 reduces the vibration and suppresses the radiated sound.

That is, the weighted member shown in FIG. 6A can reduce the sound pressure level more than the reference by an effect of the weight thereof. However, because the weighted member includes no damping member, it is unable to convert vibration energy to thermal energy. Therefore, the overall value (dB) of the sound pressure level Pa does not drop. Because the component in which the damping member is disposed in parallel shown in FIG. 6B brings about the vibration reducing effect slightly more than the weighted member in FIG. 6A. However, because the vibration energy propagates mainly only to the rigid rod member 2 and does not propagate to the damping member 1 so much, the damping member 1 is not distorted so much. As a result, the efficiency of the damping member 1 converting the vibration energy to thermal energy drops.

As compared to these components, the vibration of the vibrated member 7 is efficiently propagated to the rod member 2 because the rod member 2 of the damping component 4 shown in FIG. 1 is attached to the vibrated member 7 such that the rod member 2 can vibrate in the same directions together with the vibrated member 7 as described above. Still further, the damping member 1 is compressively held by the outer member 3 at the first end side of the rod member 2. The outer member 3 is a member having the certain degree of weight and being not in contact with any other member except the damping member 1 being compressed by the outer member 3. Therefore, when the vibration is transmitted to the rod member 2, the rod member 2 and the outer member 3 move in the out-of-plane direction of the vibrated member 7 while generating a phase difference. As a result, the damping member 1 compressed between the rod member 2 and the outer member 3 distorts in the shear direction and the vibration energy is efficiently converted into thermal energy due to the friction. Thus, the vibration is reduced and the sound pressure level drops by the damping component 4 as compared not only to the case of only the sheet metal frame but also to the respective components shown in FIGS. 6A and 6B. Then, it can be said that the damping component 4 more efficiently reduces the vibration of the vibrated member 7 from these facts.

Figure 8A:
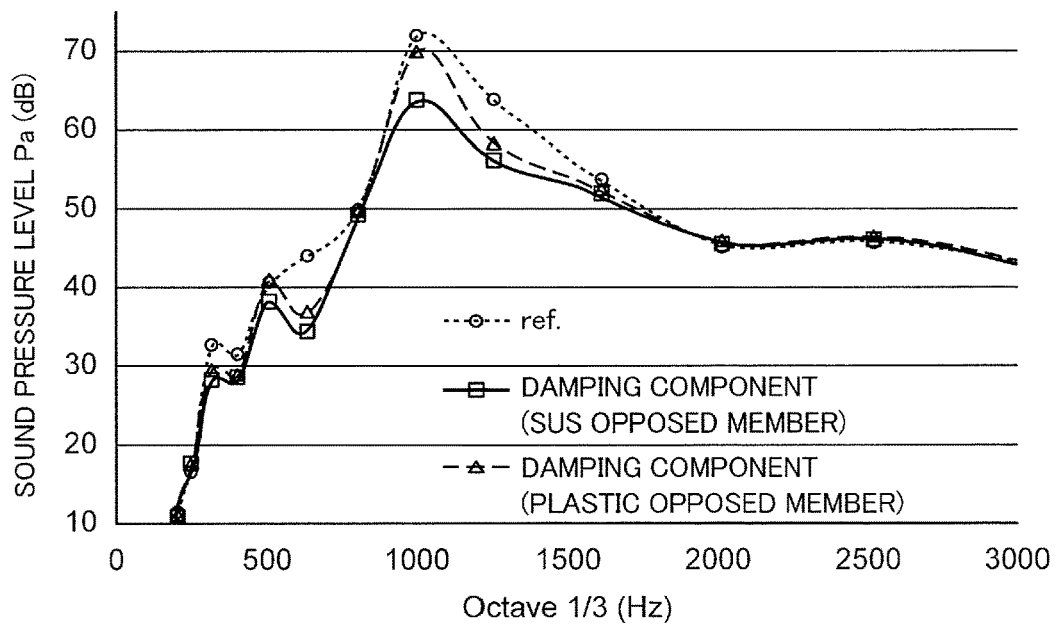
FIG. 8A is a line graph indicating sound pressure levels of radiated sounds when materials of opposite members are different.
Figure 8B:
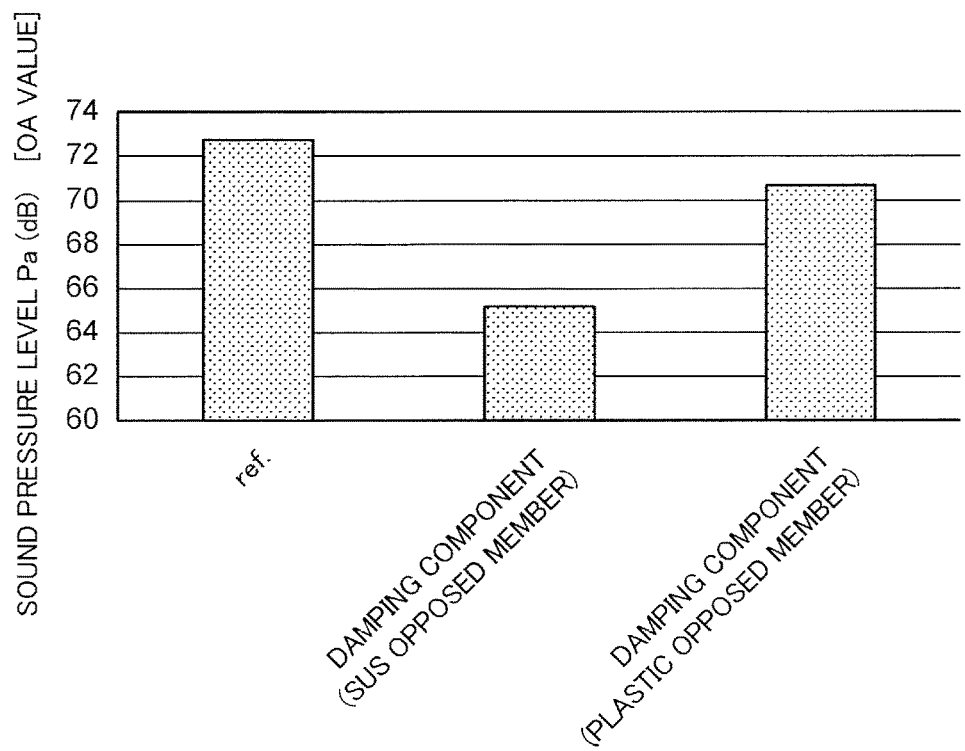
FIG. 8B is a bar graph indicating the overall values of the sound pressure levels of the radiated sounds when the materials of the opposite members are different.

As already described above, the outer member 3 is required to have the certain degree of weight such that the outer member 3 moves by the inertia force caused by its own weight. FIG. 8A shows sound pressure levels Pa (dB) of the radiated sounds in cases when the material of the outer member 3 is SUS304 and 10 g in weight and when the material of the outer member 3 is plastic and is 3 g in weight, and FIG. 8B shows overall values (dB) of the sound pressure levels Pa of the radiated sounds. It is noted that the other configurations such as compression amount of the damping member 1 are the same as described above, except that the material (weight) of the outer member 3 is different.

As it is apparent from FIG. 8A, the damping component 4 including the outer member 3 made of SUS304 whose mass is large can reduce the radiated sound in the wide frequency bands as compared to the case of only the sheet metal frame and the damping component including the outer member 3 made of plastic whose mass is small.

It can be also seen from the overall values (dB) of the sound pressure levels Pa indicated in FIG. 8B that the sound pressure level of the damping component 4 including the outer member 3 made of the SUS304 whose mass is large (heavy) is smaller than that of the damping component having the outer member 3 made of plastic whose mass is small (light). That is, in the case where the outer member 3 is made of plastic, because the outer member 3 is light even though it compresses the damping member 1, the outer member 3 moves with the same phase and amplitude with the rod member 2 when the vibration is propagated to the rod member 2. In such a case, because the distortion in the shear direction of the damping member 1 between the outer member 3 and the rod member 2 becomes small, the efficiency of converting the vibration energy to thermal energy by the friction drops. In the case of the outer member 3 made of SUS304, however, because the outer member 3 is heavier than the one made of plastic, the outer member 3 and the rod member 2 move while generating phase difference when the vibration is transmitted to the rod member 2. Because the distortion in the shear direction of the damping member 1 between the outer member 3 and the rod member 2 becomes large, the efficiency of converting the vibration energy to thermal energy by the friction is improved. Due to such reason, the outer member 3 is required to have the certain degree of weight and is desirable to be at least heavier than the damping member 1.

Figure 9:
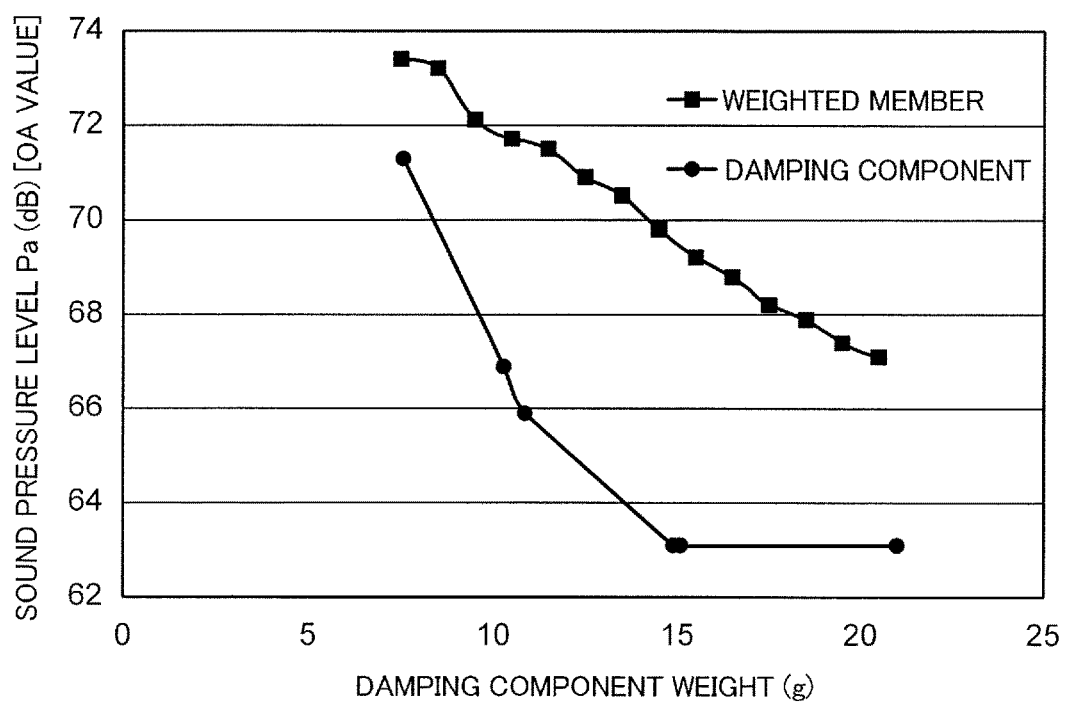
FIG. 9 is a line graph indicating sound pressure levels of radiated sounds when weights of the opposite members are differentiated.

FIG. 9 shows overall values (dB) of sound pressure levels Pa of radiated sounds when the weight of the outer member 3 is changed. Specifically, the weight of the weighted member shown in FIG. 6A was changed for comparison. An axis of abscissa in FIG. 9 represents the weight (g) of the whole component, not the weight (g) of the weight or of the outer member 3. As it is apparent from FIG. 9, the sound pressure level drops considerably when the outer member 3 is heavier in the case of the damping component 4. That is, the vibration reducing effect is enhanced. Meanwhile, although the sound pressure level is inclined to drop by the effect of weight in the case of the weighted member, no prominent vibration reducing effect is seen as compared to the damping component 4.

Figure 10A:
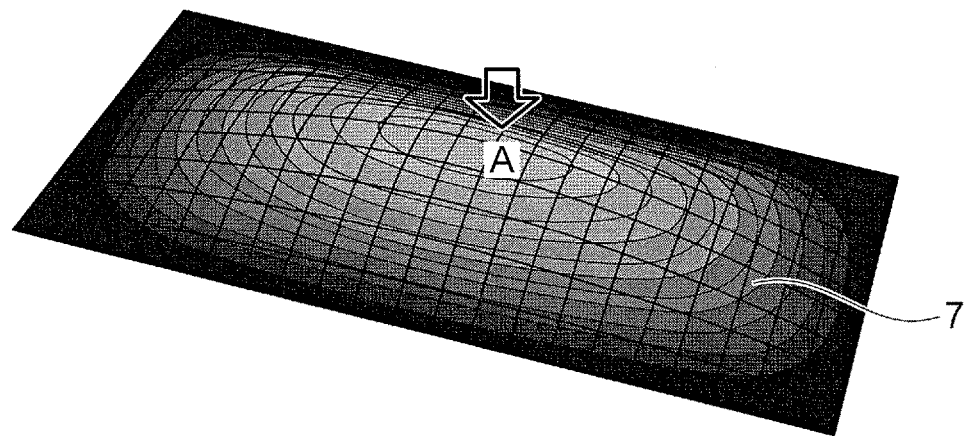
FIG. 10A is a chart illustrating a vibration shape and an attachment position of the damping component.
Figure 10B:
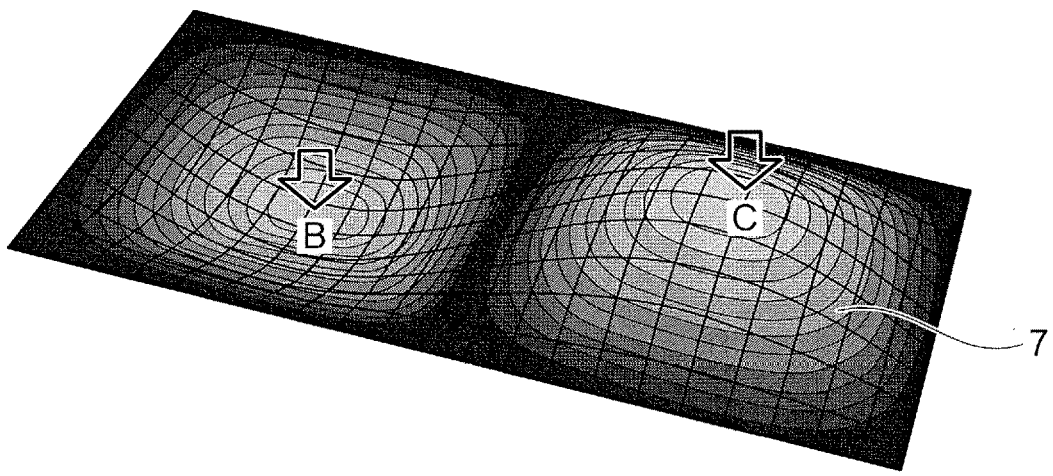
FIG. 10B is a chart illustrating vibration shapes whose phases are different and attachment positions of the damping components.

It is possible to obtain a large vibration reducing effect by attaching the damping component 4 at a position where the vibration amplitude of the vibrated member 7 is large. It is desirable to find a vibration shape of the vibrated member 7 in the peak frequency of the sound pressure level through experiment or simulation and to attach the damping component 4 at the position where the vibration amplitude is large in the experiment or simulation in order to reduce the radiated sound more. Here, FIGS. 10A and 10B show simulation results of the vibration shapes appearing on the vibrated member 7 to which the damping component 4 is not attached when the exciter is driven by the peak frequency (1000 Hz in FIG. 7A) of the sound pressure level. FIG. 10A shows a case when the vibration shape is in-phase and FIG. 10B shows a case when the vibration shape is inverse phase. Positions A, B and C in FIGS. 10A and 10B are positions where the vibration amplitude is maximized among positions where the vibration amplitude on the surface of the vibrated member 7 is larger than an average value in the state in which the damping component 4 is not attached.

In the case when the vibration shape shown in FIG. 10A is in-phase, the damping component 4 may be attached only one position indicated by an arrow A in FIG. 10A where the vibration amplitude is large. Meanwhile, in the case when the vibration shape shown in FIG. 10B is inverse phase, the damping components 4 may be attached at two positions indicated by arrows B and C in FIG. 10B where the vibration amplitude is large in order not to collapse a balance of cancellation of the sounds generated at these two positions that cancel with each other and do not contribute to the sound pressure level of the radiated sound. If the balance of the cancellation of the sounds is collapsed, e.g., in a case when the damping component 4 is attached to either one position, the sound pressure level of the radiated sound may possibly become high. Therefore, it is desirable to attach the damping components 4 at two positions indicated by the arrows B and C in the case when the vibration shapes are inverse phase as shown in FIG. 10B.

Figure 11A:
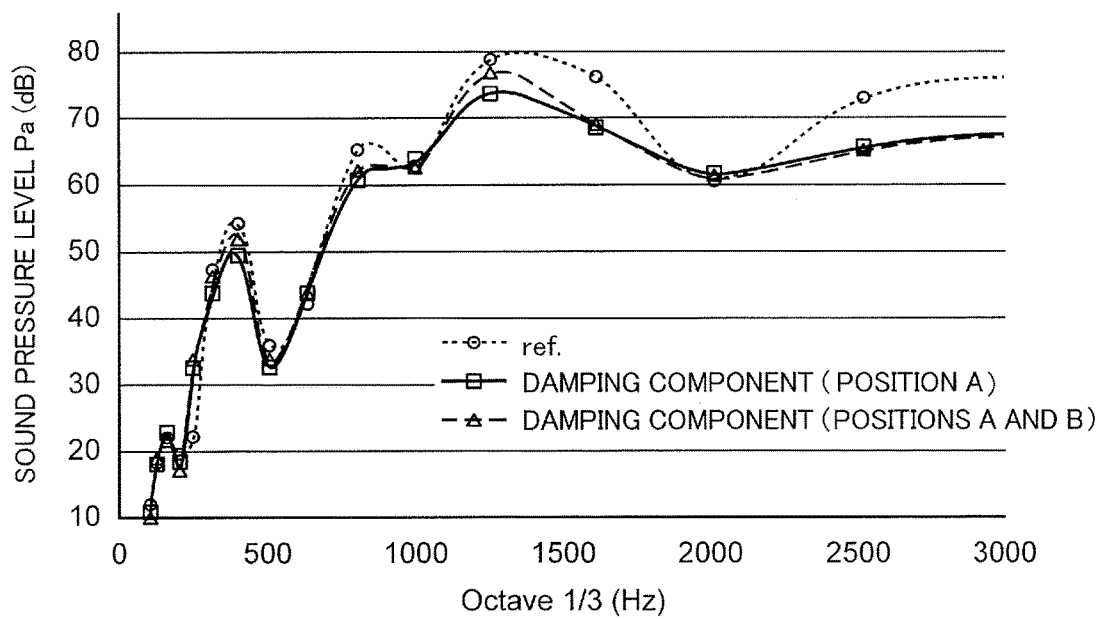
FIG. 11A is a line graph indicating sound pressure levels of radiated sounds when attachment positions are different.
Figure 11B:
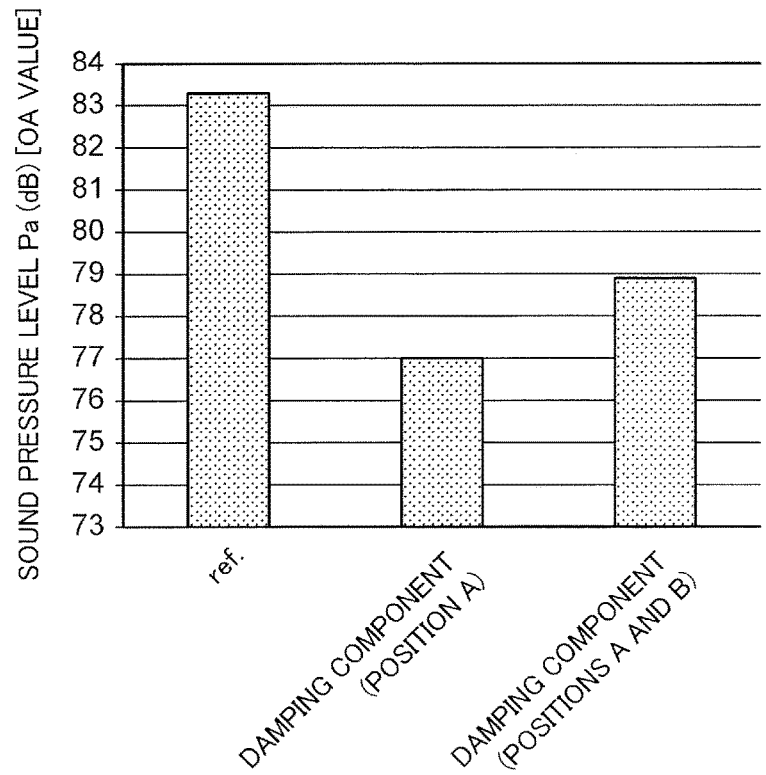
FIG. 11B is a bar graph indicating the overall values of the sound pressure levels of the radiated sounds when the attachment positions are different.

FIG. 11A indicates sound pressure levels Pa (dB) of radiated sounds in a case when the damping component 4 is attached at the position A in FIG. 10A or the positions B and C in FIG. 10B where the vibration amplitude is large and in a case when the damping component 4 is attached at a position where the vibration amplitude is relatively small. As it is apparent from FIG. 11A, it is possible to reduce the radiated sounds in a wide frequency band in the case when the damping component 4 is attached at the position where the vibration amplitude is large as compared to the case of only the sheet metal frame and when the damping component 4 is attached at the position where the vibration amplitude is small. It is also apparent by comparing overall values (dB) of the sound pressure levels Pa shown in FIG. 11B that it is possible to reduce the overall values of the sound pressure level by about 2 dB in the case when the damping component 4 is attached at the position where the vibration amplitude is large as compared to the case when the damping component 4 is attached at the position where the vibration amplitude is small.

It is noted that the radiated sound can be reduced in a wide frequency band even if the damping component 4 is attached at a position (vibration node part) where vibration amplitude of the vibrated member 7 is small as compared to the case of only the sheet metal frame. However, propagation of the vibration to the rod member 2 becomes small and the vibration reducing effect is hardly obtained (which is more influential) in the case when the damping component 4 is attached at the position where the vibration amplitude is small. Therefore, it is desirable not to attach the damping component 4 at the position where the vibration amplitude is small.

The inventors conducted experiments to verify whether or not a more significant vibration reducing effect can be obtained in a case when the damping component 4 shown in FIG. 1 was attached to the vibrated member 7 than a case when the damping member 1 is pasted on the whole surface of the vibrated member 7. FIG. 12 illustrates an experimental simplified driving unit used to verify the vibration reducing effect.

Figure 12A:
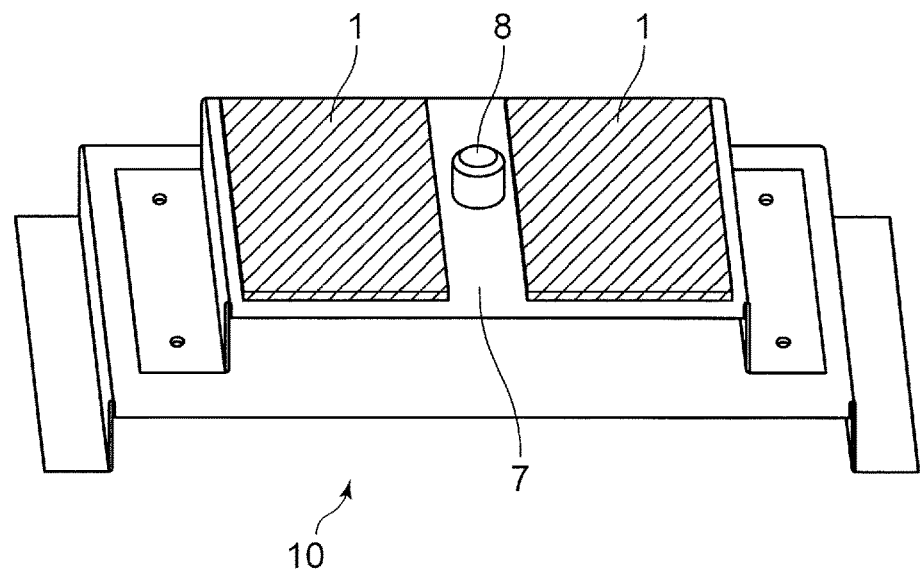
FIG. 12A is a perspective view schematically illustrating a configuration of an experimental simplified driving unit.
Figure 12B:
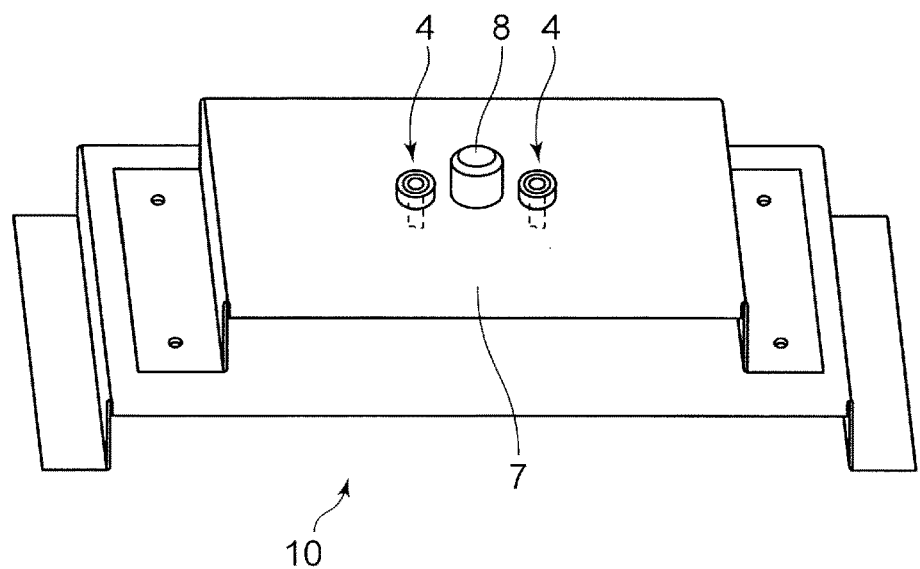
FIG. 12B is a perspective view schematically illustrating another configuration of the experimental simplified driving unit.

The experimental simplified driving unit 10 shown in FIGS. 12A and 12B are configured such that an exciter 8 is attached to the vibrated member 7 and a burst random signal of a frequency band from 50 Hz to 5 KHz is given to the exciter 8 to vibrate the vibrated member 7. Sound pressure levels Pa (dB) of radiated sounds were measured in a case when the damping member 1 is pasted to the whole surface of the vibrated member 7 as shown in FIG. 12A and in a case when two damping components 4 are attached to the vibrated member 7 as shown in FIG. 12B. A microphone not shown measuring the sound pressure levels of the radiated sounds was installed at a position above the center of the vibrated member 7 distant by 30 cm.

Figure 13A:
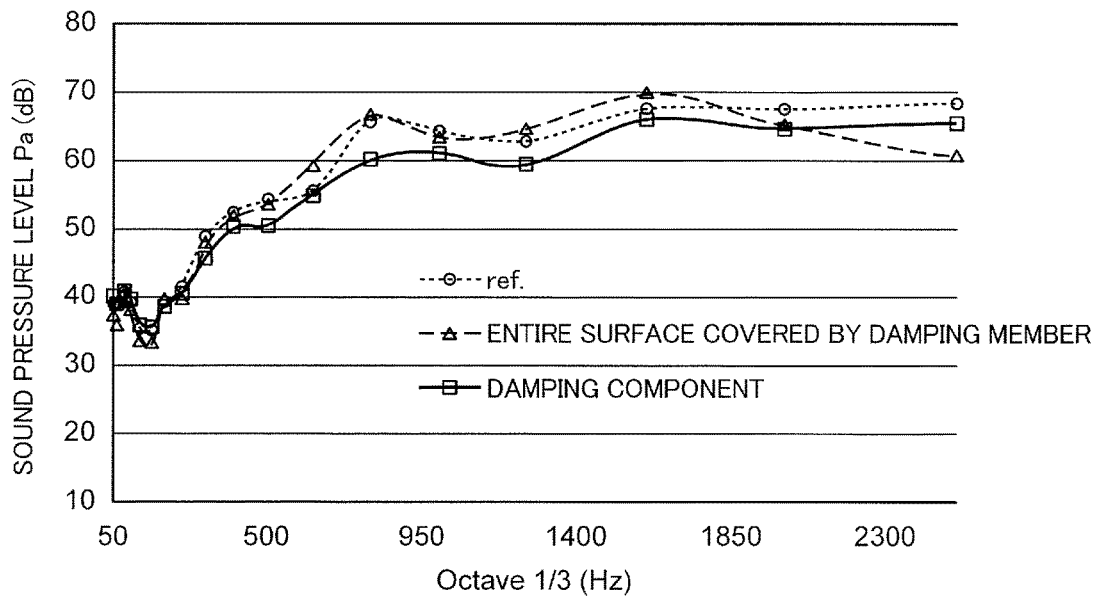
FIG. 13A is a line graph indicating sound pressure levels of radiated sounds when a damping member is pasted over an entire surface of a vibrated member and when the damping component of the first embodiment is attached to the vibrated member.
Figure 13B:
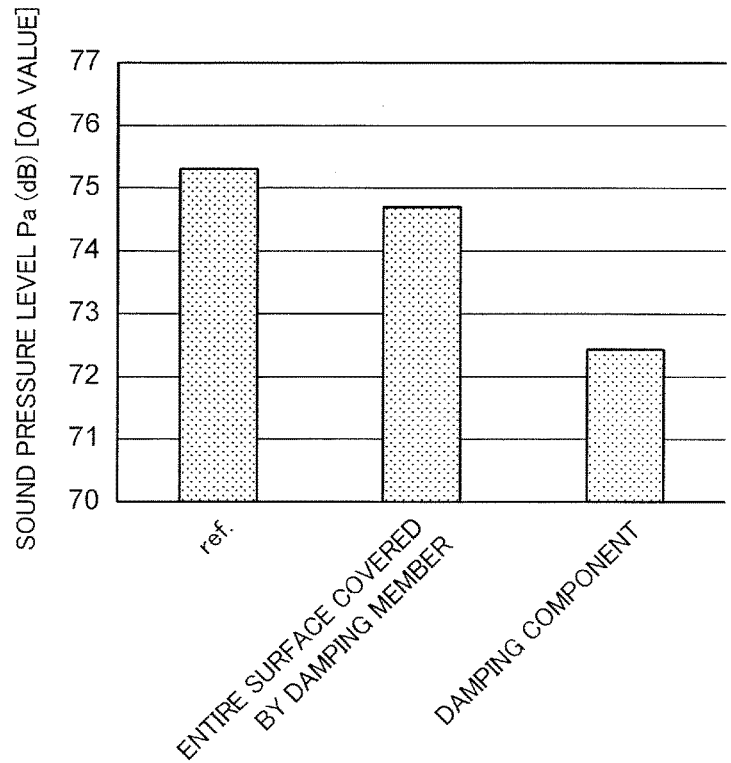
FIG. 13B is a bar graph indicating overall values of the sound pressure levels of the radiated sounds when the damping member is pasted over the entire surface of the vibrated member and when the damping component of the first embodiment is attached to the vibrated member.

FIGS. 13A and 13B are graphs showing results of the experiments conducted by using the experimental simplified driving units 10 shown in FIGS. 12A and 12B. FIG. 13A shows sound pressure levels Pa (dB) of radiated sounds in cases when the damping members 1 are pasted to the whole surface of the vibrated member 7 shown in FIG. 12A (prior-art example) and when the two damping components 4 shown in FIG. 12B are attached. As it is apparent from FIG. 13A, it is possible to reduce the radiated sound in a wide frequency band when the damping components 4 are attached to the vibrated member 7 as compared to the cases of only the sheet metal frame (ref) and when the damping members 1 are pasted to the whole surface of the vibrated member 7. It is also apparent by comparing overall values (dB) of the sound pressure levels (Pa) shown in FIG. 13B that it is possible to reduce the sound pressure level by 0.6 dB when the damping member 1 is pasted to the whole surface of the vibrated member 7 as compared to the case of only the sheet metal frame. Meanwhile, it is possible to reduce the sound pressure level by 2.8 dB when the damping component 4 is attached to the vibrated member 7 as compared to the case of only the sheet metal frame. As described above, it is possible to obtain a large vibration reducing effect by the damping component 4, even if only a small amount of damping member 1 is used as compared to a conventional one (about 2% of an amount of the damping member 1 required in pasting on the whole surface for example), as compared to not only the case of only the sheet metal frame but also the case of pasting the damping member 1 on the whole surface of the vibrated member 7.

Second Embodiment

Figure 14A:
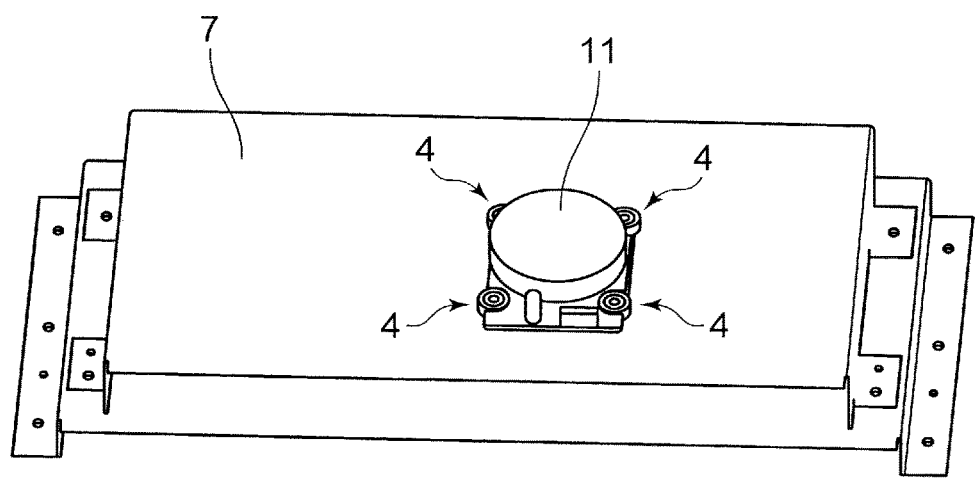
FIG. 14A is a perspective view schematically illustrating a damping structure of a second embodiment.
Figure 14B:
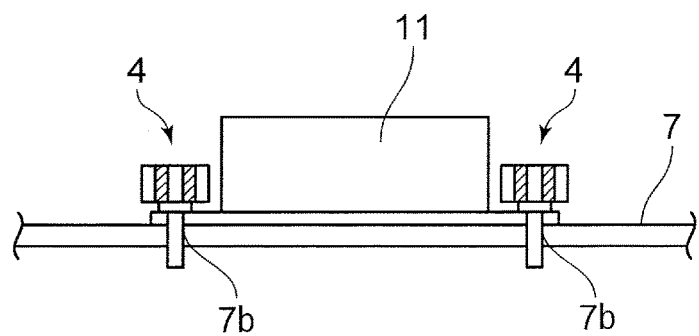
FIG. 14B is a section view schematically illustrating the damping structure of a second embodiment.

A second embodiment of the invention will be described with reference to FIGS. 14 through 21. A damping structure shown in FIGS. 14A and 14B is what a motor 11, i.e., an exciter, is mounted to the vibrated member 7 by the damping components 4 described above. Here, the damping components 4 are screwed at four corners of the motor 11. Because the damping component 4 is the same with what has been described with reference to FIGS. 1 and 2, an explanation thereof will be omitted here. The motor 11 is mounted to the vibrated member 7 by providing female screws at mount positions 7b of the vibrated member 7 where the motor 11 is to be mounted and by screwing the rod members 2 having the male screws shown in FIG. 1 into the female screws. It is a matter of course that the method for mounting the motor 11 to the vibrated member 7 is not limited to such screw coupling and another mounting method may be adopted. It is possible to reduce vibration in a vicinity of the motor 11 by mounting the motor 11, i.e., the exciter, by means of the damping components 4. Therefore, it is possible to reduce radiated sound of the vibrated member 7 even if the vibration generated by the motor 11 spreads over the entire surface of the vibrated member 7.

Figure 15A:
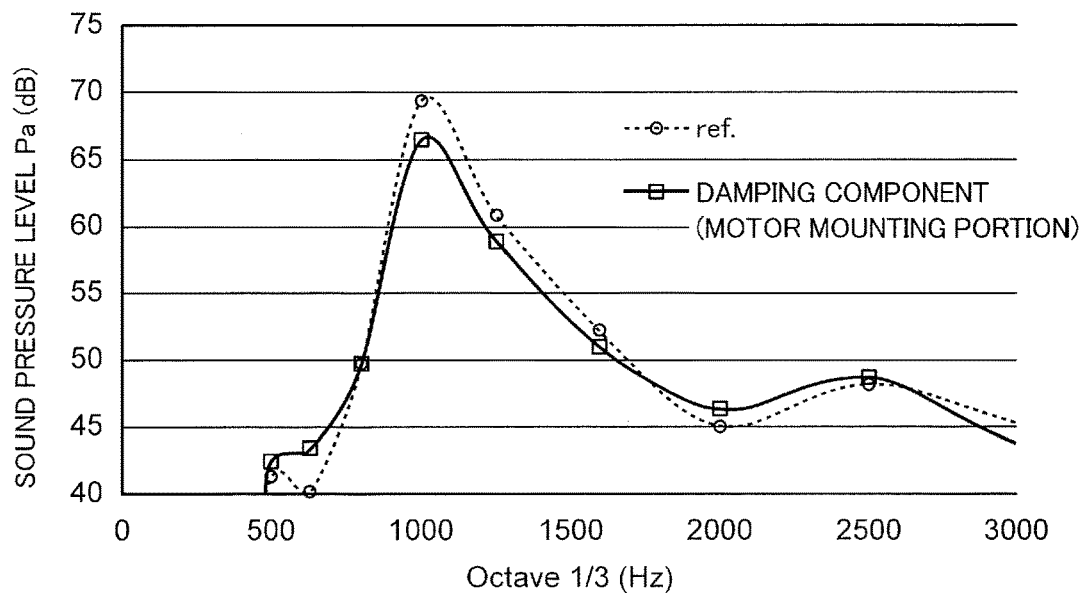
FIG. 15A is a line graph indicating sound pressure levels of radiated sounds of the damping structure shown in FIG. 14A and of a comparative example.
Figure 15B:
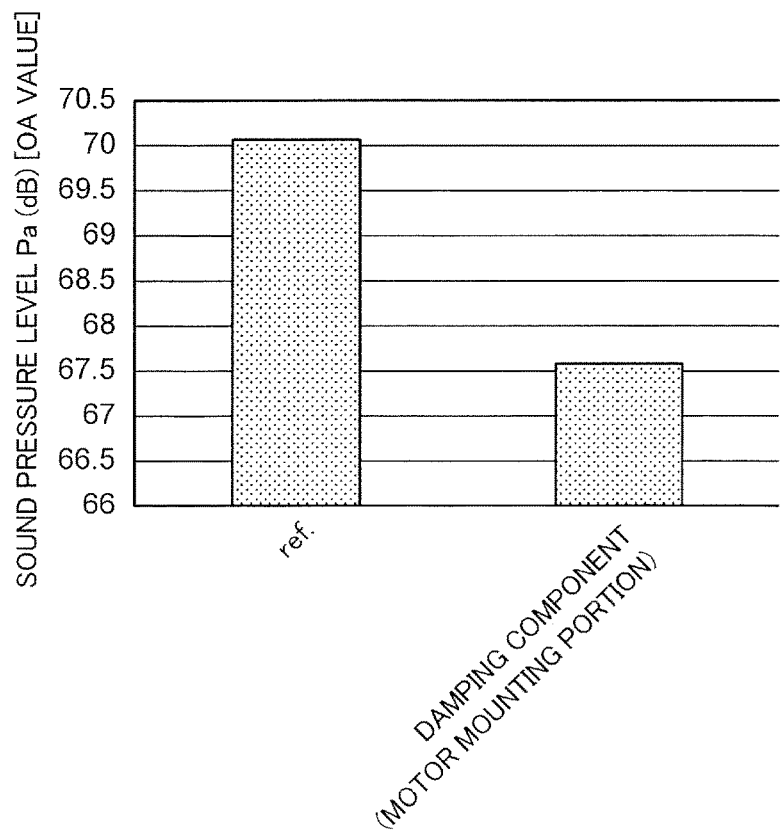
FIG. 15B is a bar graph indicating overall values of the sound pressure levels of the radiated sounds of the damping structure shown in FIG. 14A and of the comparative example.

The inventors conducted experimental study tests on the reducing effect of the radiated sound caused by vibration of the damping structure shown in FIG. 14. FIG. 15A shows sound pressure levels Pa (dB) of the radiated sounds caused in the case when the motor 11 is mounted to the vibrated member 7 by means of ordinary screws (ref) and in the case when the motor 11 is mounted to the vibrated member 7 by means of the damping components 4 (see FIGS. 14A and 14B). As it is apparent from FIG. 15A, it is possible to reduce the radiated sound in a wide frequency band when the motor 11 was mounted by means of the damping components 4 as compared to the case (ref) when the motor 11 was mounted by means of the ordinary screws. It is also apparent by comparing overall values (dB) of the sound pressure levels Pa shown in FIG. 15B that it is possible to reduce the sound pressure level by 2.5 dB when the motor 11 was mounted by means of the damping components 4 as compared to the case when the motor 11 was coupled by means of the conventional screws.

Figure 16A:
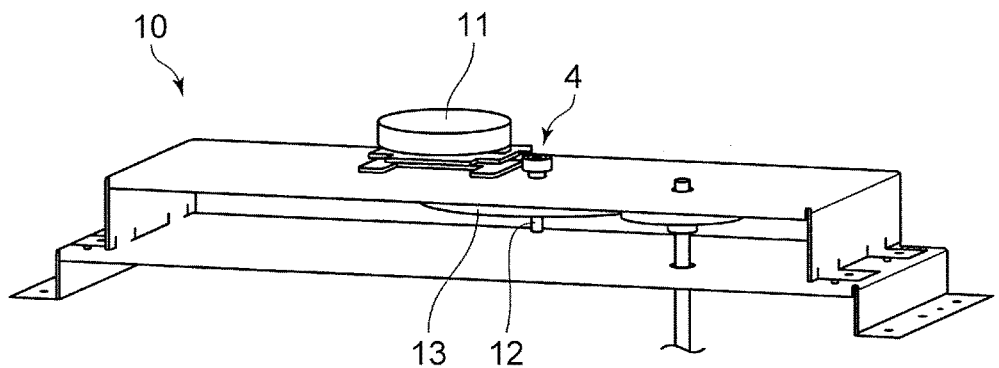
FIG. 16A is a perspective view schematically illustrating a damping structure in which the damping component is attached to an idling gear shaft.
Figure 16B:
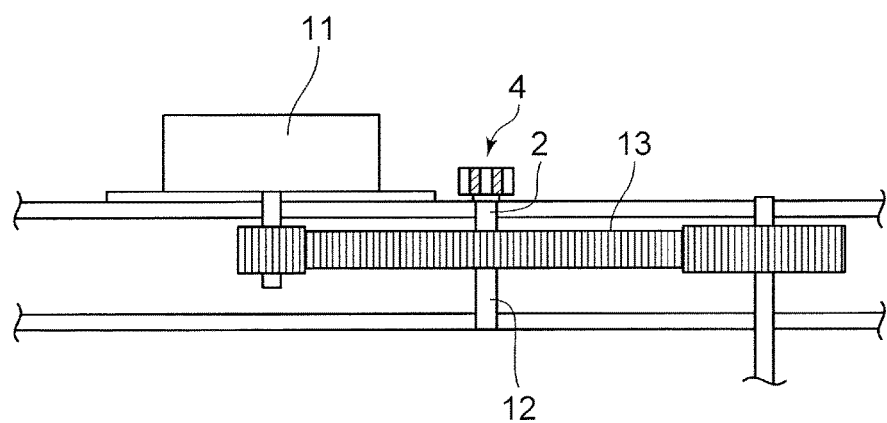
FIG. 16B is a section view schematically illustrating the damping structure in which the damping component is attached to the idling gear shaft.

A damping structure shown in FIGS. 16A and 16B is what an idling gear shaft 12, i.e., an exciter, is mounted by the damping component 4 described above. That is, the damping component 4 is provided at a first end part of the idling gear shaft 12. The idling gear shaft 12 is a fixed shaft rotatably holding an idling gear 13, i.e., a rotator, transmitting a rotational driving force of the motor 11, i.e., a driving portion, to a driven gear and is fixed to the vibrated member 7 so as not rotate by itself. In this case, a female screw-shaped mounting hole not shown is provided at a tip portion of the idling gear shaft 12 mounted to the vibrated member 7, and the rod member 2 having the male screw shown in FIG. 1 is screwed into the female screw. It is of course possible to couple them not by the screw coupling but by another method. It is possible to reduce the vibration in a vicinity of the idling gear shaft 12 by mounting the idling gear shaft 12, i.e., the exciter, by means of the damping component 4. Therefore, even if the vibration generated by the idling gear shaft 12 spreads over the whole surface of the vibrated member 7, it is possible to reduce the radiated sound from the vibrated member 7.

Figure 17A:
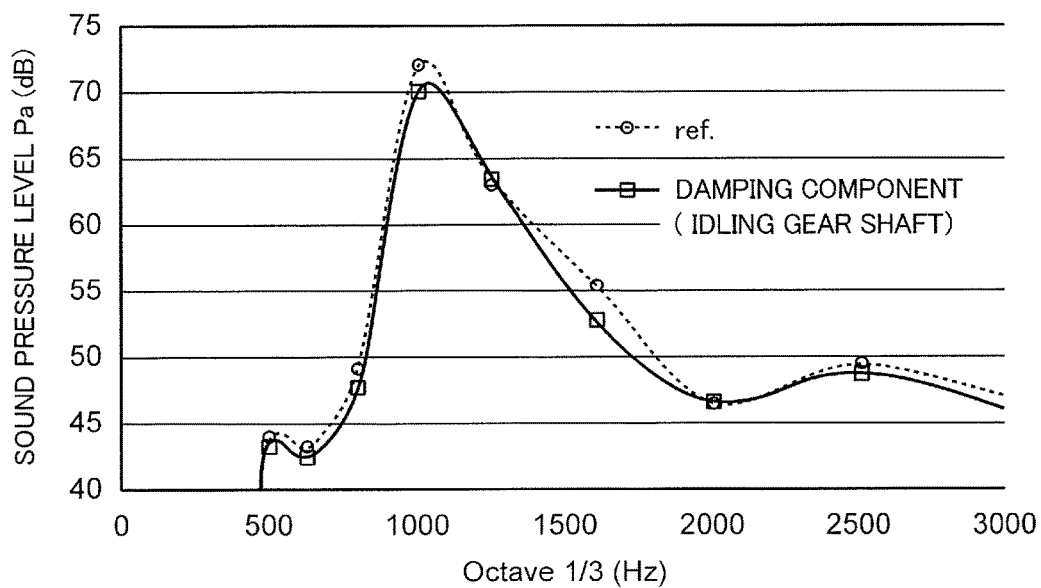
FIG. 17A is a line graph indicating sound pressure levels of radiated sounds of the damping structure shown in FIG. 16A and of a comparative example.
Figure 17B:
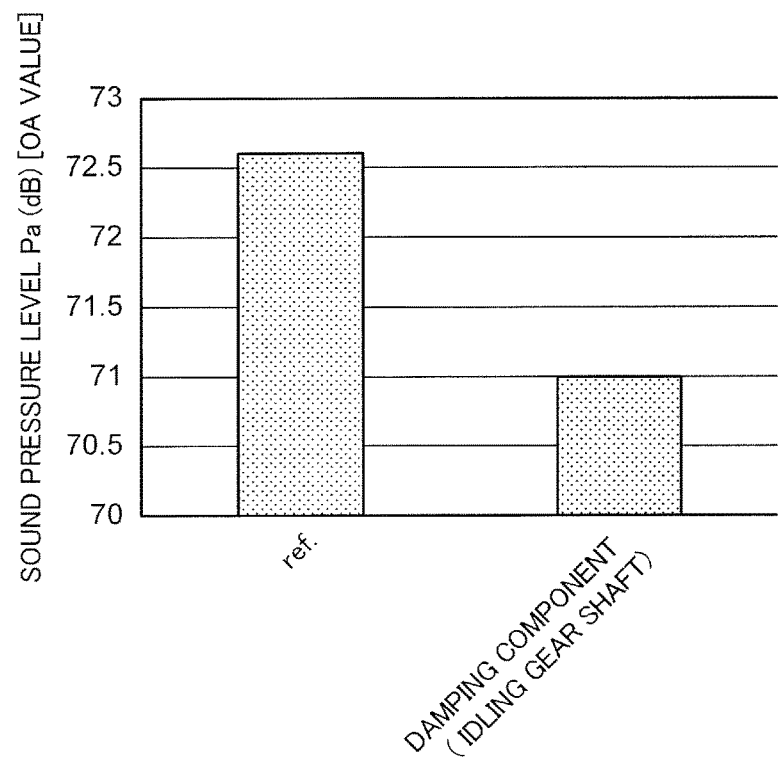
FIG. 17B is a bar graph indicating overall values of the sound pressure levels of the radiated sounds of the damping structure shown in FIG. 16A and of the comparative example.

The inventors conducted experimental study tests on the reducing effect of the radiated sound caused by vibration of the damping structure shown in FIG. 16. FIG. 17A shows sound pressure levels Pa (dB) of the radiated sounds caused in the case when the idling gear shaft 12 is mounted to the vibrated member 7 by an ordinary screw (ref) and in the case when the idling gear shaft 12 is mounted to the vibrated member 7 by the damping component 4 (see FIGS. 16A and 16B). As it is apparent from FIG. 17A, it is possible to reduce the radiated sound in a wide frequency band when the idling gear shaft 12 was mounted by means of the damping component 4 as compared to the case (ref) when the idling gear shaft 12 was mounted by the ordinary screws. It is also apparent by comparing overall values (dB) of the sound pressure levels Pa shown in FIG. 17B that it is possible to reduce the sound pressure level by 1.6 dB when the idling gear shaft 12 was mounted by means of the damping component 4 as compared to the case when the idling gear shaft 12 was mounted by the conventional screws A damping structure shown in 18A and 18B is what the same damping component 4 is mounted at an attachment position 7c (see FIG. 10A for example) where vibration amplitude of the vibrated member 7 is large after mounting the motor 11 on the vibrated member 7 by means of the damping components 4 described above. In this case, because the vibration in the vicinity of the motor 11 can be reduced by the damping components 4, it is possible to reduce the radiated sound of the vibrated member 7 even if the vibration caused by the motor 11 spreads over the whole surface of the vibrated member 7. Still further, even if the vibration spreads over the entire surface of the vibrated member 7, the vibration is reduced further by the damping component 4 attached at the position where the vibration amplitude is large.

Figure 18A:
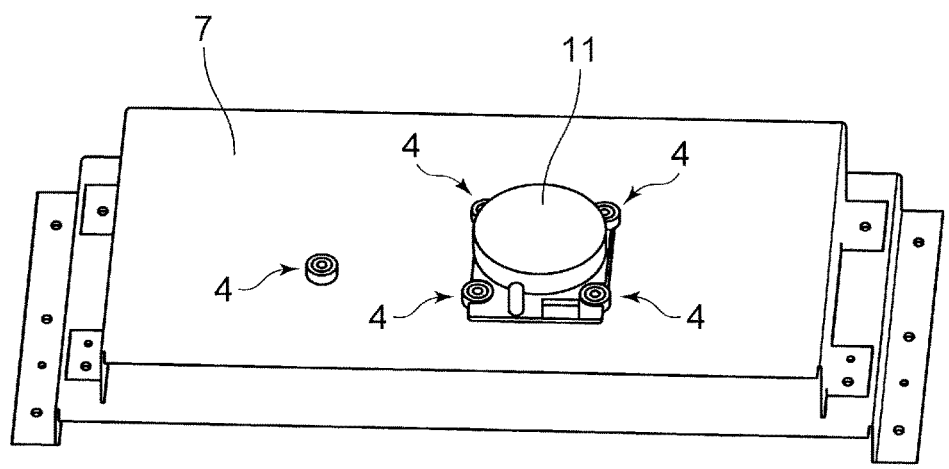
FIG. 18A is a perspective view schematically illustrating a damping structure in which the damping component is attached to a vibratory surface of a vibrated member together with a motor.
Figure 18B:
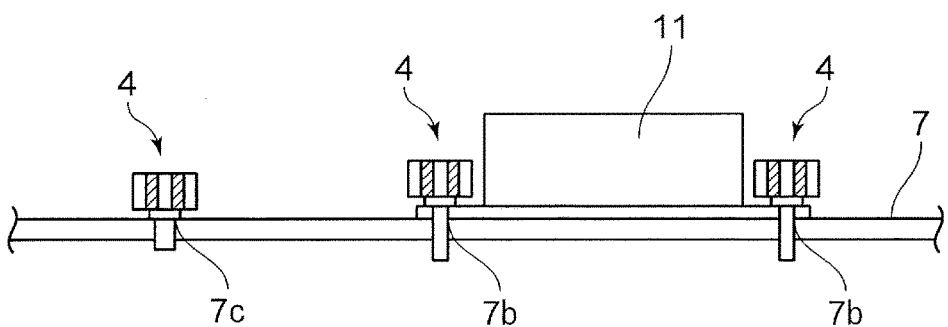
FIG. 18B is a schematic section view of the damping structure shown in FIG. 18A.
Figure 19A:
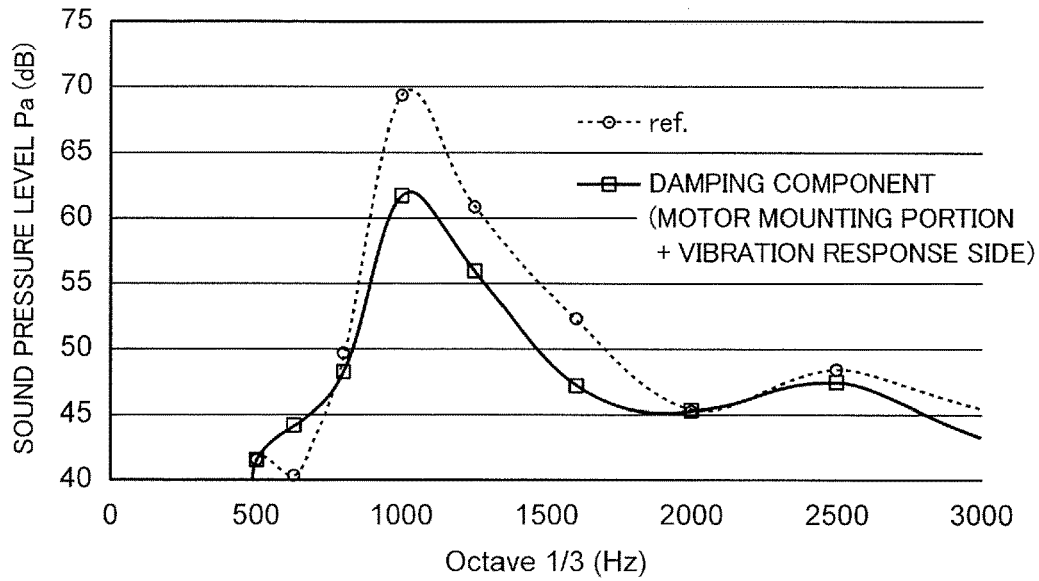
FIG. 19A is a line graph indicating sound pressure levels of radiated sounds of the damping structure shown in FIG. 18A and of a comparative example.
Figure 19B:
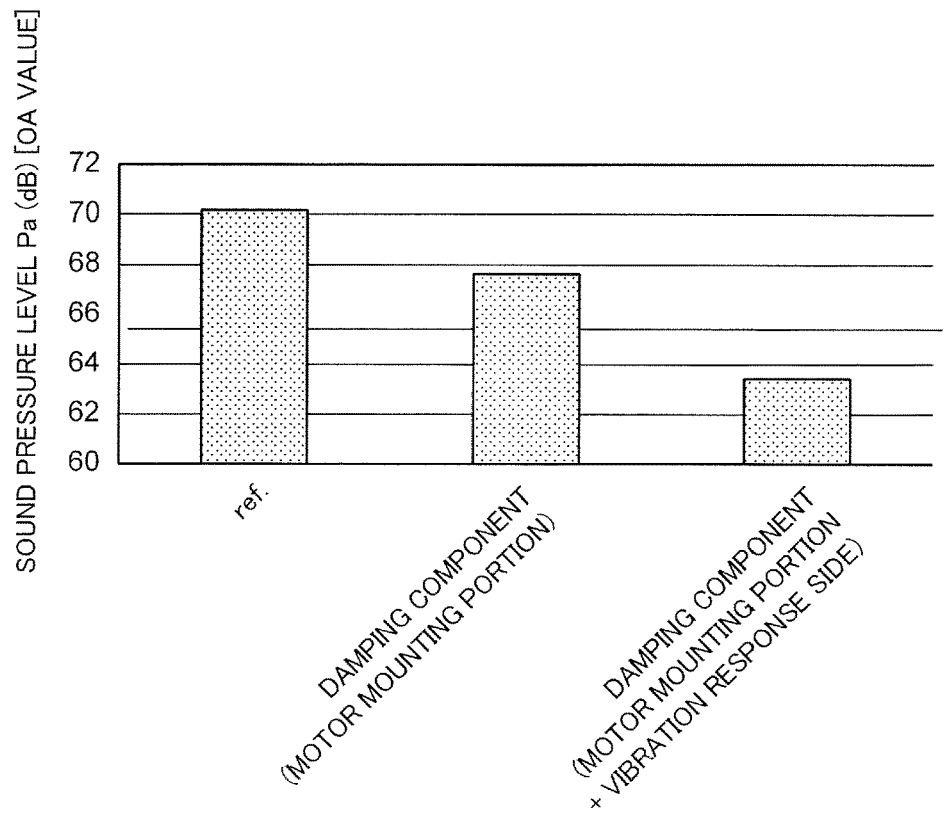
FIG. 19B is a bar graph indicating overall values of the sound pressure levels of the radiated sounds of the damping structure shown in FIG. 18A and of the comparative example.

The inventors conducted experimental study tests on the reducing effect of the radiated sound caused by vibration of the damping structure shown in FIG. 18. FIG. 19A shows sound pressure levels Pa (dB) of the radiated sounds caused in the case when the motor 11 is mounted to the vibrated member 7 by ordinary screws (ref) and in the case when the motor 11 is mounted to the vibrated member 7 by means of the damping components 4 and the damping component 4 is attached at the position where the vibration amplitude is large (see FIGS. 18A and 18B). As it is apparent from FIG. 19A, it is possible to reduce the radiated sound in a wide frequency band when the motor 11 was mounted by means of the damping components 4 and the damping component 4 was attached at the position where the vibration amplitude is large as compared to the case (ref) when the motor 11 was mounted by means of the ordinary screws. It is also apparent by comparing overall values (dB) of the sound pressure levels Pa shown in FIG. 19B that it is possible to reduce the sound pressure level by 6.7 dB when the motor 11 was mounted by the damping components 4 and the damping component 4 was attached at the position where the vibration amplitude is large as compared to the case when the motor 11 was coupled by the conventional screws. Thus, it is possible to obtain a higher vibration reducing effect by attaching the damping components 4 at the mount position of the motor 11 and at the position where the vibration amplitude is large than the case when the damping component 4 is attached at either one of them.

Figure 20A:
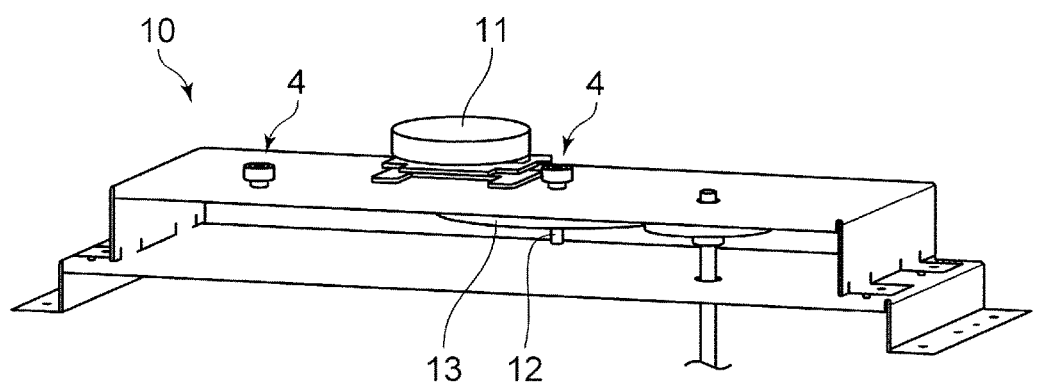
FIG. 20A is a perspective view schematically illustrating a damping structure in which the damping components are attached to the vibratory surface of the vibrated member together with an idling gear shaft.
Figure 20B:
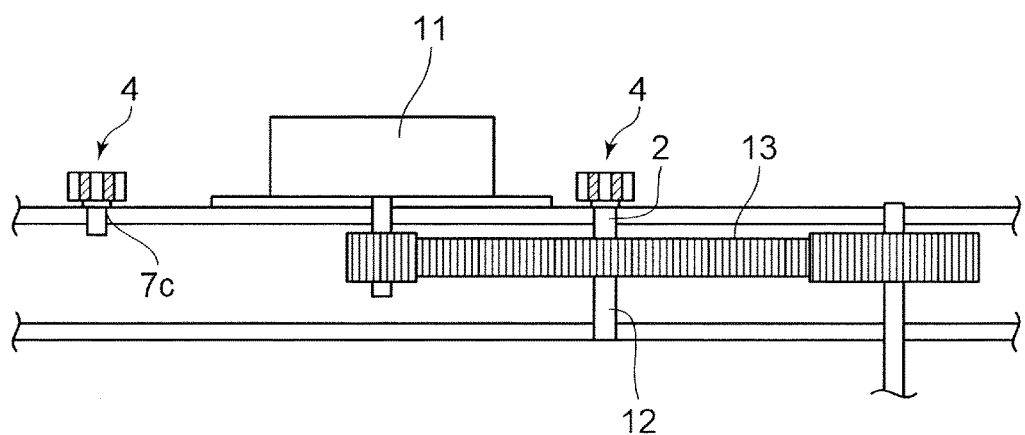
FIG. 20B is a section view of the damping structure shown in FIG. 20A.

A damping structure shown in FIGS. 20A and 20B is what the damping component 4 is attached at the attachment position 7c (see FIG. 10A for example) where the vibration amplitude of the vibrated member 7 is large after mounting the idling gear shaft 12, i.e., an exciter, by the same damping component 4 described above on the vibrated member 7. Because it is possible to reduce the vibration in a vicinity of the idling gear shaft 12 in this case, it is possible to reduce radiated sound of the vibrated member 7 even if the vibration generated by the idling gear shaft 12 spreads over the entire surface of the vibrated member 7. Still further, even if the vibration spreads over the entire surface of the vibrated member 7, the vibration is reduced further by the damping component 4 attached at the position where the vibration amplitude is large.

Figure 21A:
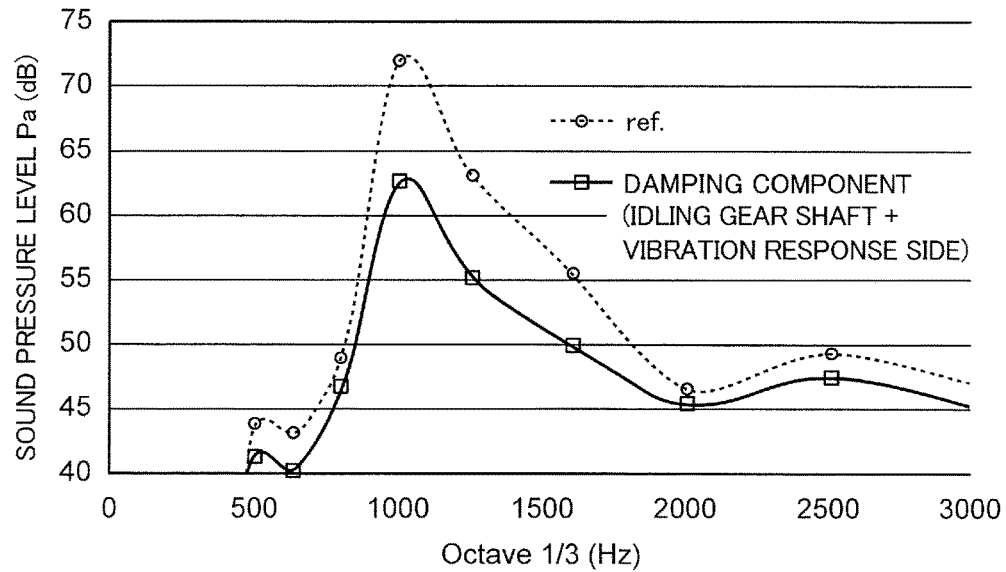
FIG. 21A is a line graph indicating sound pressure levels of radiated sounds of the damping structure shown in FIG. 20A.
Figure 21B:
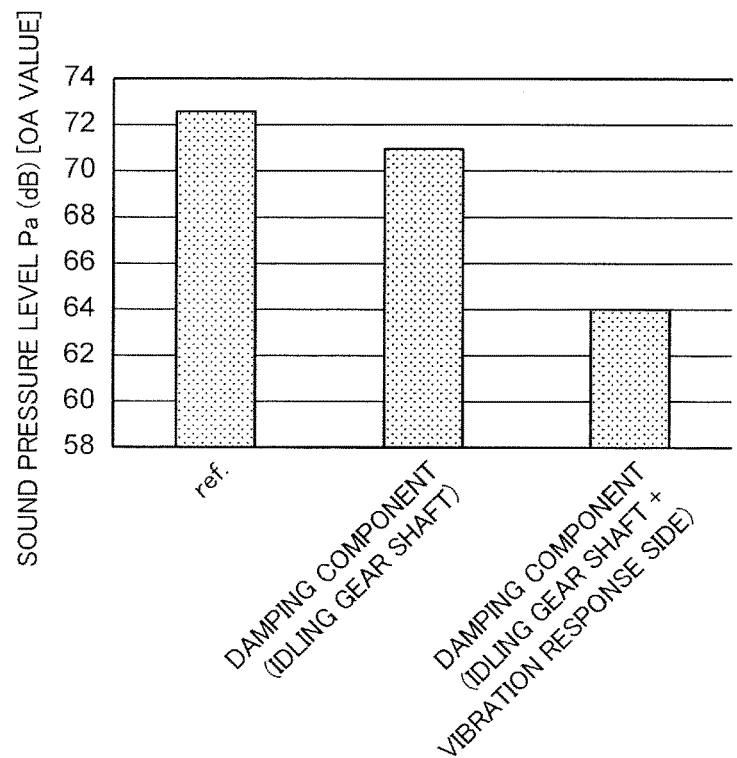
FIG. 21B is a bar graph indicating overall values of the sound pressure levels of the radiated sounds of the damping structure shown in FIG. 20A.

The inventors conducted experimental study tests on the reducing effect of the radiated sound caused by vibration of the damping structure shown in FIG. 20. FIG. 21A shows sound pressure levels Pa (dB) of radiated sounds in the case when the idling gear shaft 12 is mounted to the vibrated member 7 by the ordinary screw (ref) and the case when the idling gear shaft 12 is mounted to the vibrated member 7 by the damping component 4 and the damping component 4 is attached at the position where the vibration amplitude is large (see FIGS. 20A and 20B). As it is apparent from FIG. 21A, it is possible to reduce the radiated sound in a wide frequency band in the case when the idling gear shaft 12 is mounted to the vibrated member 7 by the damping component 4 as compared to the case when the idling gear shaft 12 is mounted to the vibrated member 7 by the ordinary screw (ref). Still further, it is possible to reduce the sound pressure level by 8.6 dB in the case when the idling gear shaft 12 is mounted by the damping component 4 and the damping component 4 is attached to the position where the vibration amplitude is large as compared to the case when the idling gear shaft 12 is coupled by the ordinary screw as it is apparent by comparing overall values (dB) of the sound pressure levels Pa shown in FIG. 21B. As described above, it is possible to obtain the higher vibration reducing effect by attaching the damping components 4 at both of the mount position of the idling gear shaft 12 and the position where the vibration amplitude is large as compared to the case when the damping component 4 is attached at either one point.

As described above, the damping member 1 compressively held between the rod member 2 and the outer member 3 is distorted by relatively moving the rod member 2 and the outer member 3 so as to generate the phase difference to convert the vibration energy vibrating the vibrated member 7 into the thermal energy. To that end, the damping component 4 is configured such that the outer member 3 is heavier than the damping member 1 and is disposed at the position distant from the surface of the vibrated member 7. Thereby, because the outer member 3 only compressively holds the damping member 1 and is not in contact with anything but the damping member 1, the outer member 3 and the rod member 2 move while generating the phase difference and tend to generate the distortion in the damping member 1. Such configuration is simple and due to that, it can be readily miniaturized. Therefore, it is possible to obtain the vibration reducing effect greater than the conventional one by the damping member 1 of the amount considerably less than that used in the conventional method of pasting the damping member on the entire surface of the vibrated member. Still further, because the damping component 4 can be attached easily on one object surface having no counterpart, not between two objects and the damping component 4 is small and can be attached at arbitrary positions of the vibrated member 7, the damping component 4 can reduce the vibration more efficiently. That is, the damping component 4 can be attached partially at the position where the vibration amplitude is large in particular on one object surface and can reduce the radiated sound caused by the vibration considerably by efficiently reducing the vibration.

Third Embodiment

Figure 22A:
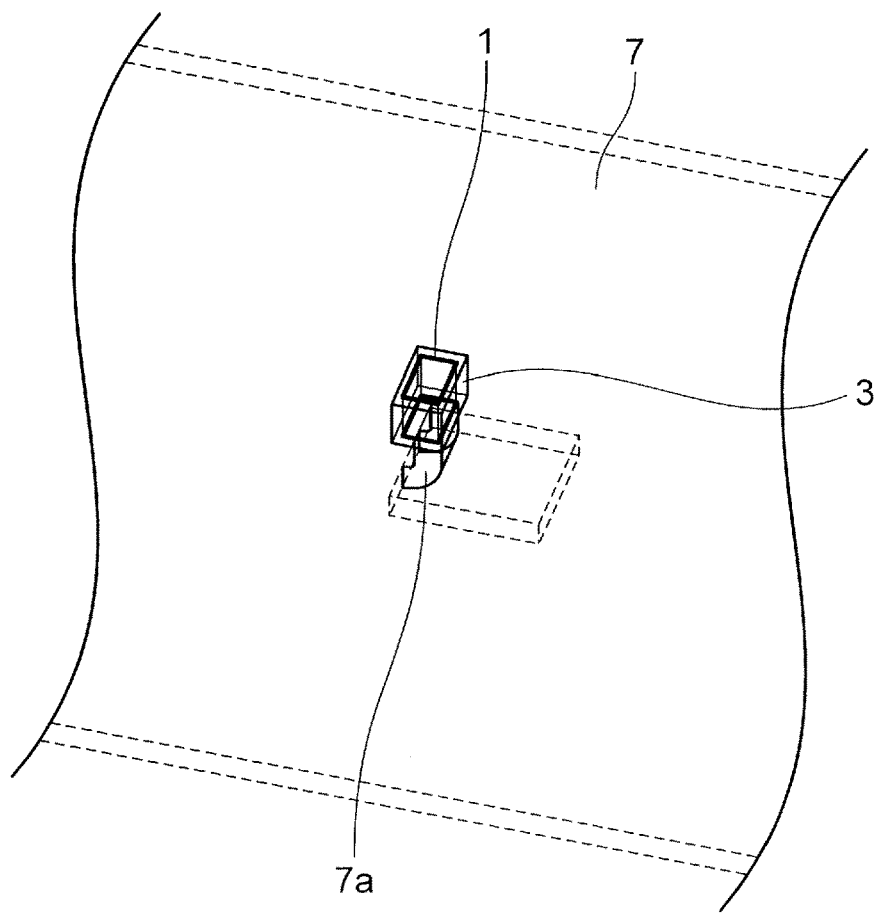
FIG. 22A is a perspective view schematically illustrating a damping structure of a third embodiment.
Figure 22B:
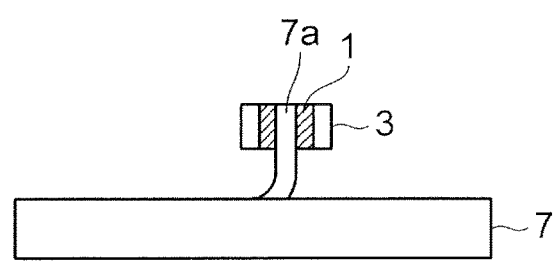
FIG. 22B is a section view of the damping structure shown in FIG. 22A.
Figure 23:
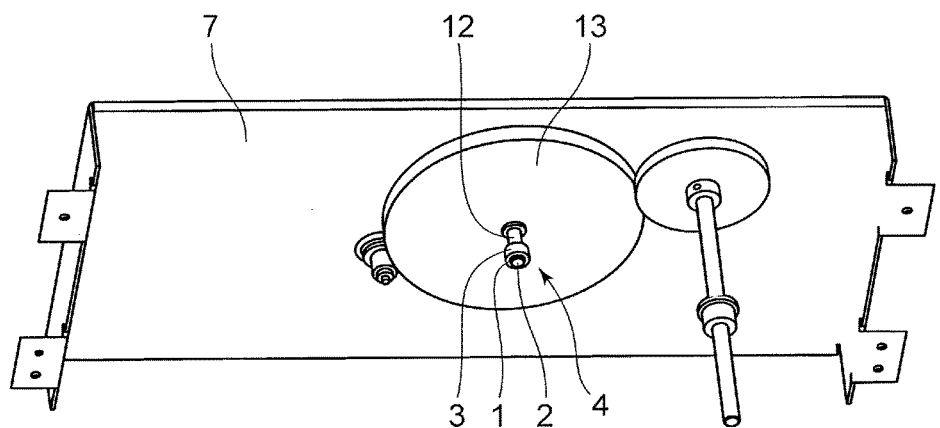
FIG. 23 is a perspective view schematically illustrating a damping structure, seen from below thereof, in which a damping member is attached to an idling gear shaft.

A third embodiment of the invention will be described with reference to FIGS. 22 and 23. A damping structure shown in FIGS. 22A and 22B is what the vibrated member 7 is worked and a project portion 7a projecting out of the surface of the vibrated member 7 is formed integrally with the vibrated member 7 in advance at a position where a vibration amplitude is large in the vibrated member 7. In short, the project portion 7a is formed integrally with the vibrated member 7 instead of the rod member 2 of the damping component 4. In the damping structure illustrated in FIG. 22, the project portion 7a is formed approximately into a shape of letter L by bending a cutout part of the vibrated member 7. A cylindrical damping member 1 is disposed so as to surround a first end side of the project portion 7a. The outer member 3 can be fitted around the project portion 7a while interposing the damping member 1 and compressively holds the damping member 1 with the project portion 7a. It is noted that the damping member 1 and the outer member 3 are the same with those of the damping component 4 described with reference to FIG. 1 (or FIG. 4), so that an explanation thereof will be omitted here. Thus, the damping structure shown in FIG. 22 is configured such that the damping member 1 is compressively held between the project portion 7a and the outer member 3 instead of the rod member 2 of the damping component 4 shown in FIG. 1. This configuration allows a weight of the damping structure from being not increased wastefully because a number of components composing the damping structure can be less as compared to the case of using the damping component 4 shown in FIG. 1 (or FIG. 4).

While the damping member 1 and the outer member 3 are attached to the project portion 7a in the damping structure shown in FIG. 22, the invention is not limited to such configuration. For instance, the damping member 1 and the outer member 3 may be attached to the idling gear shaft itself. FIG. 23 illustrates a damping structure in which the damping member 1 and the outer member 3 are attached to the idling gear shaft 12. In this case, the cylindrical damping member 1 is disposed so as to surround a circumference of the idling gear shaft 12 and the cylindrical outer member 3 is further disposed so as to surround a circumference of the damping member 1 at a tip side of the idling gear shaft 12. The outer member 3 can be fitted around the idling gear shaft 12 while interposing the damping member 1 and compressively holds the damping member 1 with the idling gear shaft 12. This configuration is advantageous because it is even possible to reduce vibration of an existing structure just by attaching the damping member 1 and the outer member 3 to the idling gear shaft 12.

Fourth Embodiment

A fourth embodiment will be described with reference to FIGS. 24 through 26. A damping component 4A shown in FIG. 24 includes a damping member 1, a rod member 2, i.e., an arm, and a press member 30, i.e., an opposed member. The rod member 2 is formed into a columnar shape for example around which the cylindrical damping member 1 is disposed so as to surround a circumference of the first end side of the rod member 2. The press member 30 is disposed further so as to interpose the damping member 1. However, although the press member 30 compressively holds the damping member 1 with the rod member 2, the press member 30 is configured to be able to adjust a compression amount of the damping member 1, differing from the damping component of the first embodiment. Then, the configuration of the press member 30 different from the damping component 4 of the first embodiment is explained, and an explanation of the damping member 1 and the rod member 2 will be omitted here because they are the same with those of the damping component 4 of the first embodiment.

Figure 24:
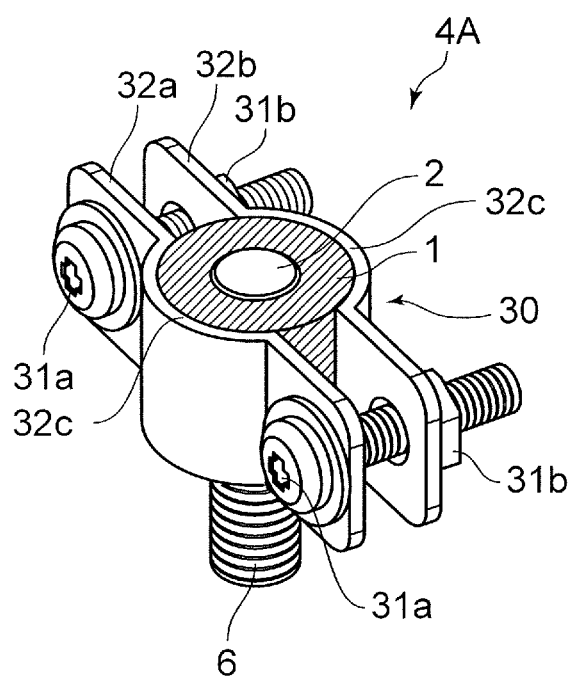
FIG. 24 is a perspective view illustrating a damping component of a fourth embodiment.

As shown in FIG. 24, the press member 30 includes first and second pressing portions 32a and 32b. The first and second pressing portions 32a and 32b are isomorphic plate members each including a curved portion 32c curved along an outer circumference of the damping member 1. These first and second pressing portions 32a and 32b are disposed opposite to each other while interposing the damping member 1 in the respective curved portions 32c. Bolts 31a and nuts 31b, i.e., an adjustment portion, are disposed at both end sides of the first and second pressing portions 32a and 32b, respectively. The bolts 31a are screwed with the nuts 31b, and a fastening amount of these bolts and nuts are adjusted to change relative positional relationship of the first and second pressing portions 32a and 32b and to adjust the compression amount of the damping member 1. Thus, the first and second pressing portions 32a and 32b are provided so as to be approachable/to be distant from each other. The curved portion 32c is formed such that the contact of the first and second pressing portions 32a and 32b with the damping member 1 becomes tighter and a range of the contact becomes larger when the damping member 1 is interposed between the first and second pressing portions 32a and 32b. The arrangement makes it possible to compress the damping member 1 homogeneously in compressing the damping member 1 between the first and second pressing portions 32a and 32b.

Figure 25:
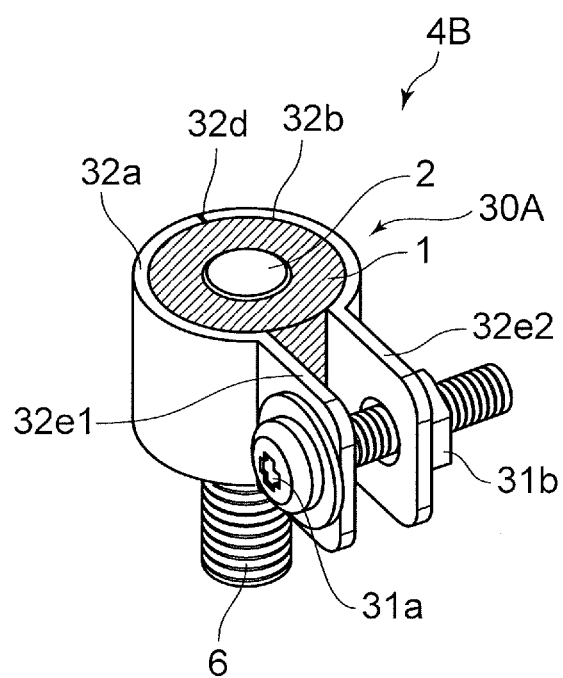
FIG. 25 is a perspective view illustrating a modification of a damping component of the fourth embodiment.

Still further, the first and second pressing portions 32a and 32b may not be separated as described above and may be formed integrally by connecting first end portions of the first and second pressing portions 32a and 32b by a coupling portion 32d as shown in FIG. 25. That is, the damping component 4B shown in FIG. 25 includes a press member 30A, i.e., an opposed member, formed approximately into a letter C disposed such that the first and second pressing portions 32a and 32b surround along the outer circumference of the damping member 1. First and second end portions 32e1 and 32e2 of the press member 30A project in the radial direction and face with each other. The both end portions 32e1 and 32e2 are provided with through holes through which the bolt 31a is inserted. Then, the bolt 31a is screwed into the nut 31b. When the bolt 31a is screwed and fastened more to the nut 31b, a distance between the one and other end portions 32e1 and 32e2 of the first and second pressing portions 32a and 32b is narrowed, and an inner diameter of the press member 30A is reduced. The compression amount of the damping member 1 is thus adjusted through the adjustment of a fastening amount between the bolt 31a and the nut 31b, i.e., adjusted by changing a relative positional relationship between the bolt and the nut. That is, the holding portion 30A comprises first and second pressing portions 32a and 32b coupled with each other at the coupling portion 32d, and the adjusting portion 31a and 31b adjusts the distance between the first and second ends 32a and 32b of the holding portion 30A.

It is noted that while the damping components 4A and 4B described above use the bolt 31a and the nut 31b as the adjusting portion to adjust the compression amount of the damping member 1, the present invention is not limited to such configuration. For instance, it is also possible to use a magnet and an elastic body, e.g., a rubber, as long as it can adjust the distance between the first and second pressing portions 32a and 32b.

Figure 26A:
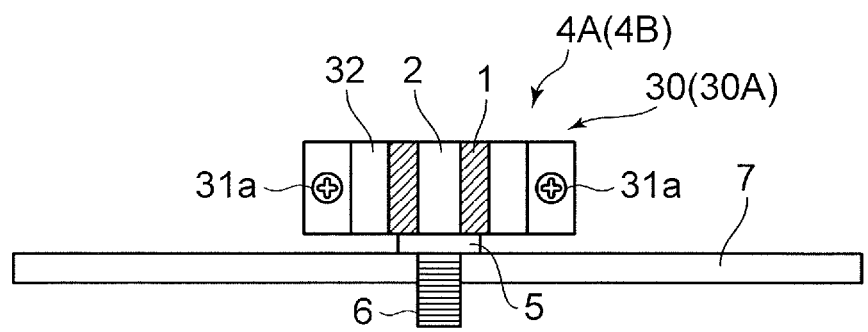
FIG. 26A is a section view illustrating the damping component of the fourth embodiment shown in FIG. 24.

The damping component 4A (4B) shown in FIG. 24 (or FIG. 25) can be used as a vibration reducing screw and is configured to be able to be attached to the vibrated member 7 by means of screw coupling. For instance, as shown in FIG. 26A, a female screw not shown to be screwed with the male screw 6 is provided through the vibrated member 7 and the user screws the male screw 6 into the female screw by rotating the rod member 2 while holing the convex portion 5 by a spanner or the like. Thus, the damping component 4 is attached to the vibrated member 7 such that the rod member 2 projects out of the surface of the vibrated member 7. In this case, the damping member 1 is compressively held in the direction intersecting with the direction in which the rod member 2 projects between the press members 30 (30A). Because the rod member 2 has the rigidity higher than that of the damping member 1, the vibration of the vibrated member 7 is propagated to the rod member 2. Thus, the rod member 2 vibrates in the same directions together with the vibrated member 7, i.e., in the out-of-plane direction of the vibrated member 7.

When the damping component 4A (4B) shown in FIG. 24 (or FIG. 25) is attached to the vibrated member 7, the press member 30 (30A) is disposed on the rod member 2 at a position distant from the surface of the vibrated member 7 as shown in FIG. 26A. As described above, the press member 30 (30A) only compressively holds the damping member 1 and is not in contact with anything but the damping member 1. Therefore, even if the vibrated member 7 vibrates in the out-of-plane direction (in the axial direction of the rod member 2), the press member 30 (30A) is not directly affected by the vibration and does not vibrate in the same directions together with the vibrated member 7. Meanwhile, when the vibrated member 7 vibrates, the press member 30 (30A) generates an inertia force in the out-ofplane direction of the vibrated member 7. When the inertia force is generated, the press member 30 (30A) moves relatively in the out-of-plane direction of the vibrated member 7 while generating a phase difference with the vibrated member 7 in noncontact and with the rod member 2. Thus, when the vibration is transmitted to the rod member 2, the rod member 2 and the press member 30 (30A) move while generating the phase difference and the damping member 1 compressively held between the rod member 2 and the press member 30 (30A) distorts in the shear direction (the out-of-plane direction of the vibrated member 7 or the axial direction of the rod member 2). Due to the distortion of the damping member 1, the damping member 1 generates friction and the vibration energy vibrating the vibrated member 7 is converted into thermal energy. Because the damping member 1 is in contact tightly with both of the rod member 2 and the press member 30 (30A), the friction is liable to generated by the distortion and the vibration energy is efficiently converted into the thermal energy. As a result, the vibration of the vibrated member 7 is reduced, and the radiated sound caused by the vibration is reduced. In order to enhance the effect of the inertia force, the press member 30 (30A) is required to have a certain degree of weight which is desirable to be at least heavier than the damping member 1. Preferably, the press member 30 (30A) is disposed at the position distant from the vibrated member 7 as described above. However, a member, e.g., a vibration-proof member, may be interposed between the press member 30 (30A) and the vibrated member 7 so long as the press member 30 (30A) is in contact with a soft member, e.g., the vibration-proof member, that does not propagate the vibration of the rod member 2 and the vibrated member 7 to the press member 30 (30A).

Figure 26B:
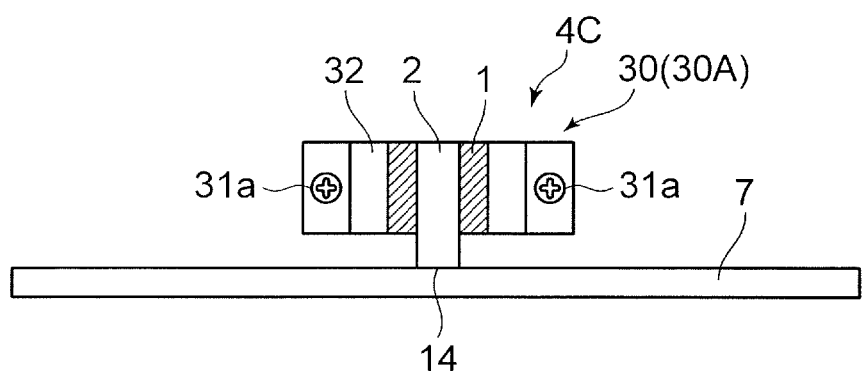
FIG. 26B is a section view illustrating the damping component differently attached to the damping structure.

It is noted that the method for attaching the damping component 4A (4B) shown in FIG. 24 (or FIG. 25) with the vibrated member 7 is not limited to the screw coupling method described above. For instance, it is also possible to couple a tip 14 of the rod member 2 with the vibrated member 7 by means of caulking, welding, bonding, magnetism or the like as shown in FIG. 26B. As a matter of course, the rod member 2 must be rigidly coupled with the vibrated member 7 so that the vibration of the vibrated member 7 is transmitted to the rod member 2 without almost any loss.

Figure 27A:
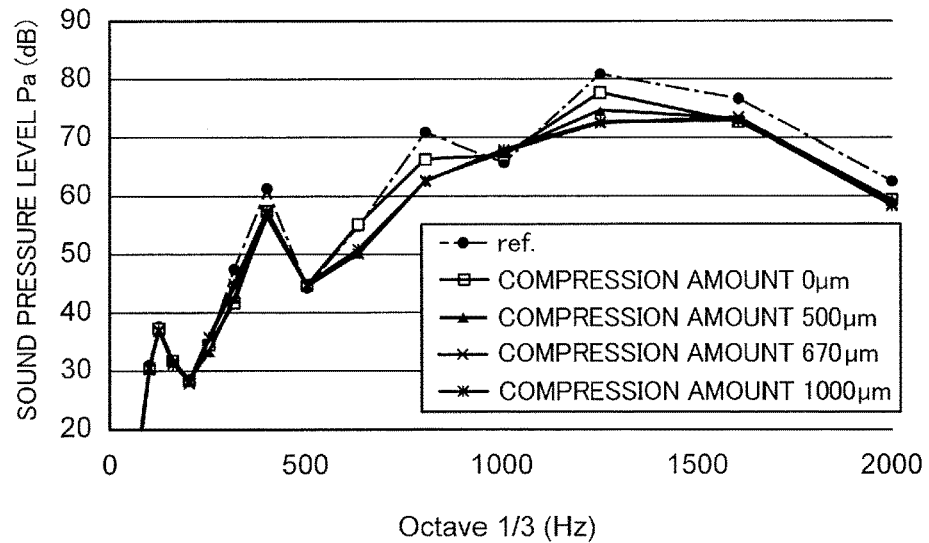
FIG. 27A is a line graph indicating sound pressure levels of radiated sounds when the compression amount of the damping member of the damping component is varied.
Figure 27B:
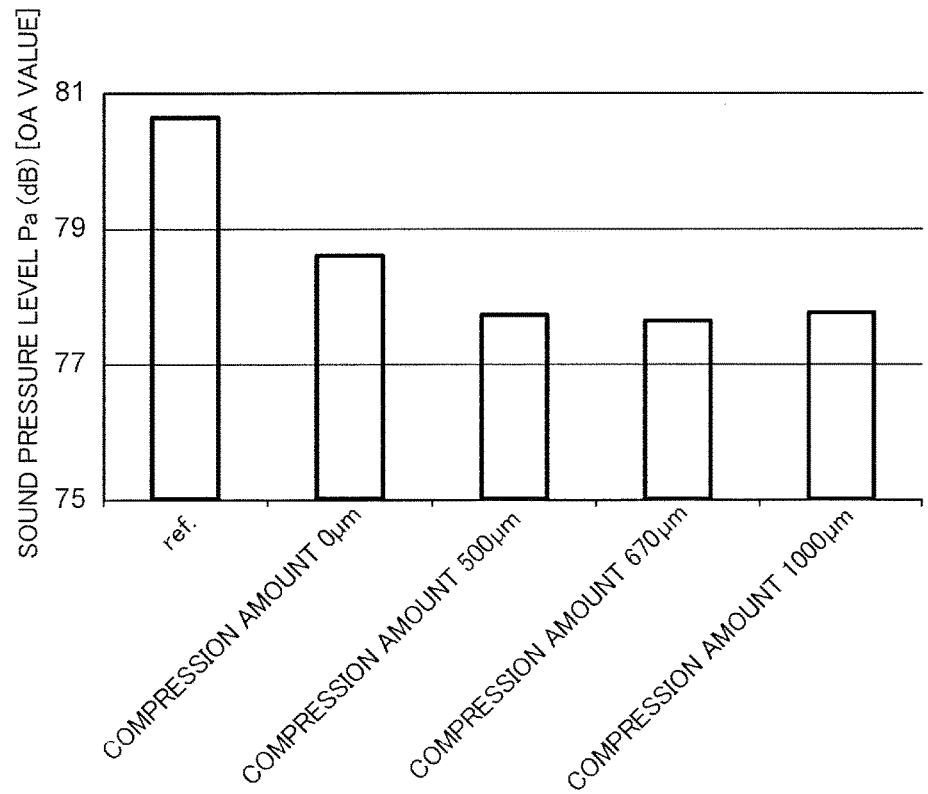
FIG. 27B is a bar graph indicating overall values of the sound pressure levels of the radiated sounds in FIG. 27A.

The inventors conducted experimental study tests on the reducing effect of the radiated sound caused by vibration in the case when the damping component 4A (4B) shown in FIG. 24 (or FIG. 25) was used. FIG. 27A indicates sound pressure levels Pa (dB) of radiated sounds in cases when the damping component 4A (4B) whose compression amount was changed was attached to the experimental simplified driving unit 10, and FIG. 27B indicates overall values (dB) of the sound pressure levels Pa. In the experiment, the cases when the compression amount was changed to 0 μm, 500 μm, 670 μm, and 1,000 μm and when the damping component 4A (4B) was not attached, i.e., only the frame (ref), for comparison were measured.

In the experiment, a damping component 4A (4B) of 20 mm in diameter, 15 mm in height, and 15 g in weight was used. The first and second pressing portions 32a and 32b of SUS304 and 2.2 g in weight, respectively, were used. The bolt 31a and the nut 31b of SUS 304 and 1.4 g in weight, respectively, were used. That is, the weight of the press member 30 (30A) was 7.2 g. Whereas, the damping member 1 was 2.0 g in weight. It is noted that the experimental simplified driving unit 10 and the method of the experiment are the same with those of the experiment on the damping component 4 of the first embodiment, an explanation thereof will be omitted here.

As it is apparent from FIG. 27A, it is possible to reduce the radiated sound in a wide frequency band when the compression amount of the damping member 1 is increased as compared to the case of only the sheet metal frame. Still further, as it is apparent by comparing the overall values (dB) of the sound pressure levels Pa indicated in FIG. 27B, it is possible to reduce the overall value when the compression amount of the damping member 1 is increased as compared to the case of only the frame, i.e., when no damping component 4A (4B) is attached. Specifically, it was possible to reduce the radiated sounds by 2.0 dB in the case when the compression amount is 0 μm, by 2.9 dB in the case of 500 μm, and by 3.0 dB in the case of 670 μm, respectively.

Here, in the case when the compression amount of the damping member 1 was 0 mm, the damping member 1 was not compressed and the loss factor of the damping member 1 was kept low, so that the effect of reducing the radiated sound was small even through the damping member 1 generated distortion in the shear direction. In the case of 1000 μm of compression amount, however, although it was possible to reduce the radiated sound by 2.9 dB as compared to the case of only the frame without the damping component 4, it was unable to reduce the radiated sound more than the case (3.0 dB) of 670 μm of compression amount. This fact indicates that if the damping member 1 is compressed with a compression amount exceeding a predetermined amount, e.g., 50% or more, as compared to the condition before compression, the vibration reducing effect is gradually weakened along with the increase of the compression amount even though the effect of reducing the radiated sound is obtained.

Because the press member 30 (30A) moves relatively in the out-of-plane direction of the vibrated member 7 while generating the phase difference with respect to the rod member 2, the damping member 1 compressively held between the rod member 2 and the press member 30 (30A) generates the distortion in the shear direction (in the out-of-plane direction of the vibrated member 7 or the axial direction of the rod member 2) as described above. The damping member 1 generates friction due to this distortion of the damping member 1, and the vibration energy vibrating the vibrated member 7 is converted into the thermal energy. Thus, the vibration is reduced. However, the damping member 1 is hardened when it is compressed. Therefore, in the case when the damping member 1 is compressed with the compression amount exceeding the predetermined amount in particular, the phase difference is hardly generated between the rod member 2 and the press member 30 (30A) even if the rod member 2 and the press member 30 (30A) move relatively with each other. As a result, because the damping member 1 hardly generates the distortion in the shear direction, the conversion from the vibration energy to the thermal energy is not fully taken place and the vibration is hardly reduced.

However, because the damping component 4A (4B) allows the compression amount of the damping member 1 to be adjusted as described above, it is possible to efficiently reduce the radiated sound by adjusting the compression amount even if a center frequency of the radiated sound to be reduced changes. That is, the loss factor of the damping member 1 is changed by the compression amount of the damping member 1, and the frequency band of frequency that can be considerably reduced changes by the loss factor of the damping member 1. Then, it is necessary to optimize the compression amount of the damping member 1 in accordance to the center frequency of the radiated sound generated on the vibrated member 7. The compression amount of the damping member 1 is thus made possible to adjust to deal with this subject.

Fifth Embodiment

Figure 28:
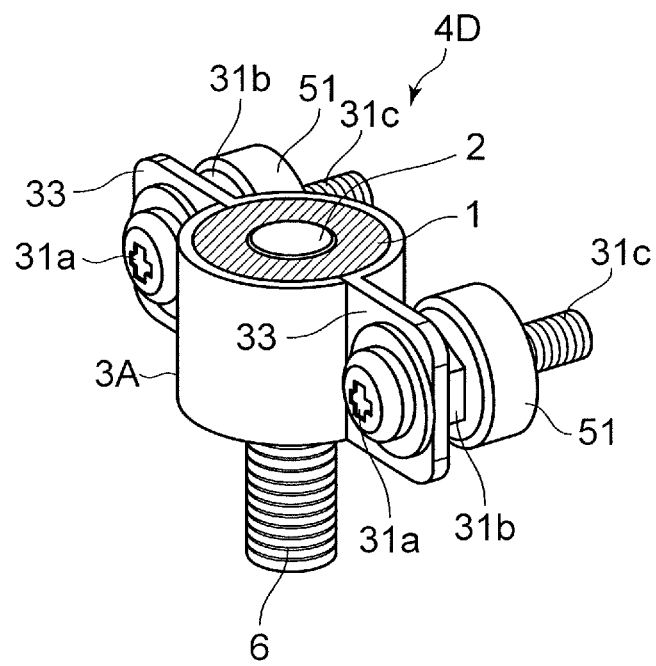
FIG. 28 is a perspective view illustrating a damping component of a fifth embodiment.
Figure 29:
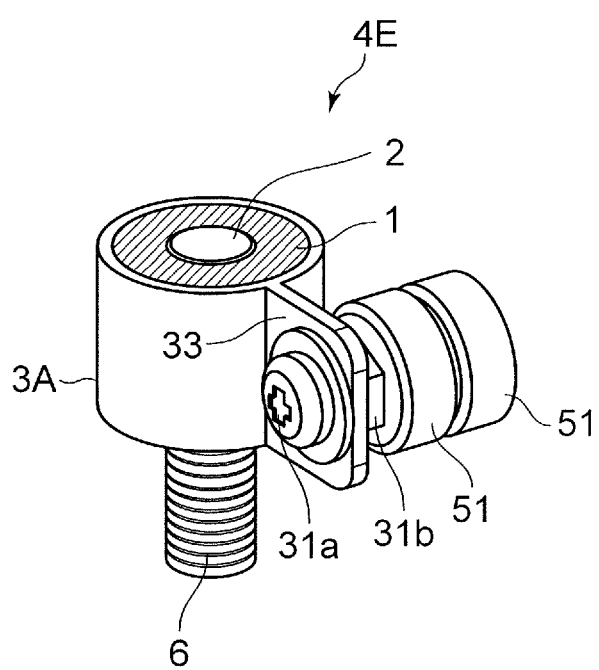
FIG. 29 is a perspective view illustrating a modification of the damping component of the fifth embodiment.

Next, a fifth embodiment of the invention will be described with reference to FIGS. 28 and 29. Similarly to the damping component of the first embodiment (see FIG. 1 for example), damping components 4D and 4E shown in FIGS. 28 and 29 are respectively composed of a damping member 1, a rod member 2, i.e., an attachment member and an outer member 3A, i.e., an opposed member. The rod member 2 is formed into a columnar shape for example, and the cylindrical damping member 1 is disposed so as to surround a circumference of the rod member 2 at a first end side thereof. Still further, the cylindrical outer member 3A is disposed so as to surround the damping member 1. However, while the outer member 3A compressively holds the damping member 1 with the rod member 2, the outer member 3A is configured to be able to adjust a weight (mass) thereof differing from the damping component of the first embodiment. Then, the configuration of the outer member 3A differing from that of the damping component 4 of the first embodiment will be described below, and an explanation of the damping member 1 and the rod member 2 will be omitted because they are the same with those of the damping component 4 of the first embodiment.

The damping component 4D shown in FIG. 28 is what bolt attaching portions 33, to which bolts 31*a* can be attached, are provided at two places of the outer member 3A of the damping component 4 shown in FIG. 1 so as to project in the radial direction of the outer member 3A in opposite directions from each other. The bolt attaching portion 33 is provided with a through hole not shown, and the bolt 31*a* is inserted through the through hole. Then, a male thread portion 31*c* of the bolt 31*a* is screwed into the nut 31*b* to fix the bolt 31*a* is fixed to the bolt attaching portion 33. The male thread portion 31*c* of the bolt 31*a* is configured such that one or a plurality of weights 51 formed of metal such as brass or rubber, plastic or the like can be screwed together, beside the nut 31*b*. That is, the male thread portion 31*c* is a weight attachment portion enabling to removably attach the one or plurality of weights 51. The weight 51 is provided with female threads similarly to the nut 31*b* around an inner circumference thereof so that the male thread portion 31*c* can be screwed therein. The weight of the outer member 3A changes depending on a number of the weight 51 attached to the bolt 31*a*.

Still further, while the damping component 4D shown in FIG. 28 is provided with the bolt attachment portions 33 at the two places, the damping component 4E shown in FIG. 29 is provided with the bolt attaching portion 33 at only one place. This arrangement makes it also possible to change the weight of the outer member 3A by attaching one or plurality of weights 51 around the male thread portion 31*c* of the bolt attaching portion 33. Still further, although not shown, the bolt attaching portion 33 may be provided at many more places. It is noted that the method for attaching the weight 51 to the outer member 3A is not limited to the bolt 31*a* described above, and another method, e.g., magnets, may be adopted as long as the weight 51 can be removably attached to the outer member 3A.

The damping components 4D and 4E need to be configured such that the outer member 3A generates inertia force in order to obtain the vibration reducing effect. To that end, it is desirable to keep the weight of the weight 51 in a range of one-tenth to a half of the weight of the rod member 2, though it depends on the weight of the outer member 3A itself including the bolt 31*a*, the nut 31*b* and others. The weight of one weight 51 is 1.9 g for example. Still further, the number of attachable weights 51 is desirable to be a number of weights enabling to assure a weight equivalent to one to two times of the weight of the rod member 2.

It is noted that the method for attaching the damping components 4D and 4E shown in FIG. 28 (or FIG. 29) with the vibrated member 7 may be the screw coupling in the same manner with the damping components of the other embodiments described above, or another method, e.g., caulking, welding, bonding, and magnetism may be adopted.

Figure 30A:
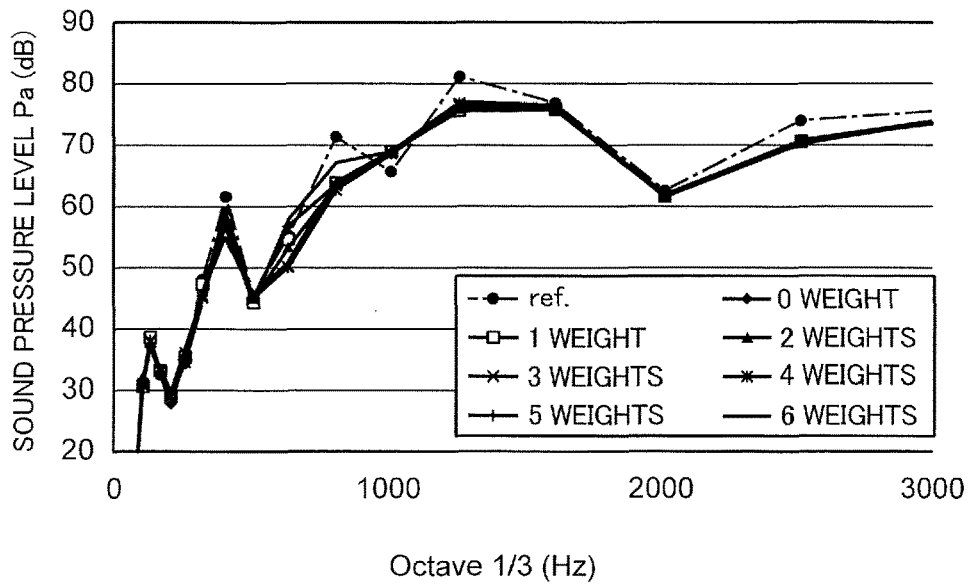
FIG. 30A is a line graph indicating sound pressure levels of radiated sounds measured per number of weights attached to the damping component of the fifth embodiment.

The inventors conducted experimental study tests on the reducing effect of the radiated sound caused by vibration in the case when the damping component 4D (4E) shown in FIG. 28 (or FIG. 29) was used. FIG. 30A indicates sound pressure levels Pa (dB) when the damping component 4D is attached to the experimental simplified driving unit 10 while changing the number of weights, and FIG. 30B indicates overall values (dB) of the sound pressure levels Pa. In this experiment, measurements were taken in cases when the number of weight 51 of 1.9 g was changed from zero to six and the case of only the frame (ref) without attaching the damping component 4D. Still further, the weight of the outer member 3A was 6.5 g and the weight of the damping member 1 was 2.0 g. The compression amount of the damping member 1 was set at 670 μm.

As it is apparent from FIG. 30A, it is possible to reduce the radiated sounds in a wide frequency band when the damping component 4D is attached as compared to the case of only the sheet metal frame. However, no big difference is seen in the sound pressure levels by the number of weights 51. Meanwhile, it is also apparent from the overall values of the sound pressure levels Pa shown in FIG. 30B that the overall values are reduced by increasing the weight of the outer member 3A by the weights 51 as compared to the case of only the frame without attaching the damping component 4D.

In the case when no weight 51 is attached and the outer member 3A is relatively light (a case when the number of 51 is zero), the inertia force generated by the outer member 3A becomes small as compared to the case when the outer member 3A is heavy. Then, when the damping member 1 and the outer member 3A move relatively along with vibration of the vibrated member 7, the rod member 2 and the outer member 3A move while generating a small phase difference. In such a case, the damping member 1 generates no large distortion in the shear direction, i.e., the distortion in the shear direction is small, so that the efficiency of converting vibration energy to thermal energy is low.

When the weights 51 are attached to increase the weight of the outer member 3A (cases when the number of weights 51 is one to two), the inertia force generated in the outer member 3A increases as compared to the case before the weight 51 is attached. Then, when the rod member 2 and the outer member 3A move relatively along with the vibration of the vibrated member 7, the rod member 2 and the outer member 3A move while generating a large phase difference. In such a case, the damping member 1 generates a large distortion in the shear direction, i.e., the distortion in the shear direction is large, so that the efficiency of converting the vibration energy to the thermal energy is enhanced. The efficiency of converting the vibration energy to the thermal energy is maximized when the rod member 2 and the outer member 3A move while generating a phase difference of 180° (inverse phase). In the experiment shown in FIG. 30B, the rod member 2 and the outer member 3A move approximately in the inverse phase, the distortion in the shear direction of the damping member 1 is maximized, and the efficiency of converting the vibration energy to the thermal energy is enhanced most.

Figure 30B:
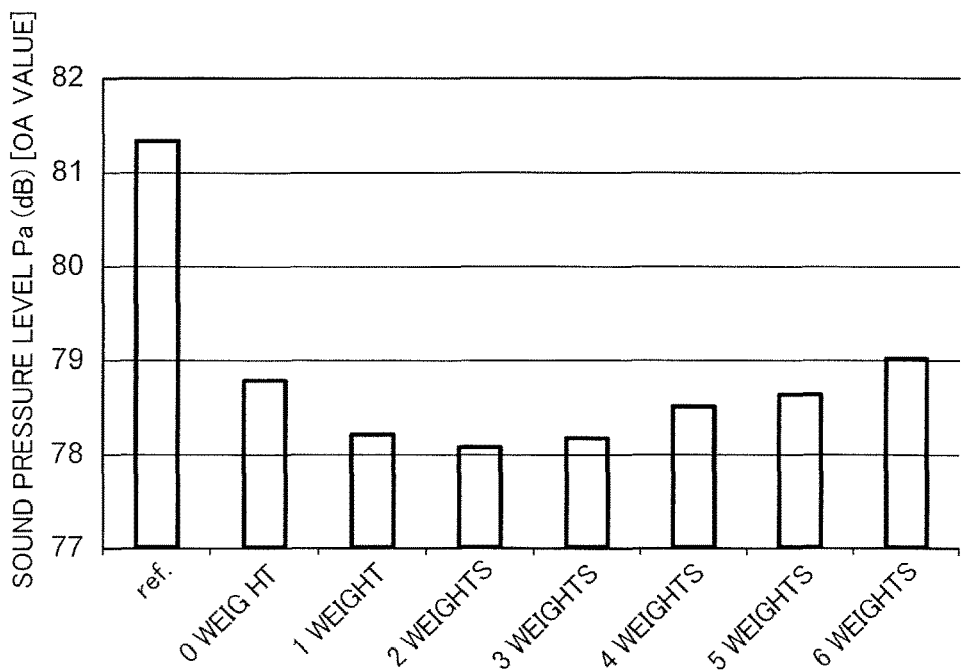
FIG. 30B is a bar graph indicating overall values of the sound pressure levels of the radiated sounds measured per number of the weights attached to the damping component of the fifth embodiment.

Then, in the cases when the number of the weights 51 is increased to increase the weight of the outer member 3A, i.e., in the case when the number of weights 51 is three to six, while the inertia force generated in the outer member 3A increases, the rod member 2 and the outer member 3A hardly move relatively along with the vibration of the vibrated member 7. As a result, although the rod member 2 and the outer member 3A move while generating the phase difference, the phase difference becomes small as compared to the case of moving in the inverse phase and the efficiency of converting the vibration energy to the thermal energy becomes low. Therefore, as indicated in FIG. 30B, although the overall values decrease gradually until when the number of the weights 51 is two, the overall values increases gradually from when the number of the weights 51 is three or more.

As described above, even if magnitude of the vibration transmitted to the vibrated member 7 varies, it is possible to reduce the radiated sound efficiently by adjusting the weight of the outer member 3A by the damping component 4D (4E) configured to be able to adjust the weight of the outer member 3A. That is, if the outer member 3A is too light as compared to the magnitude of the vibration, the distortion of the duping member 1 is hardly generated because the outer member 3A ends up to move in-phase and in the same amplitude with the rod member 2, thus, the vibration energy vibrating the vibrated member 7 is hardly converted into the thermal energy. As a result, because the vibration of the vibrated member 7 is not reduced, it is hard to reduce the radiated sound caused by the vibration. Meanwhile, if the outer member 3A is too heavy as compared to the magnitude of the vibration, the rod member 2 and the outer member 3A hardly move relatively as described above (see FIG. 30B). As a result, the phase difference of the rod member 2 and the outer member 3A also becomes small, and the efficiency of converting the vibration energy to the thermal energy becomes low. As a result, because the vibration of the vibrated member 7 is not reduced, it is hard to reduce the radiated sound caused by the vibration. Then, it is necessary to optimize the weight of the outer member 3A corresponding to the magnitude of vibration of the vibrated member 7. Accordingly, in order to deal with this subject, the damping component 4D (E) is configured to be able to adjust the weight of the outer member 3A.

Sixth Embodiment

Figure 31:
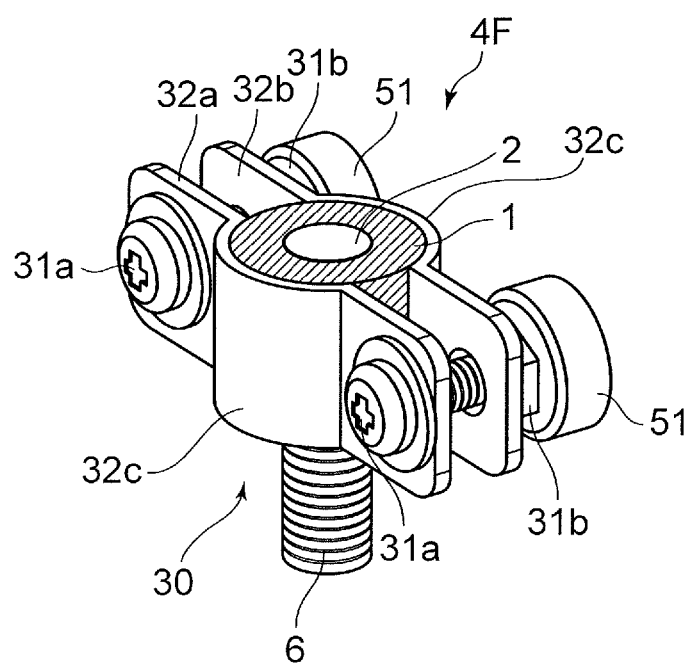
FIG. 31 is a perspective view schematically illustrating a damping component of a sixth embodiment.

A damping component 4F of a sixth embodiment will be described with reference to FIG. 31. The damping component 4F of the present embodiment is configured to be able to adjust the compression amount of the damping member 1 and the weight of the press member 30. The damping component 4E will be described specifically below. The damping component 4E shown in FIG. 31 is configured to be able to attach one or a plurality of weights 51 to the bolt 31a of the damping component 4A configured to be able to adjust the compression amount of the damping member 1 as shown in FIG. 24. That is, the weight 51 is provided with a through hole, and female threads to be screwed with male threads of the bolt 31a are cut around an inner circumference of the through hole. The weight 51 is screwed with the bolt 31a to be attached to the press member 30. Still further, although not shown, one or a plurality of weights 51 may be attached to the bolt 31a of the damping component 4B shown in FIG. 25. Thus, the bolt 31a for adjusting the compression amount of the damping member 1 may be used also as a weight attaching portion.

It is noted that the method of attaching the damping component 4F shown in FIG. 31 with the vibrated member 7 may be the screw coupling method similarly to the damping components of the other embodiments described above or may be another method adopting caulking, welding, bonding, magnetism or the like.

Although not shown, the damping components of the fourth through sixth embodiments described above may be used in mounting the motor 11, the exciter, to the vibrated member 7 as shown in FIG. 14 and may be used also in mounting the idling gear shaft 12, the other exciter, to the vibrated member 7 as shown in FIG. 16 similarly to the damping component of the first embodiment described above. Not only in the case of mounting the motor 11 to the vibrated member 7 as shown in FIG. 18, the damping components 4A through 4F of the fourth through sixth embodiments are preferably attached at the position where the vibration amplitude of the vibrated member 7 is large (see FIG. 10). Not only in the case of mounting the idling gear shaft 12 to the vibrated member 7 as shown in FIG. 20, the damping components 4A through 4F of the fourth through sixth embodiments are preferably attached at the positions where the vibration amplitude of the vibrated member 7 is large (see FIG. 10). Still further, it is possible to construct a damping structure in which the damping member 1 is compressively held between the outer member 3 and the project portion 7a, instead of the rod member 2 of any one of the damping components 4A through 4F, like the damping structure shown in FIG. 22. It is also possible to construct a damping structure by attaching the damping member 1 and the outer member 3 of any one of the damping component 4A through 4F to the idling gear shaft 12 like the damping structure as shown in FIG. 23.

Seventh Embodiment

Figure 32A:
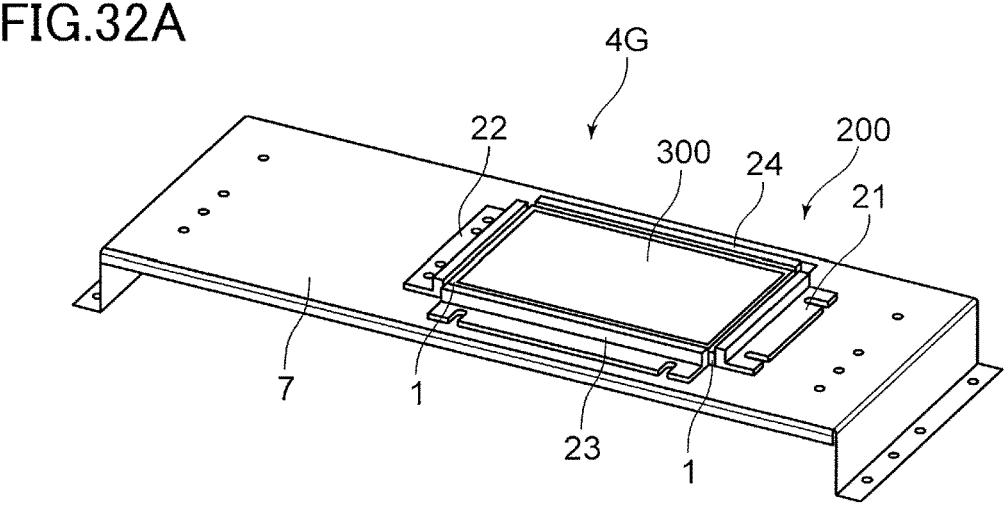
FIG. 32A is a perspective view schematically illustrating a damping structure of a seventh embodiment.

A seventh embodiment will be described with reference to FIGS. 32A through 32D. A damping component 4G shown in FIG. 32A is composed of a damping member 1, an attachment member 200, and an inner member 300, i.e., an opposed member. The attachment member 200 is composed of four attachment portions. The attachment portions are disposed separately in a direction intersecting with a direction in which the respective attachment portions project such that first and second attachment portions 21 and 22 face with each other and the third and fourth attachment portions 23 and 24 face with each other. That is, the respective attachment portions 21 through 24 are disposed separately in the direction intersection with the direction in which the attachment portions 21 through 24 project and so as to have a pair of surfaces facing with each other. The damping member 1 is disposed along an inner circumference of the respective attachment portions 21 through 24, and the inner member 300 is disposed such that the damping member 1 is interposed between the inner member 300 and the respective attachment portions 21 through 24. The inner member 300 can be fitted into the attachment portions 21 through 24 while interposing the damping member 1 and compressively holds the damping member 1 with the attachment portions 21 through 24. It is noted that because the damping member 1 is the same material with that of the damping components in the first through sixth embodiments, an explanation thereof will be omitted here.

The respective attachment portions 21 through 24 are molded parts of ABS resin or the like to lighten the damping component and are formed approximately into a shape of L. Their material is not of course limited to the resin and they may be formed of a metallic material, e.g., aluminum and a steel plate. The respective attachment portions 21 through 24 are fixed to the vibrated member 7 by means of screw clamping. As shown in FIG. 32A, the attachment portions 21 and 22 are projectively provided at positions distant in a longitudinal direction of the vibrated member 7 so as to face with each other. The attachment portions 23 and 24 are projectively provided at positions distant in a short direction of the vibrated member 7 so as to face with each other. It is noted that the damping component 4G may include either one combination of the first and second attachment portions 21 and 22 and the third and fourth attachment portions 23 and 24 facing with each other (see FIG. 33 for example).

Figure 32B:
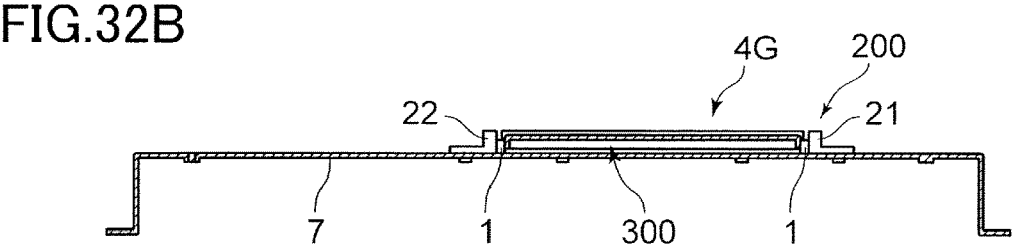
FIG. 32B is a section view of the damping structure shown in FIG. 32A.
Figure 32C:
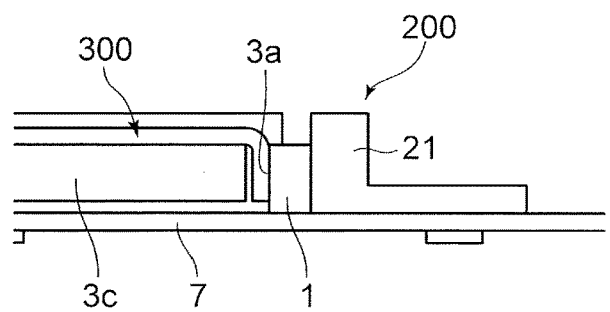
FIG. 32C is an enlarged section view of a part of the damping structure shown in FIG. 32A.
Figure 32D:
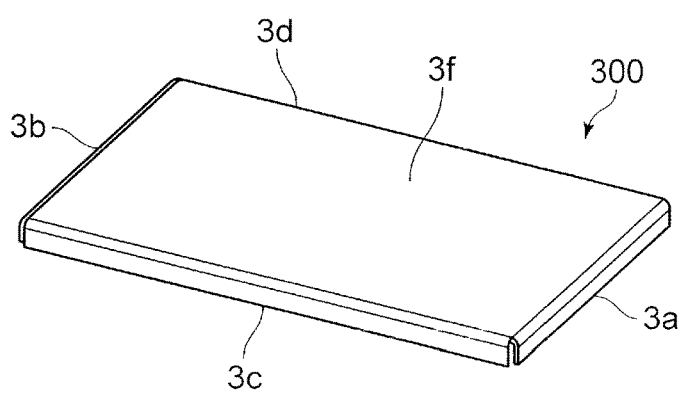
FIG. 32D is a perspective view illustrating a part of the damping structure shown in FIG. 32A.

As shown in FIG. 32D, the inner member 300 is a plate member such as a sheet metal formed into the same shape and size with a range surrounded by the attachment portions 21 through 24. The inner member 300 includes a main flat portion 3f and pressing faces 3a through 3d formed by folding edge portions of the main flat portion 3f approximately into a shape of L. The pressing faces 3a through 3d are swingable centering on folded points in response to a force applied from outside. Thus, the edge portions of the main flat portion 3f are folded to form the pressing faces 3a through 3d to be able to assure a wider contact area with the damping member 1 interposed between the pressing faces 3a through 3d and the respective attachment portions 21 through 24 and to be able to compressively hold the damping member 1.

Here, a method for assembling the damping component 4G shown in FIGS. 32A through 32D will be described. In a case when the G is assembled on the vibrated member 7 as shown in FIG. 32A, the damping member 1 is required to be compressively held between the inner member 300 and the respective attachment portions 21 through 24. In assembling the damping component 4G, positions where the second and fourth attachment portions 22 and 24 are to be disposed are determined at first, and these attachment portions are fixed to the vibrated member 7 by screws.

Next, the inner member 300 is disposed at positions where the pressing faces abut against the second and fourth attachment portions 22 and 24 while interposing the damping member 1. Here, the inner member 300 is positioned such that the pressing face 3b presses against the second attachment portion 22 and the pressing face 3d presses against the fourth attachment portion 24, respectively. It is possible to use a positioning jig not shown in positioning the inner member 300. Then, the first attachment portion 21 abuts against the pressing face 3a of the inner member 300 and the third attachment portion 23 abuts against the pressing face 3c, respectively. After that, the first and third attachment portions 21 and 23 are fixed to the vibrated member 7 by screws.

The first and third attachment portions 21 and 23 are fixed to the vibrated member 7 under pressure such that the damping member 1 interposed respectively between the first attachment portion 21 and the pressing face 3a, the second attachment portion 22 and the pressing face 3b, the third attachment portion 23 and the pressing face 3c, and the fourth attachment portion 24 and the pressing face 3d is compressively held. Thereby, the damping member 1 is compressively held between the inner member 300 and the attachment member 200. The first and third attachment portions 21 and 23 are provided with screw clamping holes so as to be able to adjust the compression amount of the damping member 1. The screw clamping holes are perforated along directions in which the inner member 300 is moved in abutting the first and third attachment portions 21 and 23 against the pressing faces 3a and 3c. The screw clamping holes are provided at least in a length in which the first and third attachment portions 21 and 23 are movable within an adjustment range of the compression amount of the damping member 1. The compression amount of the damping member 1 is desirable to be around 0.2 mm to 1.0 mm in the damping member 1 whose loss factor before compression, measured by the mechanical impedance method, is 1.5 for example and is formed to be 6 mm in width.

Still further, the first and third attachment portions 21 and 23 are fixed while applying pressure so that the damping member 1 is compressively held, and the inner member 300 is mounted at a position where the inner member 300 does not come in contact with the vibrated member 7 not only during a stationary time but also during a vibration time. That is, the inner member 300 is separated from the vibrated member 7 as shown in FIGS. 32B and 32C.

In the case when the damping component 4G shown in FIG. 32A is attached to the vibrated member 7, the inner member 300 is disposed at the position separated from the surface of the vibrated member 7. That is, the inner member 300 only compressively holds the damping member 1 and is not in contact with anything but the damping member 1. Therefore, even if the vibrated member 7 vibrates in the out-of-plane direction (a vertical direction with respect to the surface of the vibrated member 7), the inner member 300 is not directly affected by the vibration and does not vibrate in the same directions together with the vibrated member 7. Meanwhile, if the vibrated member 7 vibrates, the inner member 300 generates an inertia force in the out-of-plane direction of the vibrated member 7. When the inner member 300 generates the inertia force, the inner member 300 relatively moves in the out-of-plane direction of the vibrated member 7 while generating a phase difference with respect to the attachment portions 21 through 24. That is, even if the vibrated member 7 vibrates, the inner member 300 hardly vibrates with the same phase and amplitude with the vibrated member 7. Thus, when the vibration is propagated to the attachment portions 21 through 24, the attachment portions 21 through 24 and the inner member 300 move while generating the phase difference, and the damping member 1 compressively held between the attachment portions 21 through 24 and the inner member 300 generates distortion in the shear direction (in the out-of-plane direction of the vibrated member 7). The damping member 1 generates friction due to the distortion thereof, and vibration energy vibrating the vibrated member 7 is converted into thermal energy. Because the damping member 1 is in contact tightly with both of the attachment portions 21 through 24 and the inner member 300, the friction is liable to be generated by the distortion and the vibration energy is efficiently converted into the thermal energy. As a result, the vibration of the vibrated member 7 is reduced and the radiated sound caused by the vibration is reduced. The inner member 300 is required to have a certain degree of weight and is specifically desirable to be at least heavier than the damping member 1 in order to enhance the effect of the inertia force.

Still further, as shown in FIG. 32D, the inner member 300 includes the main flat portion 3f, i.e., a cover portion. When the inner member 300 is attached to the vibrated member 7, the main flat portion 3f covers a range surrounded by surfaces of the pair of first and second attachment portions 21 and 22 and surfaces of the pair of third and fourth attachment portions 23 and 24. That is, the main flat portion 3f is a lid enclosing an upper part of a space formed by the attachment portions 21 through 24. Thereby, even in a case when vibration is too large for example and radiated sound caused by the vibration continues to be generated even though the radiated sound is reduced, it possible to block the radiated sound by the attachment portions 21 through 24 and the main flat portion 3f and to prevent the radiated sound from leaking outside.

Figure 33A:
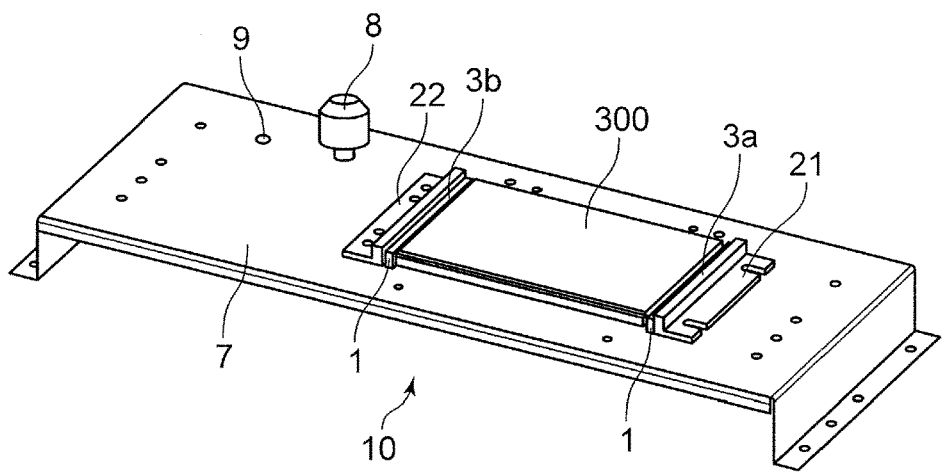
FIG. 33A is a perspective view schematically illustrating an experimental simplified driving unit of the seventh embodiment.
Figure 33B:
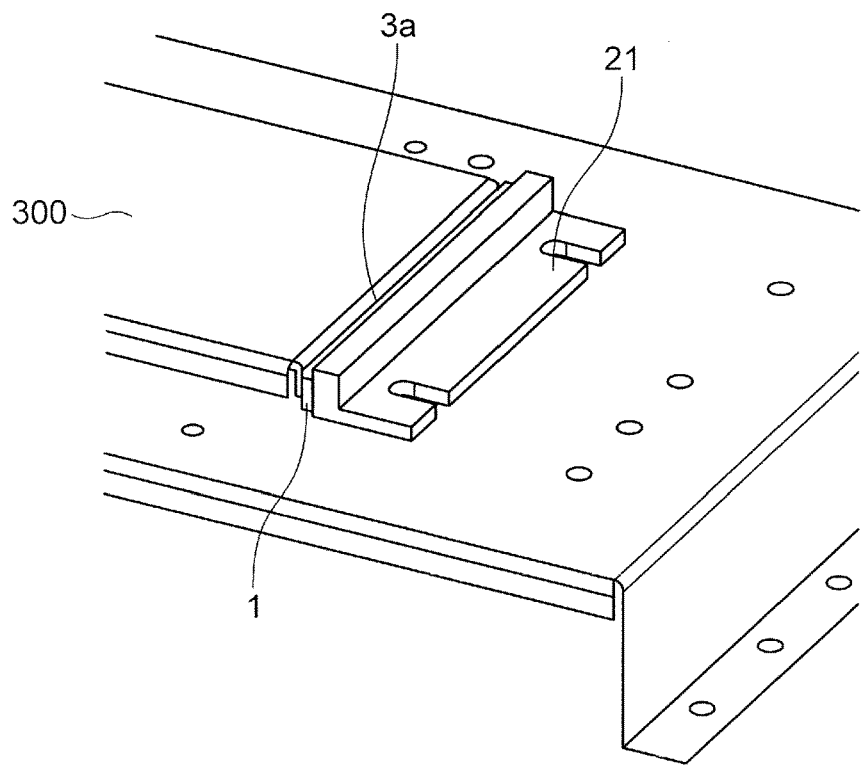
FIG. 33B is an enlarged perspective view of a part of the experimental simplified driving unit shown in FIG. 33A.

The inventors conducted experimental study tests on the reducing effect of the radiated sound caused by vibration in the case when the damping component 4G shown in FIG. 32 was used. This experiment will be described with reference to FIGS. 33 through 35. The experimental simplified driving unit 10 shown in FIG. 33 is configured such that the exciter 8 is attached to the vibrated member 7 and a burst random signal of a frequency band from 0 to 1500 Hz was given to the exciter 8 to vibrate the vibrated member 7. Sound pressure levels Pa (dB) of radiated sounds generated corresponding to the vibration were measured by a microphone not shown by using Test Lab. Manufactured by LMS Co. The microphone not shown measuring the sound pressure levels of the radiated sounds was installed at a position above the center of the vibrated member 7 distant by 30 cm. still further, an experimental vibration pickup 9 was attached on the vibrated member 7 in the vicinity of the exciter 8.

The vibrated member 7 of the experimental simplified driving unit 10 was formed of a zinc-coated steel plate of about 280 mm in longitudinal length, about 123 mm in short length, and 1 mm in thickness. The inner member 300 was formed of a zinc-coated steel plate of about 98 mm in longitudinal length, about 68 mm in short length, 1 mm in thickness, and about 56 g in weight. Still further, as shown in FIG. 33, only the first and second attachment portions 21 and 22 were provided in the experimental simplified driving unit 10, and the damping member 1 was compressively held only between the first and second attachment portions 21 and 22 and the inner member 300. As the damping member 1, one whose loss factor measured by the mechanical impedance method is 1.5 and formed to be 3 mm in thickness was used. Then, the compression amount of the damping member 1 was set at a compression amount (around 0.5 mm) of about 17% totaling a compression amount caused by the first attachment portion 21 and the inner member 300 and a compression amount caused by the second attachment portion 22 and the inner member 300. It is noted that sound pressure level Pa (dB) of the case (ref) of only the vibrated member 7 without attaching the damping component 4 was also measured for comparison.

Figure 34A:
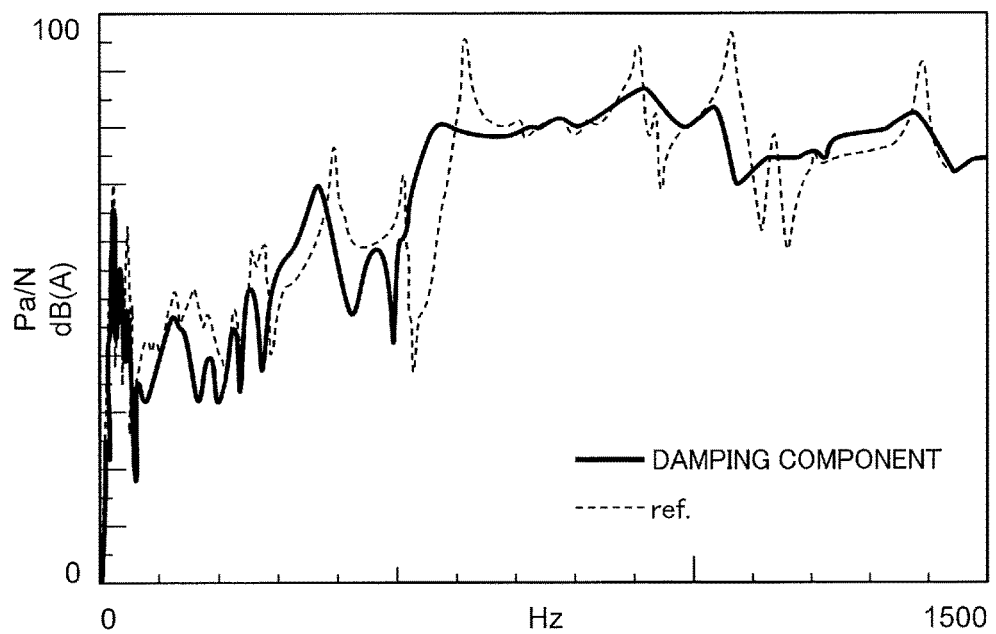
FIG. 34A is a line graph indicating experimental results of radiated sounds of the damping component shown in FIG. 32.

FIG. 34A is a line graph indicating sound pressure levels of radiated sounds. As it is apparent from FIG. 34A, the damping component 4 could reduce not only radiated sound of only one frequency band but also radiated sound in a wide frequency band up to 1,500 Hz as compared to the case of only the vibrated member 7 without attaching the damping component. Still further, while sharp acoustic peaks are generated in several frequencies in the case of only the vibrated member 7 without the damping component, it is possible to confirm that an effect of suppressing such acoustic peak is brought about when the damping component 4G shown in FIG. 32 is attached.

Figure 34B:
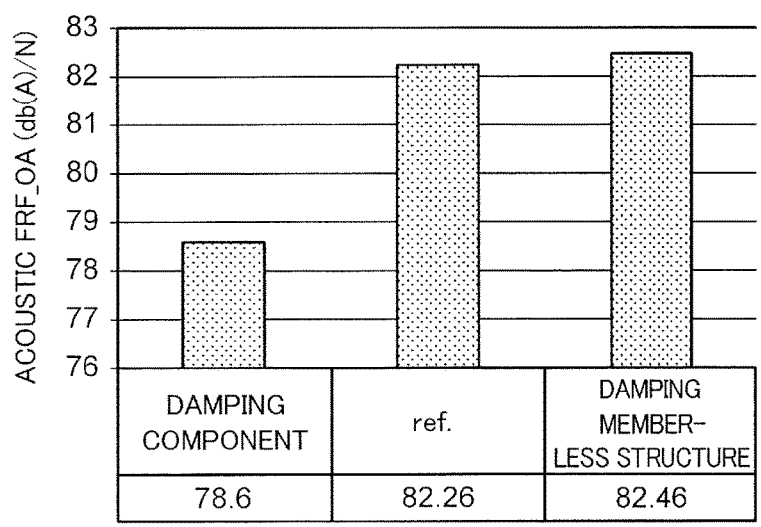
FIG. 34B is a bar graph indicating overall values of the sound pressure levels of the radiated sounds of the damping component.

FIG. 34B indicates overall values (dB) of the sound pressure levels Pa. Here, a case of a damping member-less configuration which includes no damping member and in which the inner member 300 is directly held by the attachment portions 21 through 24 was indicated for comparison. The overall values of the sound pressure levels were respectively 78.6 dB in the case when the damping component 4G was attached and 82.26 dB in the case of only the vibrated member 7 without attaching the damping component. That is, the overall value of the sound pressure level was reduced by 3.66 dB when the damping component 4G was attached. It is noted that the overall value of the sound pressure level was 82.46 dB in the case of the damping member-less configuration. That is, the overall value of the sound pressure level was reduced by 3.86 dB when the damping component 4G was attached. It was thus verified that the vibration was reduced and the radiated sound was suppressed when the damping component 4G was attached.

Figure 35:
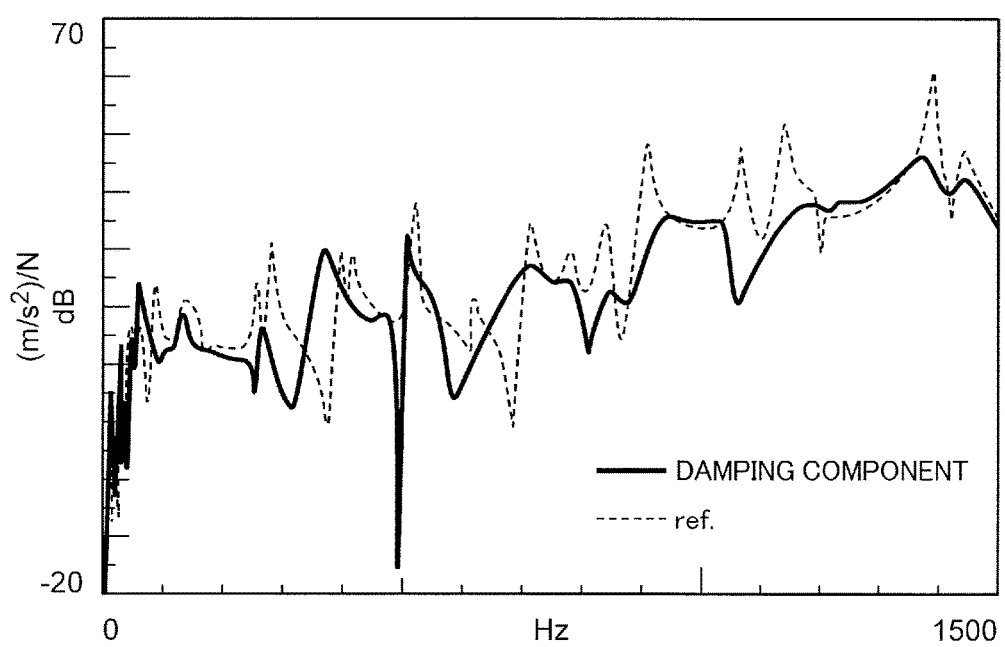
FIG. 35 is a line graph indicating an experimental result of a measurement of vibration of the damping component.

FIG. 35 is a graph indicating Fourier spectrum of the vibration measured by an experimental vibration pickup 9. As shown in FIG. 35, it can be seen that vibration level of the vibrated member 7 is reduced in a wide frequency band by the damping component 4G shown in FIG. 32.

It is possible to obtain the vibration reducing effect even by the damping component 4G of the seventh embodiment more than conventional ones by the damping member 1 whose amount is less than that of the conventional method of pasting the damping member over the entire surface of the frame. It is possible to considerably cut a cost of the device achieving vibration control and noise reduction. Still further, it is possible to reduce vibration in a wide frequency band by attaching the damping component.

Still further, according to the damping component 4G of the seventh embodiment, the inner member 300 (more specifically, the main flat portion 3f) becomes a lid covering the range surrounded by the attachment member 200 and has also the effect of blocking the radiated sound generated on the surface of the vibrated member 7 facing the inner member 300. This arrangement makes it possible to reduce noise further in addition to the reduction of the radiated sound brought about by the vibration reducing effect.

Still further, according to the damping component 4G of the seventh embodiment, the vibrated member 7 hardly distorts in the in-plane direction by covering the vibrated member 7 by the main flat portion 3f. This arrangement makes it possible not only to reduce the vibration in the out-of-plane direction of the vibrated member 7 but also to reduce the vibration in the in-plane direction of the vibrated member 7 in the same time.

Eighth Embodiment

Figure 36A:
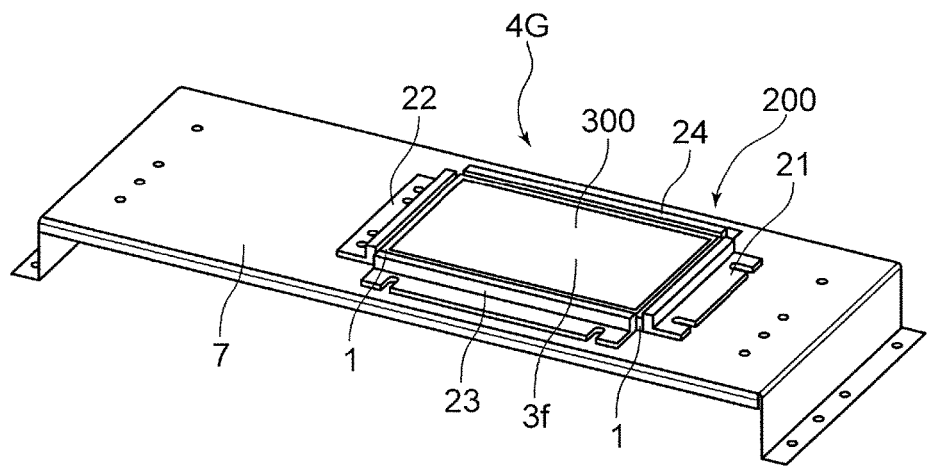
FIG. 36A is a perspective view schematically illustrating a damping structure of an eighth embodiment.
Figure 36B:
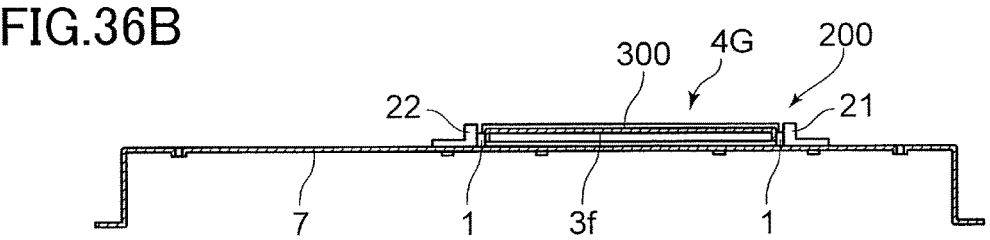
FIG. 36B is a section view of the damping structure shown in FIG. 36A.
Figure 36C:
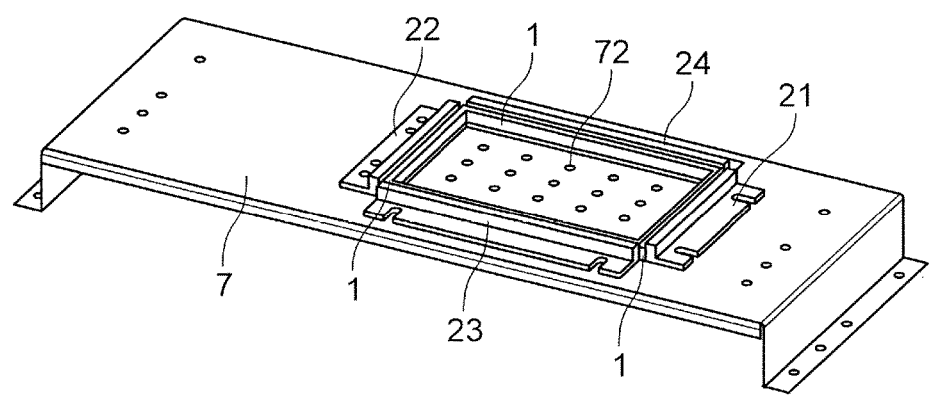
FIG. 36C is a perspective view illustrating a modification of the damping structure shown in FIG. 36A.

An eighth embodiment of the invention will be described. A damping structure shown in FIG. 36 is what the damping component 4G shown in FIG. 32 is attached to the vibrated member 7. Because the damping component 4G is the same with that shown in FIG. 32, an explanation thereof will be omitted here. In the damping structure shown in FIG. 36, a large number of frame holes 72 is provided within the range of the vibrated member 7 facing the main flat portion 3f of the damping component 4G, i.e., the range of the vibrated member 7 surrounded by the attachment portions 21 through 24. A first merit of providing the frame holes 72 within the range described above is that the radiated sound can be reduced more as compared to the case of using the damping component 4G solely. That is, because an area of the vibrated member 7 is decreased by providing the frame holes 72 through the vibrated member 7, the radiated sound caused by vibration the vibrated member 7 is reduced as compared to that before the frame holes 72 are formed. Therefore, it is possible to obtain a radiated sound reducing effect by the frame holes 72 in addition to the vibration reducing effect of the damping component 4G. It is thus possible to reduce the radiated sound more by their synergy effect by providing the frame holes 72.

A second merit of providing the frame holes 72 is that it is possible to suppress the increase of the weight of the vibrated member 7 otherwise caused by the attachment of the damping component 4 without lowering rigidity of the vibrated member 7. That is, because the large number of frame holes 72 is provided in the range of the area almost equal to that of the main flat portion 3f of the inner member 300, the weight of the damping structure does not increase so much. It is possible to suppress the increase of the weight in particular in a case when the vibrated member 7 and the inner member 300 are formed of sheet metals of a same material and the attachment member 200 is formed of low density resin member or the like. The main flat portion 3f, i.e., a plane, of the inner member 300 reinforces the vibrated member 7 within the range in which the frame holes 72 are perforated. That is, the vibrated member 7 is made difficult to distort in the in-plane direction through the attachment portions 21 through 24 by covering the vibrated member 7 by the main flat portion 3f. Therefore, it is possible to minimize a drop of the rigidity of the vibrated member 7 caused by the frame holes 72 perforated as described above.

Ninth Embodiment

Figure 37A:
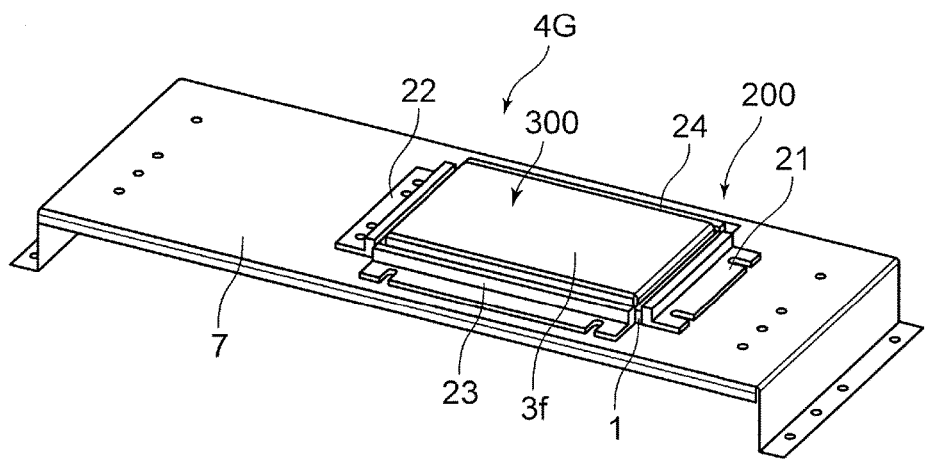
FIG. 37A is a perspective view schematically illustrating a damping structure of a ninth embodiment.
Figure 37B:
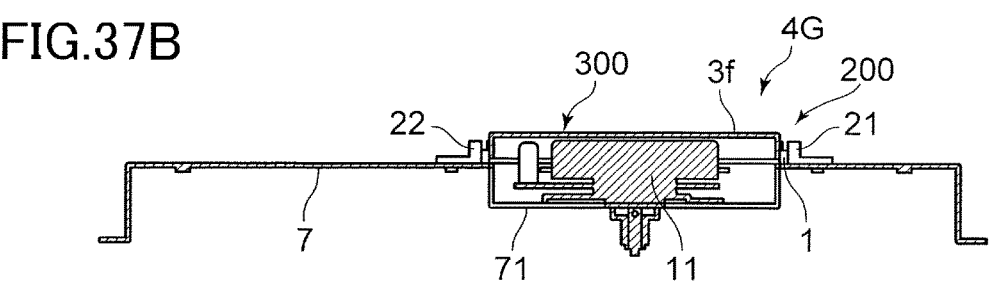
FIG. 37B is a section view of the damping structure shown in FIG. 37A.
Figure 37C:
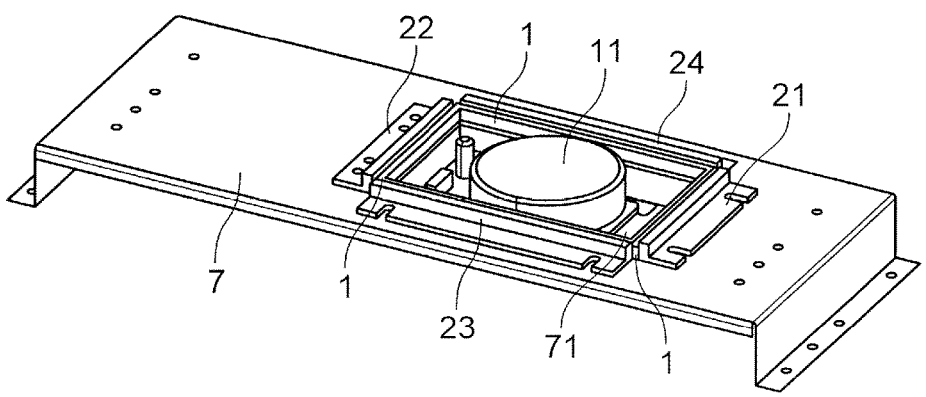
FIG. 37C is a perspective view illustrating a state in which a motor mounting portion is uncovered.

A ninth embodiment of the invention will be described. A damping structure shown in FIG. 37 includes the vibrated member 7, the motor 11, i.e., an exciter, and the damping component 4G shown in FIG. 32. A surface (frame surface) of the range of the vibrated member 7 surrounded by the attachment portions 21 through 24 projects on a side opposite to the damping component 4 and forms a box-like motor mounting portion 71. The motor 11 can be stored and mounted into the motor mounting portion 71. A depth of the motor mounting portion 71 is determined such that an upper surface of the stored motor 11 does not come into contact with the inner member 300 not only during a stationary time but also during a vibration time. The inner member 300 covers a spatial area formed by the attachment portions 21 through 24 such that the main flat portion 3f covers the vibrated member 7 in the range surrounded by the attachment portions 21 through 24. Thereby, the motor 11 is stored within a closed space formed of the inner member 300, the attachment portions 21 through 24, and the motor mounting portion 71. This arrangement makes it possible not only to reduce radiated sound generated by vibration of the vibrated member 7 to which rotational vibration of the motor 11 is propagated by the damping component 4G but also to block and prevent airborne sound directly radiated from the motor 11 from leaking to outside.

It is noted that the motor mounting portion 71 is not limited to what is integrally formed with the vibrated member 7 by molding the vibrated member 7. For instance, the motor mounting portion 71 may be formed separately from the vibrated member 7 and may be attached to a surface on a side opposite from the damping component 4G of the vibrated member 7 by means of screws or the like. However, in such a case, it is necessary to perforate a hole of size surrounded by the attachment portions 21 through 24 of the vibrated member 7 at such position on the frame surface in advance. Still further, the damping component 4G may have only either one combination of the first and second attachment portions 21 and 22 facing with each other or the third and fourth attachment portions 23 and 24 (see FIG. 33).

Tenth Embodiment

Figure 38A:
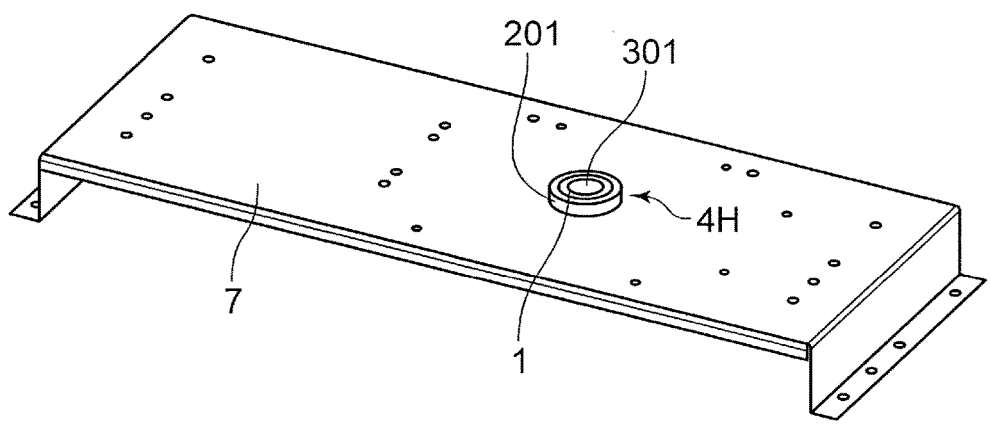
FIG. 38A is a perspective view schematically illustrating a damping structure of a tenth embodiment.
Figure 38B:
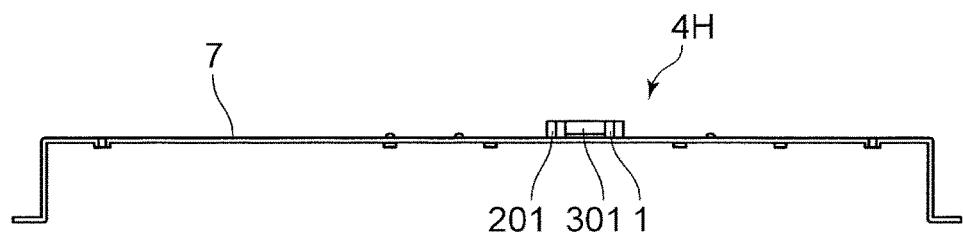
FIG. 38B is a section view of the damping structure shown in FIG. 38A.
Figure 38C:
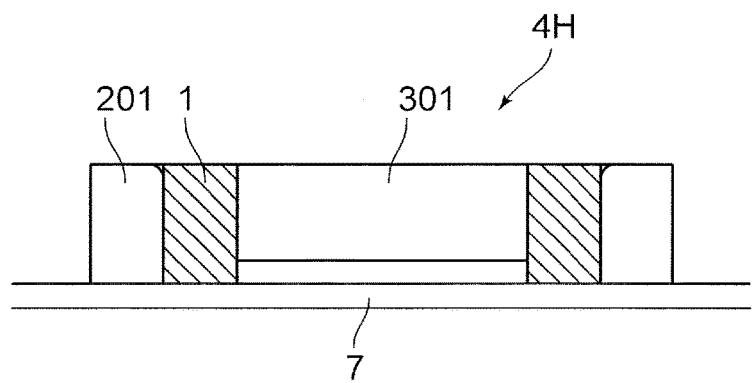
FIG. 38C is an enlarged section view of a damping component shown in FIG. 38B.
Figure 39A:
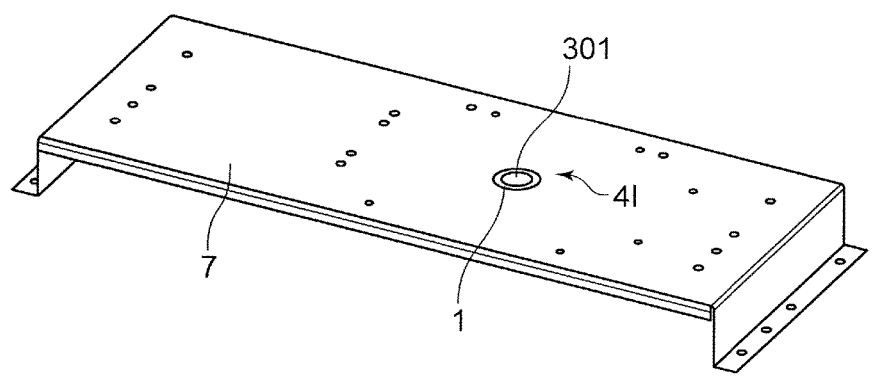
FIG. 39A is a perspective view schematically illustrating a modification of the damping structure of the tenth embodiment.
Figure 39B:
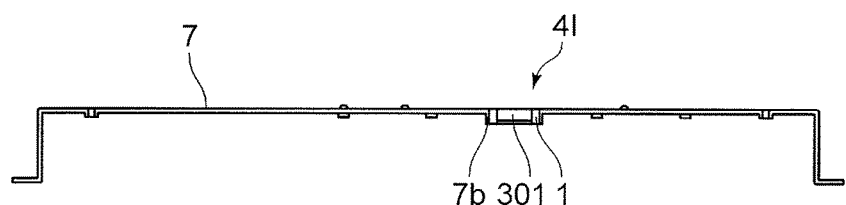
FIG. 39B is a section view of the damping structure shown in FIG. 39A.
Figure 39C:
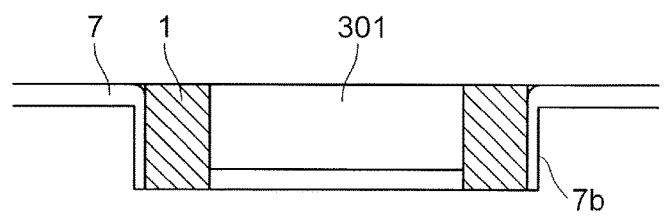
FIG. 39C is an enlarged section view of a damping component shown in FIG. 39B.

A damping component of a tenth embodiment of the invention will be described with reference to FIGS. 38 and 39. A damping component 4H shown in FIG. 38 is composed of the damping member 1, an attachment member 201, and an inner member 301, i.e., an opposed member. The attachment member 201 is a cylindrical member, and the cylindrical damping member 1 is disposed on an inner circumferential side of the attachment member 201. Still further, the columnar inner member 301 is disposed inside of the damping member 1. The inner member 301 can be fitted into the attachment member 201 and compressively holds the damping member 1 with the attachment member 201. Because the damping member 1 is the same with that of the damping components of the first through ninth embodiments, an explanation thereof will be omitted here.

The attachment member 201 is fixed to the vibrated member 7 so as to project out of the vibrated member 7. While any material may be adopted for the attachment member 201 as long as its rigidity is higher than that of the damping member 1, the attachment member 201 is preferable to be a molded part molded from a low density resin or the like from aspects of lightening its weight and of readiness of attachment. While the attachment member 201 may be a component separated from the vibrated member 7, the attachment member 201 is not limited to such configuration. For instance, in a case when the vibrated member 7 is formed of a sheet metal, the vibrated member 7 may be caused to cylindrically project to integrally form the attachment member 201 with the vibrated member 7 (see FIG. 39 described later). As described above, the inner member 301 is required to have a certain degree of weight and is specifically desirable to be at least heavier than the damping member 1 in order to enhance the effect of inertia force. To that end, the inner member 301 is preferable to be high density material such as steel. The inner member 301 is formed into a cylindrical shape of 20 mm in diameter and 8 mm in height for example.

In a case when the damping component 4H shown in FIG. 38 is attached to the vibrated member 7, the inner member 301 is disposed at a position distant from a surface of the vibrated member 7. That is, the inner member 301 only compressively holds the damping member 1 and is not in contact with anything but the damping member 1. Therefore, even if the vibrated member 7 vibrates in the out-of-plane direction (in the vertical direction with respect to the surface of the vibrated member 7), the inner member 301 is not directly affected by the vibration and does not vibrate in the same directions together with the vibrated member 7. Meanwhile, when the vibrated member 7 vibrates, the inner member 301 generates inertia force in the out-of-plane direction of the vibrated member 7. When the inner member 301 generates the inertia force, the inner member 301 relatively moves in the out-of-plane direction of the vibrated member 7 while generating a phase difference with respect to the attachment member 201 in noncontact with the vibrated member 7. That is, even if the vibrated member 7 vibrates, the inner member 301 hardly vibrates with the same phase and amplitude with the vibrated member 7. Thus, when the vibration is propagated to the attachment member 201, the attachment member 201 and the inner member 301 move while generating the phase difference, and the damping member 1 compressively held between the attachment portions 21 through 24 and the inner member 300 generates distortion in the shear direction (in the out-of-plane direction of the vibrated member 7). The damping member 1 generates friction due to the distortion thereof, and vibration energy vibrating the vibrated member 7 is converted into thermal energy. Because the damping member 1 is in contact tightly with both of the attachment member 201 and the inner member 301, the friction is liable to be generated by the distortion and the vibration energy is efficiently converted into the thermal energy. As a result, the vibration of the vibrated member 7 is reduced and the radiated sound caused by the vibration is reduced.

It is noted that the damping member 1 is not limited to be endless and may be an ended member such as a sheet. In such a case, the damping member 1 is wound around the cylindrical inner member 301 and is then fitted into the attachment member 201 together with the inner member 301. Still further, the attachment member 201 is not limited to be cylindrical and may be oval. The attachment member 201 may not be also limited to be endless and may be an ended member such as a member formed approximately into a letter C.

Still further, while the attachment member 201 projects out of the surface of the vibrated member 7 on the side opposite from the direction of gravity in the damping component 4H shown FIG. 38, the invention is not limited to such configuration. The damping component may be the damping component 4I in which a project portion 7b, i.e., an attachment portion, is caused to project out of the surface of the vibrated member 7 in the direction of gravity as shown in FIG. 39. The same effect with the damping component 4H shown in FIG. 38 can be obtained also by the damping component 4I shown in FIG. 39. It is noted that although not shown, the attachment member 201 may be provided with male threads formed around an outer circumferential surface thereof as a screw portion and may be attached to the vibrated member 7 through which female threads engaging with the mail threads are provided.

It is noted that it is desirable to use the damping member 1 having a loss factor of 0.05 or more in order to obtain the vibration reducing effect more effectively. It is more preferable to use the damping member 1 whose loss factor measured by the mechanical impedance method in the compressed state is 0.4 or more.

Eleventh Embodiment

Figure 40A:
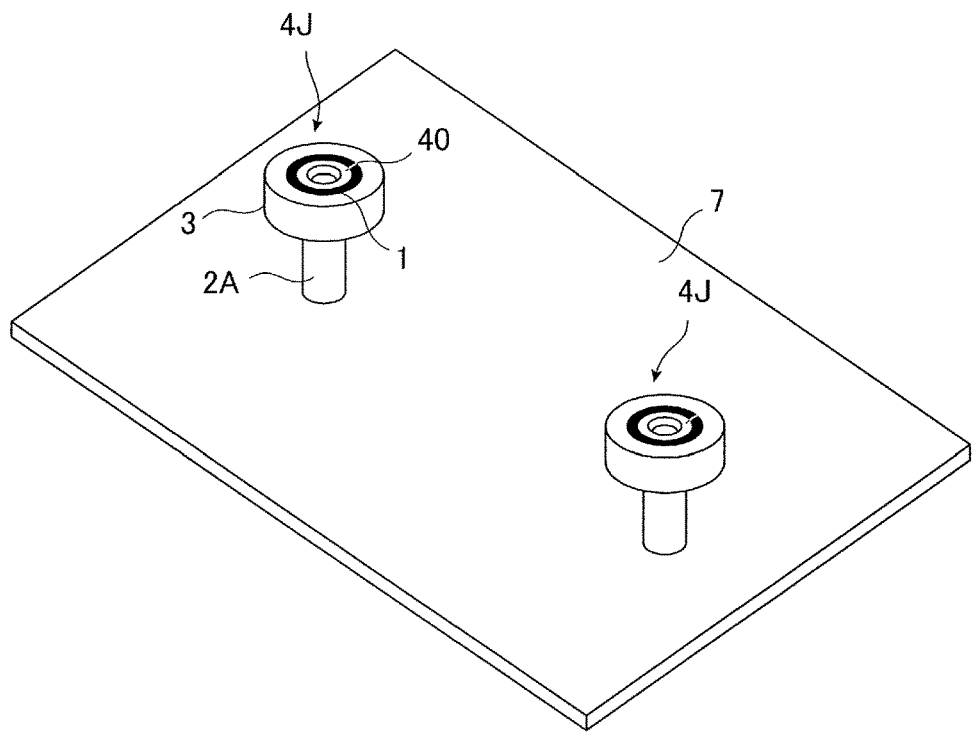
FIG. 40A is a perspective view schematically illustrating a damping component of an eleventh embodiment.

An eleventh embodiment of the invention will be described with reference to FIGS. 40 and 41. A damping component 4J shown in FIG. 40A is largely different from the damping component 4 shown in FIG. 1A in that the damping component 4J includes an intermediate member 40. The intermediate member 40 is disposed between a rod member 2A, i.e., an attachment member and the outer member 3, i.e., an opposed member. That is, the intermediate member 40 is formed into a cylindrical shape for example and is disposed so as to surround the cylindrical rod member 2A. A cylindrical damping member 1 is disposed around an outer circumference of the intermediate member 40 so as to surround the intermediate member 40. That is, the damping member 1 is formed into a cylindrical shape whose inner diameter is smaller than an outer diameter of the intermediate member 40, and the intermediate member 40 is disposed on the inner circumferential side of the damping member 1. The cylindrical outer member 3 is disposed around an outer circumference of the damping member 1 so as to surround the damping member 1. These intermediate member 40, the damping member 1, the outer member 3, and the rod member 2A are not limited to be cylindrical and may be formed into a polygonal shape such as a quadratic column and an octagonal column.

The damping member 1 is compressively held between the outer member 3 and the intermediate member 40. That is, the damping member 1 whose outer diameter before compression is larger than an inner diameter of the outer member 3 or whose inner diameter before compression is smaller than an outer diameter of the intermediate member 40 is used. The damping member 1 is formed of a similar member with those of the respective embodiments described above, i.e., a special acrylic rubber or the like. That is, the damping member 1 is a vibration energy absorbing member whose loss factor measured by the mechanical impedance method in a compressed state is 0.05 or more. The damping member 1 has rigidity lower than that of the intermediate member 40 and the outer member 3. It is noted that the damping member 1 may be held by being bonded with the outer member 3 and the intermediate member 40 in the state interposed and compressed between the outer member 3 and the intermediate member 40.

Figure 40B:
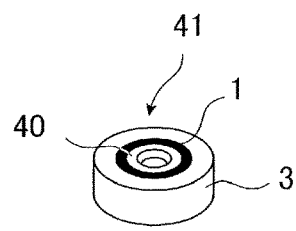
FIG. 40B is a perspective view schematically illustrating a part of a damping component in FIG. 40A.

As shown in FIG. 40B, the intermediate member 40, the damping member 1, and the outer member 3 are integrally formed and compose one damping member interposing member 41. In this case, female threads 42 are formed on an inner circumferential surface of the intermediate member 40 and male threads 6A engaging with the male threads 42 are formed on an upper end part, i.e., on a side opposite from a vibrated member side, of the rod member 2A for example. This arrangement makes it possible for the damping member interposing member 41 to separate from the rod member 2A through the intermediate member 40. That is, the damping member interposing member 41 is freely attachable to the rod member 2A. Still further, while not shown here, male threads 6 for attaching the rod member 2 to the vibrated member 7 are formed at a lower end part, i.e., the vibrated member side, of the rod member 2 (see FIG. 1). Then, the rod member 2A is formed such that an outer diameter of a range 50 between these upper and lower end parts is larger than outer diameters of these upper and lower end parts. That is, an outer circumferential surface of the rod member 2A is formed stepwise. An attachment position of the damping member interposing member 41 with respect to the axial direction of the rod member 2A is determined by the range 50 formed on the rod member 2A. The range 50 is formed such that the range 50 does not come into contact at least with the outer member 3 when the damping member interposing member 41 is attached to the rod member 2A. Specifically, an outer diameter of the range 50 is smaller than the inner diameter of the outer member 3.

Figure 40C:
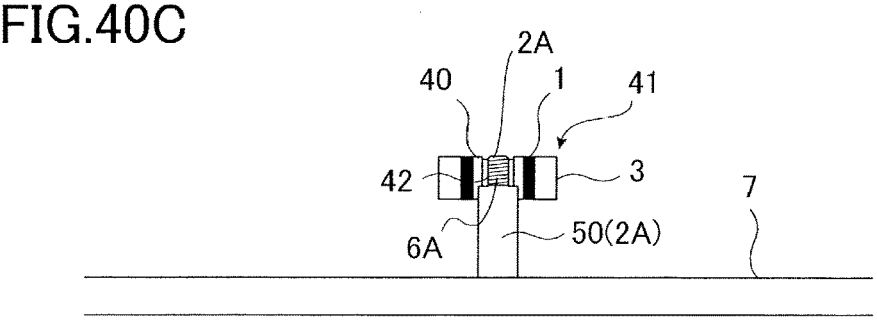
FIG. 40C is a section view illustrating the damping component shown in FIG. 40A.

A damping principle of the damping member interposing member 41 described above will be described. As shown in FIG. 40C, the damping member interposing member 41 is attached to the rod member 2A such that the outer member 3 is disposed at a position separated from the surface of the vibrated member 7. That is, the outer member 3 only compressively holds the damping member 1 and is not in contact with anything but the damping member 1. Therefore, even if the vibrated member 7 vibrates in the out-of-plane direction, the outer member 3 is not directly affected by the vibration and does not vibrate in the same directions together with the vibrated member 7. That is, when the vibrated member 7 vibrates, the outer member 3 generates inertia force in the out-of-plane direction of the vibrated member 7. When the outer member 3 generates the inertia force, the outer member 3 relatively moves in the out-of-plane direction of the vibrated member 7 while generating a phase difference with respect to the rod member 2A in noncontact with the vibrated member 7. Therefore, even if the vibrated member 7 vibrates, the outer member 3 hardly vibrates with the same phase and amplitude with the vibrated member 7. As a result, the damping member 1 compressively held between the intermediate member 40 and the outer member 3 generates distortion in the shear direction (in the out-of-plane direction of the vibrated member 7 or in the axial direction of the rod member 2A). The damping member 1 generates friction due to the distortion thereof, and vibration energy vibrating the vibrated member 7 is converted into thermal energy. Because the damping member 1 is in contact tightly with both of the intermediate member 40 and the outer member 3, the friction is liable to be generated by the distortion and the vibration energy is efficiently converted into the thermal energy. As a result, the vibration of the vibrated member 7 is reduced and the radiated sound caused by the vibration is reduced. The outer member 3 is required to have a certain degree of weight and is desirable to be at least heavier than the damping member 1 in order to generate a larger inertia force.

The present embodiment makes it possible to readily manufacture the damping component 4J exerting different damping effects just by replacing the damping member interposing member 41. Still further, even if the damping component 4J is in a condition being attached to the vibrated member 7, the damping member interposing member 41 can be replaced with another one. Accordingly, if a plurality of damping member interposing members 41 whose compression amount of the damping member 1 is differentiated is prepared in advance, it becomes possible to readily obtain the different damping effects just by appropriately replacing these damping member interposing members 41. Still further, even in a case when the vibrated member 7 is formed integrally with the rod member 2A as described later, it is possible to obtain the damping effect readily just by attaching the damping member interposing member 41 to the rod member 2A.

The method for attaching the damping member interposing member 41 to the rod member 2A is not limited to screwing of the male threads 6A and the female threads 42 described above. For instance, it is possible to attach the damping member interposing member 41 to the rod member 2A by welding the intermediate member 40 to the rod member 2A. This method will be described below with reference to FIGS. 41A and 41B.

Figure 41A:
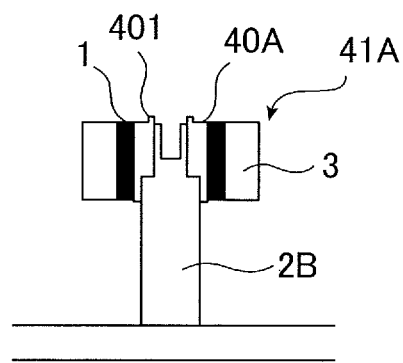
FIG. 41A is a section view schematically illustrating an attachment method of the damping component of the eleventh embodiment.

As shown in FIG. 41A, a cylindrical project portion 401 having a same diameter with an upper end part of the rod member 2B is formed so as to extend in the axial direction at an upper end part of the intermediate member 40A. The cylindrical project portion 401 is formed of a thermoplastic resin, e.g., ABS resin. A damping member interposing member 41A is composed of an intermediate member 40A including the cylindrical project portion 401, the damping member 1, and the outer member 3. A tip of the upper end part of the rod member 2B is concaved.

Figure 41B:
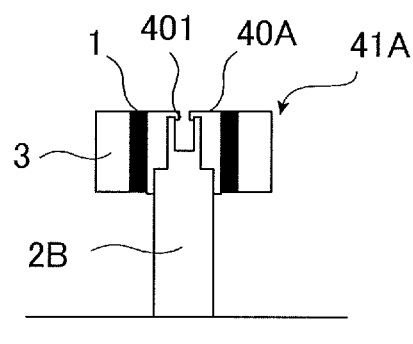
FIG. 41B is a section view schematically illustrating the attachment method of the damping component.

The method for attaching the damping member interposing member 41A to the rod member 2B will now be described. As shown in FIG. 41A, the damping member interposing member 41A is temporarily attached to the rod member 2B at first. Then, the cylindrical project portion 401 is heated by a thermal welding jig not shown. Along with heating, the cylindrical project portion 401 thermally melts. Then, the thermally molten cylindrical project portion 401 expands and enters the concave portion of the tip of the rod member 2B as shown in FIG. 41B. After an elapse of a predetermined time, the cylindrical project portion 401 is cooled and solidified. That is, the intermediate member 40A is fixed to the rod member 2B. Thus, the damping member interposing member 41A is attached to the rod member 2B by the thermal deformation of the cylindrical project portion 401 which is a part of the intermediate member 40A. Note that it is also possible to configured to be able to attach the damping member interposing member 41A to the rod member 2B by using another method such as thermal contraction of the inner diameter of the intermediate member 40A for example as long as the compression amount of the damping member 1 is not changed.

The damping component may be also configured such that the damping member interposing member 41 (41A) described above can be attached to a project portion integrally formed with the vibrated member 7. Thereby, it is readily obtain the damping effect just by attaching an arbitrary damping member interposing member 41 even to an existing device. However, because the vibrated member 7 is a resin molded member in general, an inclined draft is generated in the project portion. That is, the project portion is a tapered (conical) shaft whose outer diameter gradually decreases to the tip side in the project direction. It is preferable to bring the outer circumferential surface of the project portion into contact tightly with the inner peripheral surface of the intermediate member 40 in order to obtain the high damping effect by attaching the damping member interposing member 41 (41A) to the tapered project portion. It is because if the outer circumferential surface of the project portion is not in contact tightly with the inner circumferential surface of the intermediate member 40, the damping member 1 hardly distorts in the shear direction even if the vibrated member 7 vibrates and the damping effect cannot be fully obtained.

Twelfth Embodiment

Then, a damping member interposing member of a twelfth embodiment that is capable to attaching the inner circumferential surface of the intermediate member to the outer circumferential surface of the project portion will be described with reference to FIGS. 42 and 43. However, because the damping member 1 and the outer member 3 are the same with those of the damping member interposing member 41 described above, their explanation will be omitted here.

Figure 42A:
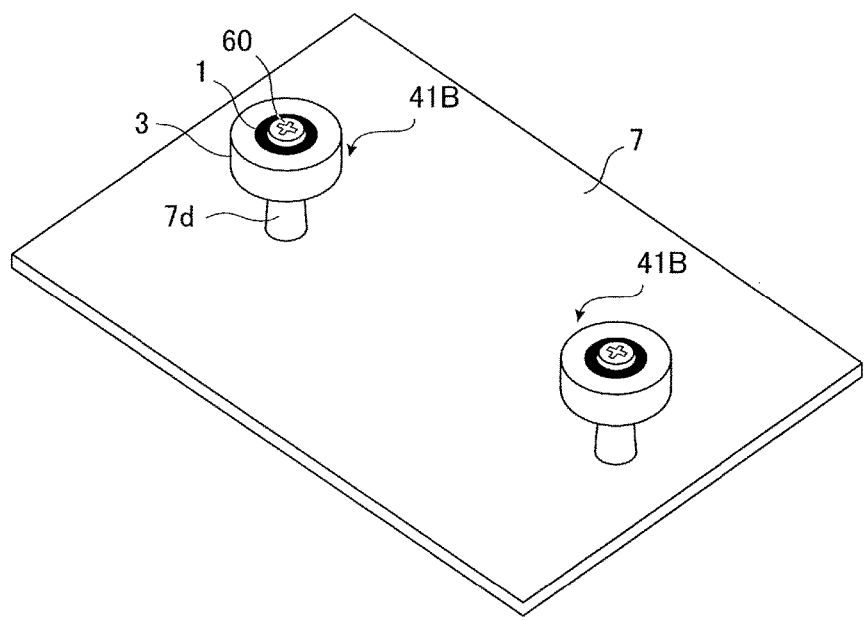
FIG. 42A is a perspective view schematically illustrating a damping structure of a twelfth embodiment.
Figure 42B:
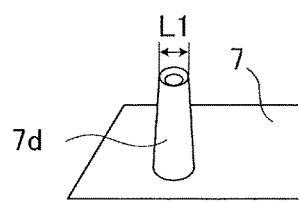
FIG. 42B is a perspective view illustrating a part of the damping structure shown in FIG. 42A.

In a damping structure shown in FIG. 42A, the damping member interposing member 41B is formed attachably to a project portion 7d projecting out of a surface of the vibrated member 7. In the damping member interposing member 41B, the intermediate member 40B shown in FIG. 42C, the damping member 1, and the outer member 3 are integrally formed. The damping member 1 is compressively held between the intermediate member 40B and the outer member 3. As shown in FIG. 42B, the project portion 7d is a tapered shaft integrally formed with the vibrated member 7.

Figure 42C:
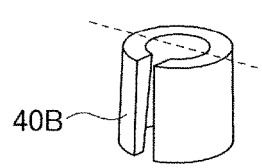
FIG. 42C is a perspective view illustrating another part of the damping structure shown in FIG. 42A.
Figure 42D:
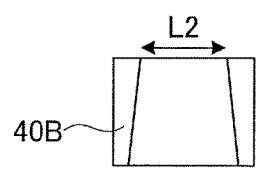
FIG. 42D is a section view illustrating the part shown in FIG. 42C.

As shown in FIGS. 42C and 42D, the inner circumferential surface of the intermediate member 40B is formed in taper so as to approximately coincident with the outer circumferential surface of the project portion 7d. That is, a tapered angle of the intermediate member 40B is almost equal to a tapered angle of the project portion 7d. Still further, the intermediate member 40B is formed such that an inner diameter L2 of the upper end part thereof is smaller than an outer diameter L1 (see FIG. 42B) of the upper end part of the project portion 7d. Still further, the intermediate member 40B is provided with a slit extending in the project direction.

Figure 42E:
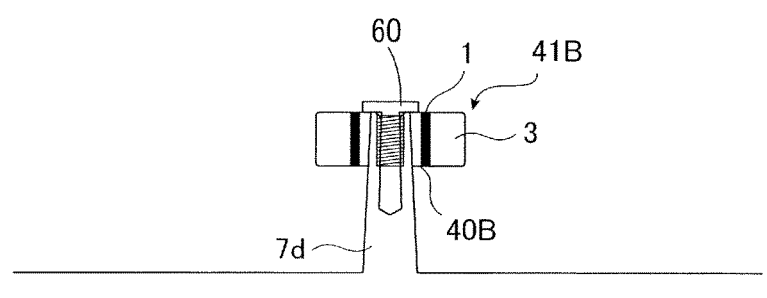
FIG. 42E is a section view illustrating how to attach the damping component.

As shown in FIG. 42E, the damping member interposing member 41B including the intermediate member 40B is attached to the project portion 7d by screwing a fixing screw 60. Along screwing of the fixing screw 60, the intermediate member 40B is pressed against the project portion 7d while elastically deforming along the outer circumferential surface of the project portion 7d, and the intermediate member 40B gradually expands to the damping member 1 side, i.e., the outer diameter thereof changes. In response to that, the damping member 1 interposed between the intermediate member 40B and the outer member 3 is gradually and strongly compressed. Then, the damping member interposing member 41B is pressed into the project portion 7d until when levels of the upper end part of the damping member interposing member 41B and the upper end part of the project portion 7d are almost equalized. In this case, the damping member 1 is compressed with a compression amount corresponding to a difference "L2–L1" between the inner diameter L2 of the upper end part of the intermediate member 40B before the compression and the outer diameter L1 of the upper end part of the project portion 7d.

It is noted that the intermediate member 40B described above may not be provided with the slit. In such a case, however, the outer diameter of the intermediate member 40B does not change even if the fixing screw 60 is screwed, the compression state of the damping member 1 does not change before and after the attachment. Accordingly, in the case when no slit is formed in the intermediate member 40B (however, the inner circumferential surface is formed in taper), a damping member interposing member 41B in which the damping member 1 has been already compressed by an arbitral compression amount is used.

In the case of the damping member interposing member 41B including the intermediate member 40B described above, it is necessary to attach the damping member interposing member 41B to the tapered project portion 7d whose outer circumferential surface almost coincides with the inner circumferential surface of the intermediate member 40B. That is, an applicable range of the damping member interposing member 41B including the intermediate member 40B described above is restrictive. In view of this point, a more versatile damping member interposing member that can be attached by bringing the inner circumferential surface of the intermediate member into contact tightly with the outer circumferential surface of the project portion is required. Then, a more versatile damping member interposing member will be described below with reference to FIGS. 43A through 43E.

Figure 43A:
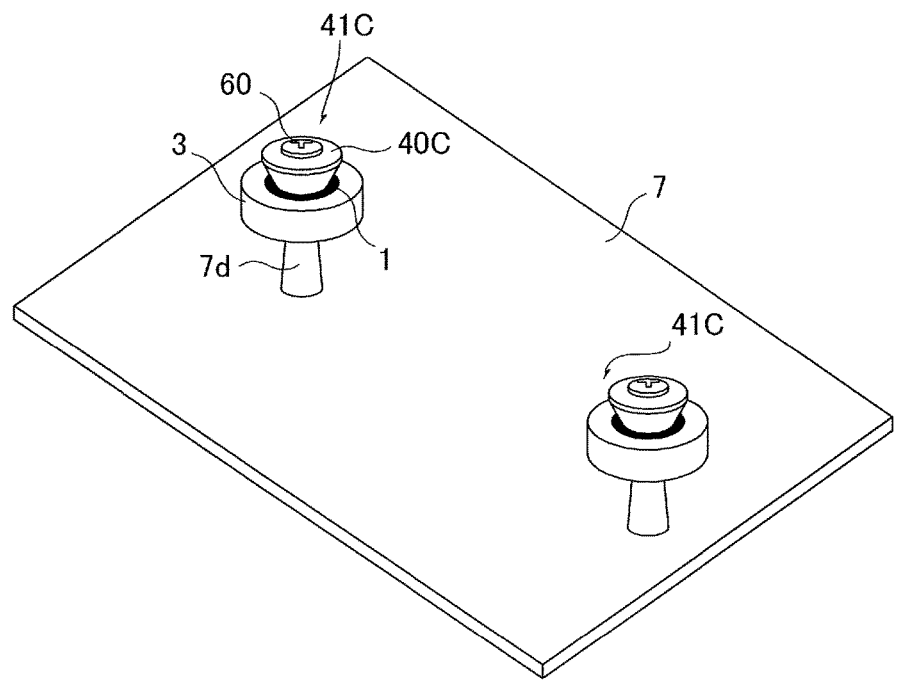
FIG. 43A is a perspective view schematically illustrating another example of the damping structure of the twelfth embodiment.
Figure 43B:
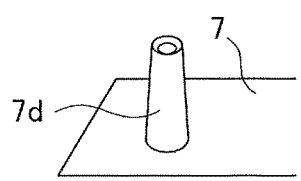
FIG. 43B is a perspective view illustrating a part of the damping structure.

In a damping structure shown in FIG. 43A, a damping member interposing member 41C is formed so as to be attachable to the project portion 7d projecting out of the surface of the vibrated member 7. In the damping member interposing member 41C, the intermediate member 40C, the damping member 1, and the outer member 3 are integrally formed. The damping member 1 is compressively held between the intermediate member 40C and the outer member 3. As shown in FIG. 43B, the project portion 7d is formed such that the outer circumferential surface thereof is tapered.

Figure 43C:
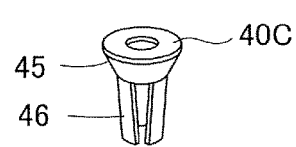
FIG. 43C is a perspective view illustrating another part of the damping structure.
Figure 43D:
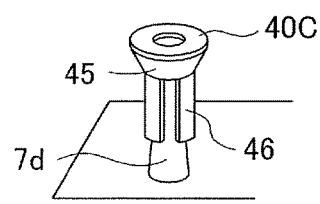
FIG. 43D is a perspective view illustrating a state in which the parts in FIGS. 43B and 43C are combined.

As shown in FIGS. 43C and 43D, the intermediate member 40C has a conical base portion 45 and a plurality (three here) of extension portions 46 extending from the base portion 45 to the attachment direction (in a direction opposite to the project direction of the project portion 7d) and conically disposed such an outer diameter of end parts is thinned in a free condition. The intermediate member 40C is provided with a plurality of cutaway parts on the outer circumferential surface of the conical body formed of resin or the like and an apex side of the conical body is split into the plurality of parts. In this case, the damping member 1 is pasted on the outer circumferential surface of the plurality of extension parts 46 and is compressed with a compression amount corresponding to a degree of extension of the extension parts 46. An outer diameter of the base portion 45 is formed to be larger than the inner diameter of the damping member 1. Therefore, a pasting position of the damping member 1 is determined by the base portion 45 and is bonded with the extension portion 46.

Figure 43E:
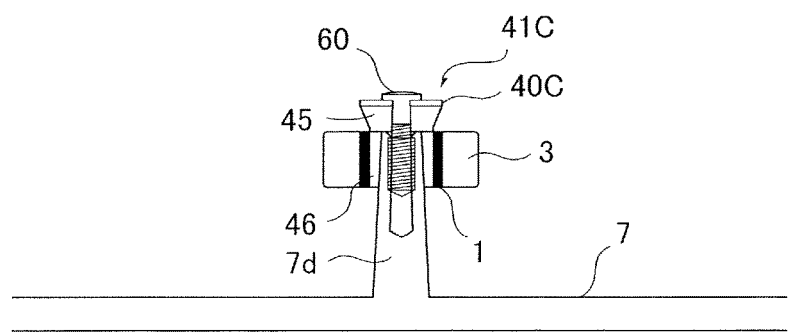
FIG. 43E is a section view illustrating a state in which the damping component is attached.

The damping member interposing member 41C including the intermediate member 40C is attached to the project portion 7d by screwing the fixing screw 60. Along with screwing of the fixing screw 60, the intermediate member 40C is pressed and fitted with the project portion 7d while elastically deforming along the outer circumferential surface of the project portion 7d, the plurality of extension parts 46 gradually expand toward the damping member 1 side at that time. In response to that, the damping member 1 interposed between the intermediate member 40C and the outer member 3 is gradually and strongly compressed. Then, the damping member interposing member 41C is pressed into the project portion 7d until when an upper end surface of the project portion 7d comes into contact with the base portion 45 of the damping member interposing member 41C. Thus, the damping member interposing member 41C is attached to the project portion 7d. In the state in which the damping member interposing member 41C is attached to the project portion 7d, the intermediate member 40C is formed such that the diameter in the axial direction in which the extension portion 46 is combined with the project portion 7d become constant as shown in FIGS. 43D and 43E. That is, a thickness in the radial direction of the extension portion 46 on the base portion 45 side is thicker than that on the tip side. Thereby, the damping member interposing member 41C is attached to the project portion 7d in a state in which the damping member 1 is compressed with a homogeneous compression amount.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-057874, filed on Mar. 20, 2015, which is hereby incorporated by reference herein in its entirety.

What is claimed is:
1. A damping component comprising:
   a base comprising an attachment portion to be attached to a vibrated member;
   a damping member disposed at an outer circumferential side of the base in a compressed state; and
   a holding portion disposed at an outer circumferential side of the damping member and compressively holding the damping member,
   wherein the base comprises a projecting portion which projects in a radial direction of the base and has an outer diameter smaller than an inner diameter of the holding portion, the projecting portion being disposed between the attachment portion and the damping member in an axial direction of the base, and wherein the damping member has rigidity lower than rigidity of the base and rigidity of the holding portion and has a loss factor, measured by a mechanical impedance method in a state being compressed between the base and the holding portion, of 0.05 or more.

2. The damping component according to claim 1, further comprising an intermediate member disposed between the base and the damping member.

3. The damping component according to claim 2, wherein the intermediate member is formed into a cylindrical shape,
wherein the damping member is formed into a cylindrical shape whose inner diameter is smaller than an outer diameter of the intermediate member, and
wherein the intermediate member is disposed at an inner circumferential side of the damping member.

4. The damping component according to claim 1, wherein the holding portion is disposed around the base.

5. The damping component according to claim 1, wherein the damping member is disposed at the outer circumferential side of the base so as to surround the outer circumference of the base.

6. The damping component according to claim 1, wherein the attachment portion comprises a screw portion removably attachable to the vibrated member.

7. The damping component according to claim 6, wherein a center axial line of the base is coincident with a center axial line of the screw portion.

8. The damping component according to claim 1, further comprising an adjusting portion capable of adjusting a compression amount of the damping member.

9. The damping component according to claim 8, wherein the adjusting portion adjusts a distance between first and second ends of the holding portion in a circumferential direction of the holding portion.

10. The damping component according to claim 9, wherein the holding portion comprises first and second pressing portions coupled with each other at a coupling portion, and
wherein the adjusting portion adjusts the distance between the first and second ends of the holding portion.

11. The damping component according to claim 8, wherein the adjusting portion comprises a bolt to be attached to the holding portion and a nut screwed with the bolt and is capable of adjusting the compression amount of the damping member by changing a relative positional relationship between the bolt and the nut, and
wherein one or a plurality of weights is removably attached to a male screw portion of the bolt attached to the holding portion.

12. The damping component according to claim 1, wherein at least one of the holding portion and the base includes a retaining portion formed into a convex or concave shape on a surface thereof in contact with the damping member being compressed.

13. The damping component according to claim 1, wherein the damping member has a loss factor, measured by the mechanical impedance method while being compressed, of 0.4 or more.

14. The damping component according to claim 1, wherein weight of the holding portion is heavier than weight of the damping member.

15. The damping component according to claim 1, wherein the attachment portion is formed integrally with the base.

16. A damping structure comprising:
a vibrated member to which vibration is transmitted from an exciter; and
a damping component coupled with the vibrated member, the damping component comprising:
a base comprising an attachment portion to be attached to the vibrated member;
a damping member disposed at an outer circumferential side of the base while being compressed; and
a holding portion disposed at an outer circumferential side of the damping member and compressively holding the damping member;
wherein the damping member has rigidity lower than rigidity of the base and rigidity of the holding portion and has a loss factor, measured by a mechanical impedance method in a state being compressed between the base and the holding portion, of 0.05 or more.

17. The damping component according to claim 16, further comprising an intermediate member provided between the base and the damping member.

18. The damping component according to claim 17, wherein the intermediate member is formed into a cylindrical shape,
wherein the damping member is formed into a cylindrical shape whose inner diameter is smaller than an outer diameter of the intermediate member, and
wherein the intermediate member is disposed at an inner circumferential side of the damping member.

19. The damping component according to claim 16, wherein the holding portion is disposed around the base.

20. The damping component according to claim 16, wherein the damping member is disposed at the outer circumferential side of the base so as to surround the outer circumference of the base.

21. The damping component according to claim 16, wherein the attachment portion comprises a screw portion removably attachable to the vibrated member.

22. The damping component according to claim 21, wherein a center axial line of the base is coincident with a center axial line of the screw portion.

23. The damping component according to claim 16, wherein the holding portion comprises an adjusting portion capable of adjusting a compression amount of the damping member.

24. The damping component according to claim 23, wherein the adjusting portion adjusts a distance between first and second ends of the holding portion in a circumferential direction of the holding portion.

25. The damping component according to claim 24, wherein the holding portion comprises first and second pressing portions coupled with each other at a coupling portion, and
wherein the adjusting portion adjusts the distance between the first and second ends of the holding portion.

26. The damping component according to claim 23, wherein the adjusting portion comprises a bolt to be attached to the holding portion and a nut screwed with the bolt and is capable of adjusting the compression amount of the damping member by changing a relative positional relationship between the bolt and the nut, and
wherein one or a plurality of weights is removably attached to a male screw portion of the bolt attached to the holding portion.

27. The damping component according to claim 16, wherein at least one of the holding portion and the base includes a retaining portion formed into a convex or concave shape on a surface thereof in contact with the damping member being compressed.

28. The damping component according to claim 16, wherein the damping member has a loss factor, measured by the mechanical impedance method while being compressed, of 0.4 or more.

29. The damping component according to claim 16, wherein weight of the holding portion is heavier than weight of the damping member.

30. The damping component according to claim 16, wherein the damping component is formed integrally with the damping member.

31. The damping component according to claim 16, wherein the damping component is attached at one or a plurality of mount positions where vibration amplitude of a surface of the vibrated member is larger than an average vibration amplitude in a state in which no damping component is attached.

32. The damping component according to claim 16, wherein an exciter is mounted on the vibrated member through the damping component.

33. The damping component according to claim 16, wherein the vibrated member is provided with a number of holes perforated through a surface thereof in a range covered by a cover portion.

34. The damping component according to claim 16, wherein an exciter comprises a driving portion rotationally driving a rotator and fixed shaft fixed to the vibrated member while rotatably supporting the rotator rotated by the driving portion, and
wherein the damping component is provided at a first end part of the fixed shaft.

35. A damping component comprising:
a base;
a damping member disposed at an outer circumferential side of the base while being compressed; and
a holding portion disposed at an outer circumferential side of the damping member and compressively holding the damping member,
wherein the base comprises a projecting portion which projects in a radial direction of the base and has an outer diameter smaller than an inner diameter of the holding portion, the projecting portion being configured to support an end portion, in an axial direction of the base, of the damping member, and
wherein the damping member has rigidity lower than rigidity of the base and rigidity of the holding portion and has a loss factor, measured by a mechanical impedance method in a state being compressed between the base and the holding portion, of 0.05 or more.

36. The damping component according to claim 35, wherein the holding portion is disposed around the base.

37. The damping component according to claim 35, wherein the damping member is disposed at an outer circumference side of the base so as to surround the outer circumference of the base.

38. The damping component according to claim 35, wherein at least one of the holding portion and the base includes a retaining portion formed into a convex or concave shape on a surface thereof in contact with the damping member being compressed.

39. The damping component according to claim 35, wherein the damping member has a loss factor, measured by the mechanical impedance method while being compressed, of 0.4 or more.

40. The damping component according to claim 35, wherein weight of the holding portion is heavier than weight of the damping member.

* * * * *